(12) United States Patent
Tojinbara

(10) Patent No.: US 12,557,420 B2
(45) Date of Patent: Feb. 17, 2026

(54) SOLID-STATE IMAGING DEVICE AND ELECTRONIC DEVICE

(71) Applicant: SONY SEMICONDUCTOR SOLUTIONS CORPORATION, Kanagawa (JP)

(72) Inventor: Hiroki Tojinbara, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 374 days.

(21) Appl. No.: 18/264,707

(22) PCT Filed: Feb. 3, 2022

(86) PCT No.: PCT/JP2022/004144
§ 371 (c)(1),
(2) Date: Aug. 8, 2023

(87) PCT Pub. No.: WO2022/176626
PCT Pub. Date: Aug. 25, 2022

(65) Prior Publication Data
US 2024/0113145 A1 Apr. 4, 2024

(30) Foreign Application Priority Data
Feb. 18, 2021 (JP) .................................. 2021-024652

(51) Int. Cl.
*H01L 27/146* (2006.01)
*H10F 39/00* (2025.01)

(52) U.S. Cl.
CPC ....... *H10F 39/807* (2025.01); *H10F 39/8037* (2025.01); *H10F 39/812* (2025.01)

(58) Field of Classification Search
CPC ... H10F 39/807; H10F 39/812; H10F 39/8087
(Continued)

(56) References Cited

U.S. PATENT DOCUMENTS

| 2013/0087875 A1 | 4/2013 | Kobayashi et al. |
| 2014/0225213 A1 | 8/2014 | Kobayashi et al. |

(Continued)

FOREIGN PATENT DOCUMENTS

| JP | 2002-165126 | 6/2002 |
| JP | 2013-084742 | 5/2013 |

(Continued)

OTHER PUBLICATIONS

International Search Report and Written Opinion prepared by the Japan Patent Office on Apr. 20, 2022, for International Application No. PCT/JP2022/004144, 2 pgs.

*Primary Examiner* — Dzung Tran
(74) *Attorney, Agent, or Firm* — SHERIDAN ROSS P.C.

(57) ABSTRACT

A solid-state imaging device as disclosed includes a semiconductor layer having a light incidence surface and an element formation surface. The semiconductor layer includes a plurality of photoelectric conversion units including a first photoelectric conversion portion, a second photoelectric conversion portion, an isolation portion, a charge accumulation region, a first transfer transistor capable of transferring a signal charge from the first photoelectric conversion portion to the charge accumulation region, and a second transfer transistor capable of transferring a signal charge from the second photoelectric conversion portion to the charge accumulation region. The isolation portion includes a first region formed by an insulating material extending in a thickness direction of the semiconductor layer from the element formation surface side, and a second region provided on the light incidence surface side of the first region and formed by a semiconductor region into which impurities exhibiting a first conductivity type are implanted.

19 Claims, 50 Drawing Sheets

(58) Field of Classification Search
USPC .......................................................... 257/291
See application file for complete search history.

(56) References Cited

U.S. PATENT DOCUMENTS

| | | |
|---|---|---|
| 2017/0104020 A1 | 4/2017 | Lee et al. |
| 2017/0345853 A1 | 11/2017 | Kato |
| 2018/0350856 A1 | 12/2018 | Masagaki et al. |
| 2019/0035827 A1 | 1/2019 | Kawabata |
| 2019/0371837 A1 | 12/2019 | Masagaki et al. |
| 2020/0243581 A1 | 7/2020 | Masagaki et al. |
| 2021/0144321 A1 | 5/2021 | Yamashita et al. |
| 2021/0265406 A1 | 8/2021 | Masagaki et al. |

FOREIGN PATENT DOCUMENTS

| | | |
|---|---|---|
| JP | 2018-142739 | 9/2018 |
| WO | WO 2017/130723 | 8/2017 |
| WO | WO 2020/013130 | 1/2020 |

SOLID-STATE IMAGING DEVICE AND ELECTRONIC DEVICE

CROSS REFERENCE TO RELATED APPLICATIONS

This application is a national stage application under 35 U.S.C. 371 and claims the benefit of PCT Application No. PCT/JP2022/004144, having an international filing date of 3 Feb. 2022, which designated the United States, which PCT application claimed the benefit of Japanese Patent Application No. 2021-024652, filed 18 Feb. 2021, the entire disclosures of each of which are incorporated herein by reference.

TECHNICAL FIELD

The present technology (technology according to the present disclosure) relates to a solid-state imaging device and an electronic device, and particularly relates to a solid-state imaging device and an electronic device having phase difference detection pixels.

BACKGROUND ART

Conventionally, there is a method of performing pupil division by embedding a plurality of photoelectric conversion elements under one on-chip lens, and for example, this method is employed as a solid-state imaging device for a single-lens reflex camera or a built-in smartphone camera (see, for example, Patent Document 1).

Furthermore, some solid-state imaging devices perform phase difference detection by reading signal charges photoelectrically converted by a plurality of photodiodes disposed under one on-chip lens as signals independently at the time of phase difference detection, and add the signals at the time of imaging to perform processing as a signal of one pixel. In a solid-state imaging device having such an image plane phase difference detection function, in a case where there is a difference in sensitivity or incident light amount between a plurality of photoelectric conversion elements to be added, linearity of a signal after addition may not be maintained. In order to maintain the linearity after the addition, a structure is known in which the height of the potential barrier between the plurality of photodiodes is made lower than the barrier height under a transfer gate (for example, Patent Document 2).

CITATION LIST

Patent Document

Patent Document 1: Japanese Patent Application Laid-Open No. 2002-165126
Patent Document 2: Japanese Patent Application Laid-Open No. 2018-142739

SUMMARY OF THE INVENTION

Problems to be Solved by the Invention

In the phase difference detection pixel described in Patent Document 2, it is important to control the height of the potential barrier between the plurality of photodiodes. This is because a trade-off occurs between a signal range at the time of addition in which linearity with respect to the light amount is maintained and a signal range used for phase difference detection depending on the height of the potential barrier.

Moreover, in a case where the pixel size is miniaturized, the distance between an isolation region that isolates the plurality of photodiodes from each other and the transfer gate may be close. Therefore, the isolation region that isolates the plurality of photodiodes from each other is modulated under the influence of the on/off operation of the transfer gate, and the barrier height may change.

An object of the present technology is to provide a solid-state imaging device and an electronic device capable of suppressing narrowing of a signal range in which phase difference detection can be performed.

Solutions to Problems

A solid-state imaging device according to an aspect of the present technology includes a semiconductor layer in which one surface is a light incidence surface and another surface is an element formation surface, the semiconductor layer includes a plurality of photoelectric conversion units including a first photoelectric conversion portion, a second photoelectric conversion portion, an isolation portion provided between the first photoelectric conversion portion and the second photoelectric conversion portion and capable of forming a first potential barrier, a charge accumulation region, a first transfer transistor capable of transferring a signal charge from the first photoelectric conversion portion to the charge accumulation region and forming a second potential barrier higher than the first potential barrier when the signal charge is not transferred, and a second transfer transistor capable of transferring a signal charge from the second photoelectric conversion portion to the charge accumulation region and forming the second potential barrier when the signal charge is not transferred, and the isolation portion includes a first region formed by an insulating material extending in a thickness direction of the semiconductor layer from the element formation surface side, and a second region provided on the light incidence surface side of the first region and formed by a semiconductor region into which impurities exhibiting a first conductivity type are implanted.

An electronic device according to another aspect of the present technology includes the solid-state imaging device and an optical system that causes the solid-state imaging device to form an image of image light from a subject.

MODE FOR CARRYING OUT THE INVENTION

Figure 1:
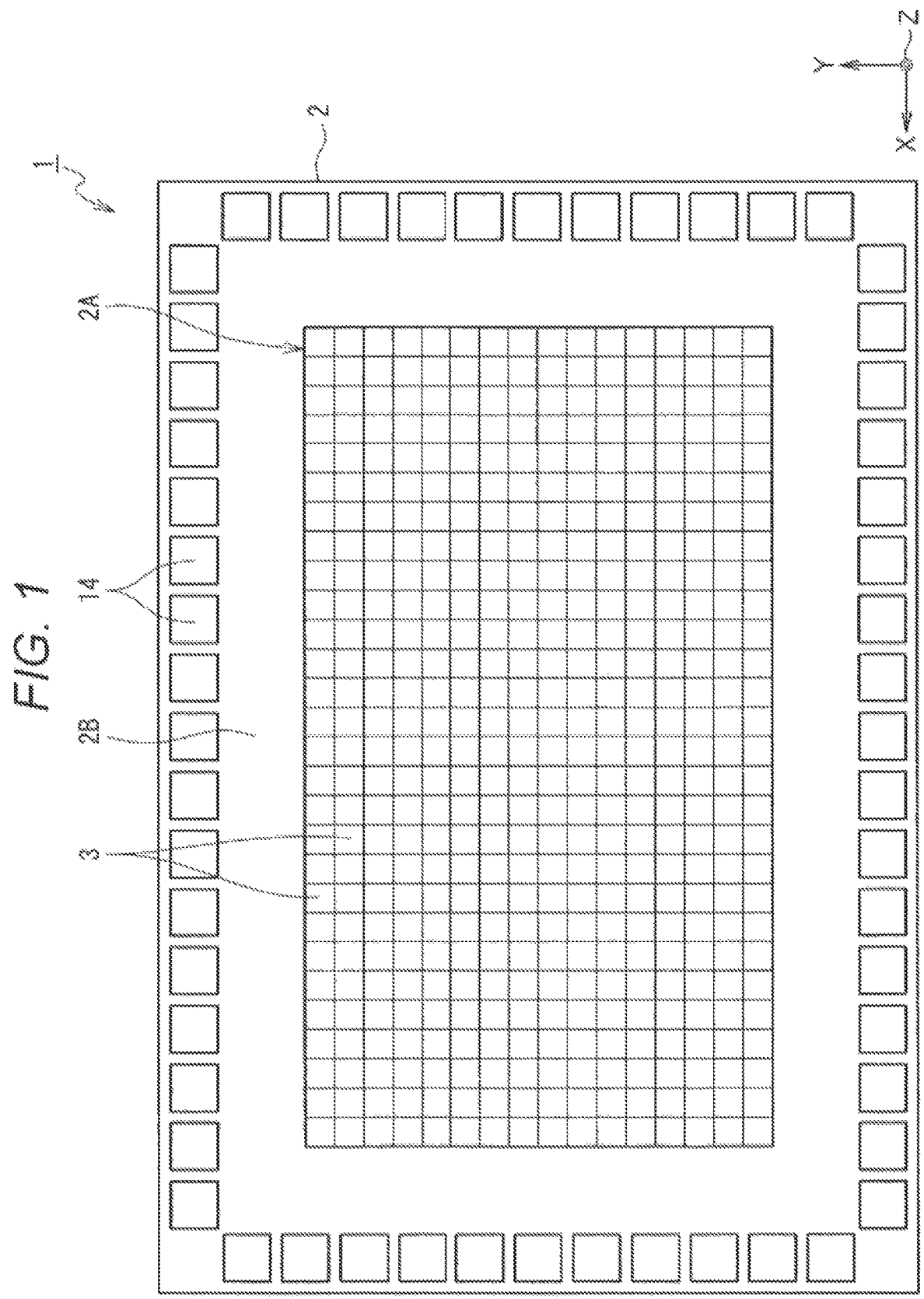
FIG. 1 is a chip layout diagram illustrating a configuration example of a solid-state imaging device according to a first embodiment of the present technology.

A preferred embodiment for implementing the present technology will be described below with reference to the drawings. Meanwhile, the embodiments described below illustrate examples of representative embodiments of the present technology, and the scope of the present technology is not to be narrowly interpreted according to these embodiments.

In the following drawings, the same or similar parts are denoted by the same or similar reference numerals. It should be noted that the drawings are schematic, and a relationship between a thickness and a planar dimension, a ratio of the thicknesses between layers, and the like are different from actual ones. Therefore, specific thicknesses and dimensions should be determined in consideration of the following description. Furthermore, it is needless to say that the drawings include portions having different dimensional relationships and ratios.

Furthermore, first to fourteenth embodiments described below each illustrate an example of a device and a method for embodying the technical idea of the present technology, and in the technical idea of the present technology, the material, shape, structure, arrangement, and the like of components are not limited to those described below. Various modifications can be made to the technical idea of the present technology within the technical scope defined by the claims described in the claims.

The description will be made in the following order.
1. First Embodiment
2. Second Embodiment
3. Third Embodiment
4. Fourth Embodiment
5. Fifth Embodiment
6. Sixth Embodiment
7. Seventh Embodiment
8. Eighth Embodiment
9. Ninth Embodiment
10. Tenth Embodiment
11. Eleventh Embodiment
12. Twelfth Embodiment
13. Thirteenth Embodiment
14. Fourteenth Embodiment
15. Application Example
    1. Application Example to Electronic Device
    2. Application Example to Mobile Body
    3. Application Example to Endoscopic Surgery System First Embodiment In this first embodiment, an example in which the present technology is applied to a solid-state imaging device that is a back-illuminated complementary metal oxide semiconductor (CMOS) image sensor will be described.

<<Overall Configuration of Solid-State Imaging Device>>

Figure 31:
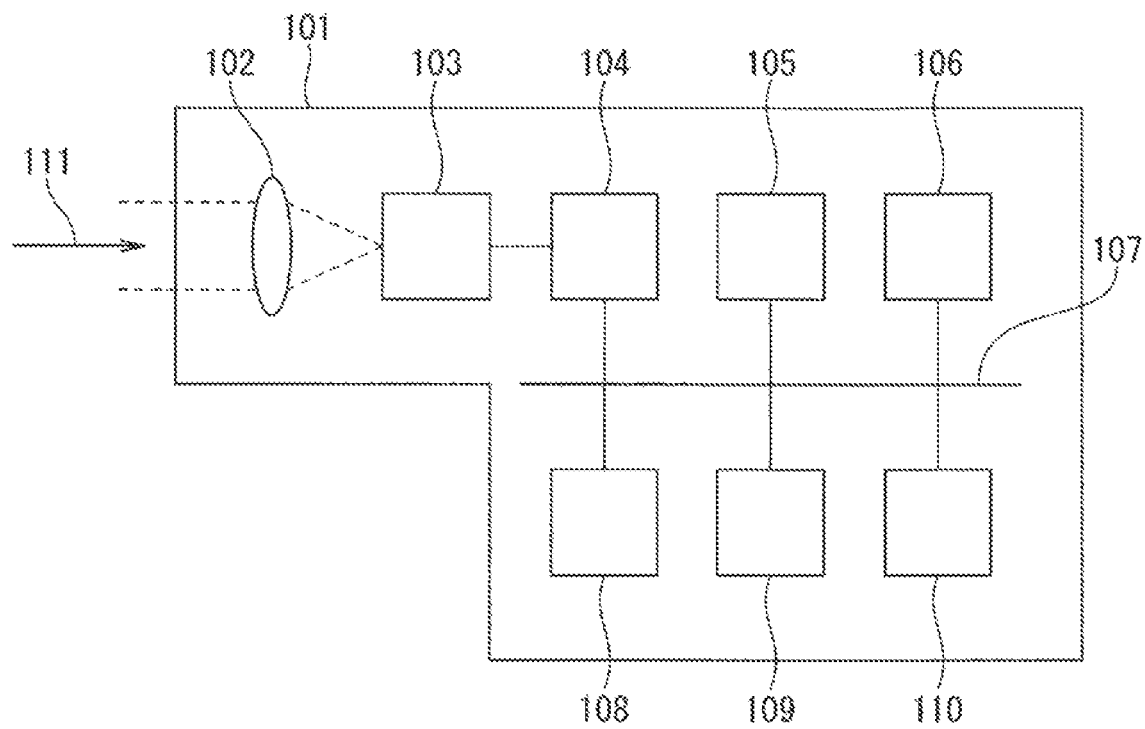
FIG. 31 is a block diagram illustrating a configuration example of an imaging device mounted on an electronic device.

First, an overall configuration of a solid-state imaging device 1 will be described. As illustrated in FIG. 1, the solid-state imaging device 1 according to the first embodiment of the present technology mainly includes a semiconductor chip 2 having a rectangular two-dimensional planar shape in a plan view. That is, the solid-state imaging device 1 is mounted on the semiconductor chip 2. As illustrated in FIG. 31, the solid-state imaging device 1 captures image light (incident light 111) from a subject via an optical system (optical lens) 102, converts a light amount of the incident light 111 formed on an imaging surface into an electric signal in units of pixels, and outputs the electric signal as a pixel signal.

As illustrated in FIG. 1, the semiconductor chip 2 on which the solid-state imaging device 1 is mounted includes, in a two-dimensional plane including an X direction and a Y direction intersecting each other, a rectangular pixel region 2A provided in a central portion, and a peripheral region 2B provided outside the pixel region 2A to surround the pixel region 2A.

The pixel region 2A is, for example, a light receiving surface that receives light condensed by the optical system 102 illustrated in FIG. 31. Also, in the pixel region 2A, a plurality of pixels 3 is arranged in a matrix on a two-dimensional plane including the X direction and the Y direction. In other words, the pixels 3 are repeatedly arranged in each of the X direction and the Y direction intersecting each other in the two-dimensional plane. Note that, in the present embodiment, as an example, the X direction and the Y direction are orthogonal to each other. In addition, a direction orthogonal to both the X direction and the Y direction is a Z direction (thickness direction).

As illustrated in FIG. 1, a plurality of bonding pads 14 is disposed in the peripheral region 2B. Each of the plurality of bonding pads 14 is arranged, for example, along one of four sides in the two-dimensional plane of the semiconductor chip 2. Each of the plurality of bonding pads 14 is an input-output terminal used when the semiconductor chip 2 is electrically connected to an external device.

<Logic Circuit>

Figure 2:
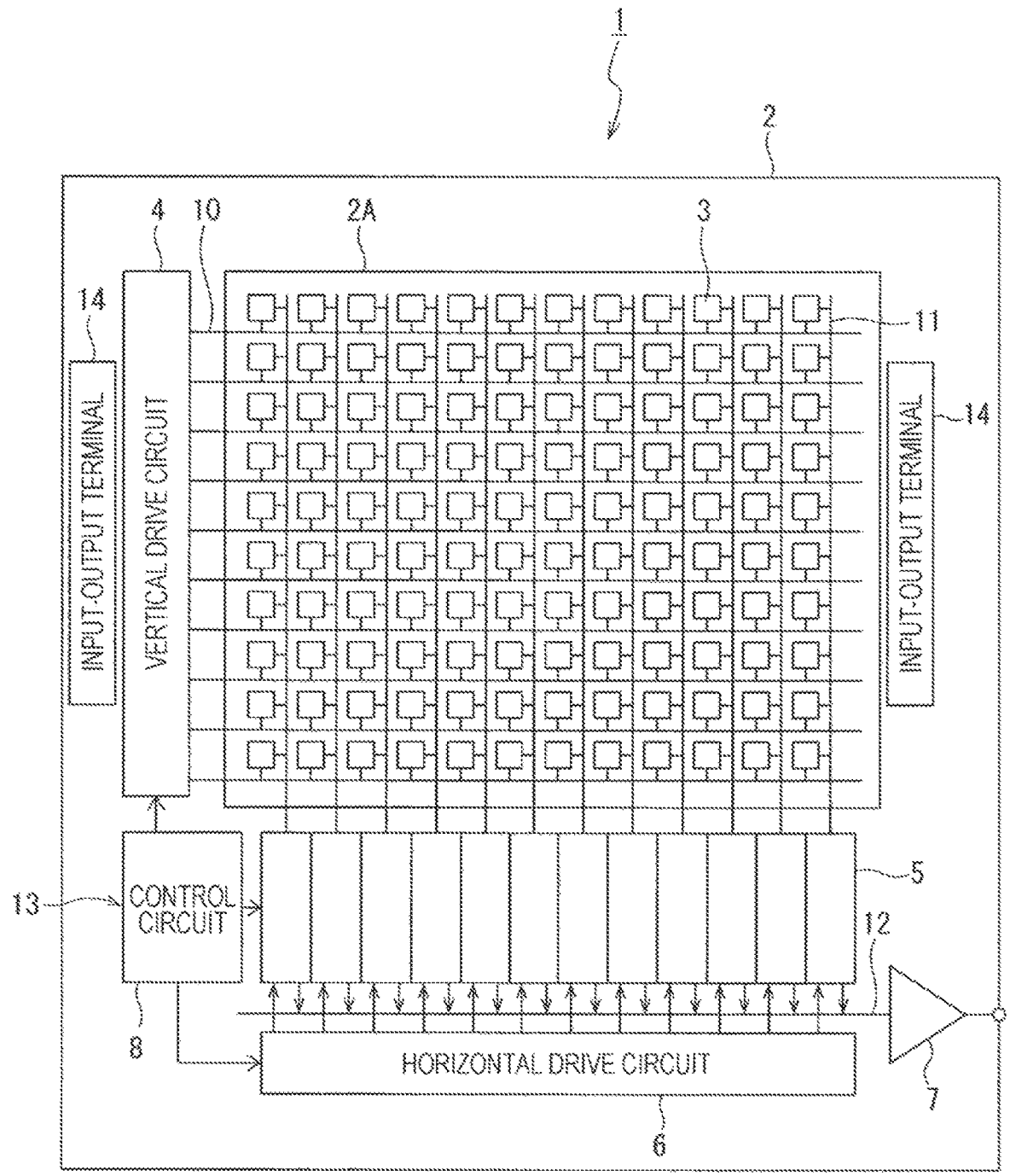
FIG. 2 is a block diagram illustrating a configuration example of the solid-state imaging device according to the first embodiment of the present technology.

As illustrated in FIG. 2, the semiconductor chip 2 includes a logic circuit 13 including a vertical drive circuit 4, a column signal processing circuit 5, a horizontal drive circuit 6, an output circuit 7, a control circuit 8, and the like. The logic circuit 13 includes, for example, a complementary MOS (CMOS) circuit including an n-channel conductive metal oxide semiconductor field effect transistor (MOSFET) and a p-channel conductive MOSFET as field effect transistors.

The vertical drive circuit 4 includes, for example, a shift register. The vertical drive circuit 4 sequentially selects desired pixel drive lines 10, supplies a pulse for driving the pixel 3 to the selected pixel drive line 10, and drives each pixel 3 row by row. That is, the vertical drive circuit 4 selectively scans each pixel 3 in the pixel region 2A sequentially in a vertical direction on a row-by-row basis, and supplies a pixel signal from the pixel 3 based on a signal charge generated according to the amount of received light by a photoelectric conversion element of each pixel 3 to the column signal processing circuit 5 through a vertical signal line 11.

The column signal processing circuit 5 is arranged, for example, on every column of the pixels 3 and performs signal processing, such as noise removal, on signals output from the pixels 3 of one row, for every pixel column. For example, the column signal processing circuit 5 performs signal processing such as correlated double sampling (CDS) for removing pixel-specific fixed pattern noise and analog digital (AD) conversion. A horizontal selection switch (not illustrated) is provided at an output stage of the column signal processing circuit 5 to be connected with a horizontal signal line 12.

The horizontal drive circuit 6 includes, for example, a shift register. The horizontal drive circuit 6 sequentially outputs horizontal scanning pulses to the column signal processing circuits 5 to sequentially select each of the column signal processing circuits 5, and causes each of the column signal processing circuits 5 to output the pixel signal subjected to the signal processing to a horizontal signal line 12.

The output circuit 7 performs signal processing on pixel signals sequentially supplied from each of the column signal processing circuits 5 through the horizontal signal line 12 and outputs the processed signals. As the signal processing, for example, buffering, black level adjustment, column variation correction, various types of digital signal processing, and the like can be used.

The control circuit 8 generates a clock signal and a control signal serving as a reference of operations of the vertical drive circuit 4, the column signal processing circuit 5, the horizontal drive circuit 6, and the like on the basis of a vertical synchronization signal, a horizontal synchronization signal, and a master clock signal. Then, the control circuit 8 outputs the generated clock signal and control signal to the vertical drive circuit 4, the column signal processing circuit 5, the horizontal drive circuit 6, and the like.

<Pixel>

Figure 3:
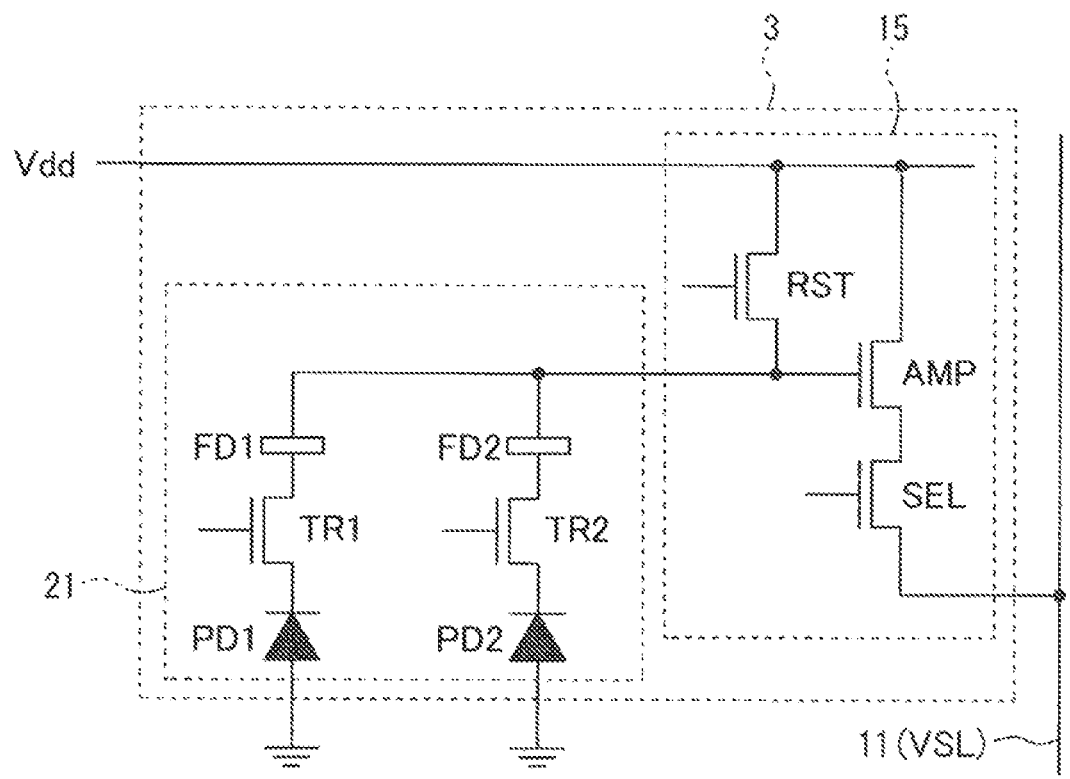
FIG. 3 is an equivalent circuit diagram of a pixel of the solid-state imaging device according to the first embodiment of the present technology.

As illustrated in FIG. 3, each of the pixels 3 includes a photoelectric conversion unit 21. The photoelectric conversion unit 21 includes photoelectric conversion elements PD1 and PD2, charge accumulation regions (floating diffusion) FD1 and FD2 that accumulate (hold) signal charges photoelectrically converted by the photoelectric conversion elements PD1 and PD2, and transfer transistors TR1 and TR2 that transfer the signal charges photoelectrically converted by the photoelectric conversion elements PD1 and PD2 to the charge accumulation regions FD1 and FD2. Furthermore, each of the plurality of pixels 3 includes a photoelectric conversion unit 21 and a readout circuit 15 electrically connected to the charge accumulation regions FD1 and FD2.

Each of the two photoelectric conversion elements PD1 and PD2 generates signal charges corresponding to the amount of received light. The photoelectric conversion elements PD1 and PD2 also temporarily accumulate (hold) the generated signal charges. The photoelectric conversion element PD1 has a cathode side electrically connected to a source region of the transfer transistor TR1, and an anode side electrically connected to a reference potential line (for example, ground). The photoelectric conversion element PD2 has a cathode side electrically connected to a source region of the transfer transistor TR2, and an anode side electrically connected to a reference potential line (for example, ground). As the photoelectric conversion elements PD1 and PD2, for example, photodiodes are used.

Of the two transfer transistors TR1 and TR2, a drain region of the transfer transistor TR1 is electrically connected to the charge accumulation region FD1. A gate electrode of the transfer transistor TR1 is electrically connected to a transfer transistor drive line among the pixel drive lines 10 (see FIG. 2). A drain region of the transfer transistor TR2 is electrically connected to the charge accumulation region FD2. A gate electrode of the transfer transistor TR is electrically connected to a transfer transistor drive line among the pixel drive lines 10.

The charge accumulation region FD1 of the two charge accumulation regions FD1 and FD2 temporarily accumulates and holds the signal charges transferred from the photoelectric conversion element PD1 via the transfer transistor TR1. The charge accumulation region FD2 temporarily accumulates and holds the signal charges transferred from the photoelectric conversion element PD2 via the transfer transistor TR2.

The readout circuit 15 reads the signal charges accumulated in the charge accumulation regions FD1 and FD2, and outputs pixel signals based on the signal charges. Although not limited thereto, the readout circuit 15 includes, for example, an amplification transistor AMP, a selection transistor SEL, and a reset transistor RST as pixel transistors. These transistors (AMP, SEL, and RST) include, for example, a MOSFET having a gate insulating film formed by a silicon oxide film ($SiO_2$ film), a gate electrode, and a pair of main electrode regions functioning as a source region and a drain region. In addition, these transistors may be a metal insulator semiconductor FET (MISFET) whose gate insulating film is a silicon nitride film ($Si_3N_4$ film) or a stacked film of a silicon nitride film and a silicon oxide film.

The amplification transistor AMP has a source region electrically connected to a drain region of the selection transistor SEL, and a drain region electrically connected to a power supply line Vdd and a drain region of the reset transistor. Then, a gate electrode of the amplification transistor AMP is electrically connected to the charge accumulation regions FD1 and FD2 and a source region of the reset transistor RST.

The selection transistor SEL has a source region electrically connected to the vertical signal line 11 (VSL), and a drain electrically connected to the source region of the amplification transistor AMP. Then, a gate electrode of the selection transistor SEL is electrically connected to a selection transistor drive line among the pixel drive lines 10 (see FIG. 2).

The reset transistor RST has a source region electrically connected to the charge accumulation regions FD1 and FD2 and the gate electrode of the amplification transistor AMP, and a drain region electrically connected to the power supply line Vdd and the drain region of the amplification transistor AMP. A gate electrode of the reset transistor RST is electrically connected to a reset transistor drive line among the pixel drive lines 10 (see FIG. 2).

An electronic device including the solid-state imaging device 1 reads signal charges from each of the two photoelectric conversion elements PD1 and PD2, and detects a phase difference thereof. In the case of in-focus, there is no difference in the amount of signal charges accumulated in the photoelectric conversion element PD1 and the photoelectric conversion element PD2. On the other hand, in the case of out of focus, for example, as illustrated in a range where the light amount is between 0 and L1 in FIG. 7, a difference occurs between an amount Q1 of signal charges accumulated in the photoelectric conversion element PD1 and an amount Q2 of signal charges accumulated in the photoelectric conversion element PD2. In the case of out of focus, the electronic device performs an operation such as operating the objective lens to match the line of Q1 and the line of Q2 in the range where the light amount is between 0 and L1, and causes both the lines to match. This is autofocus.

Figure 7:
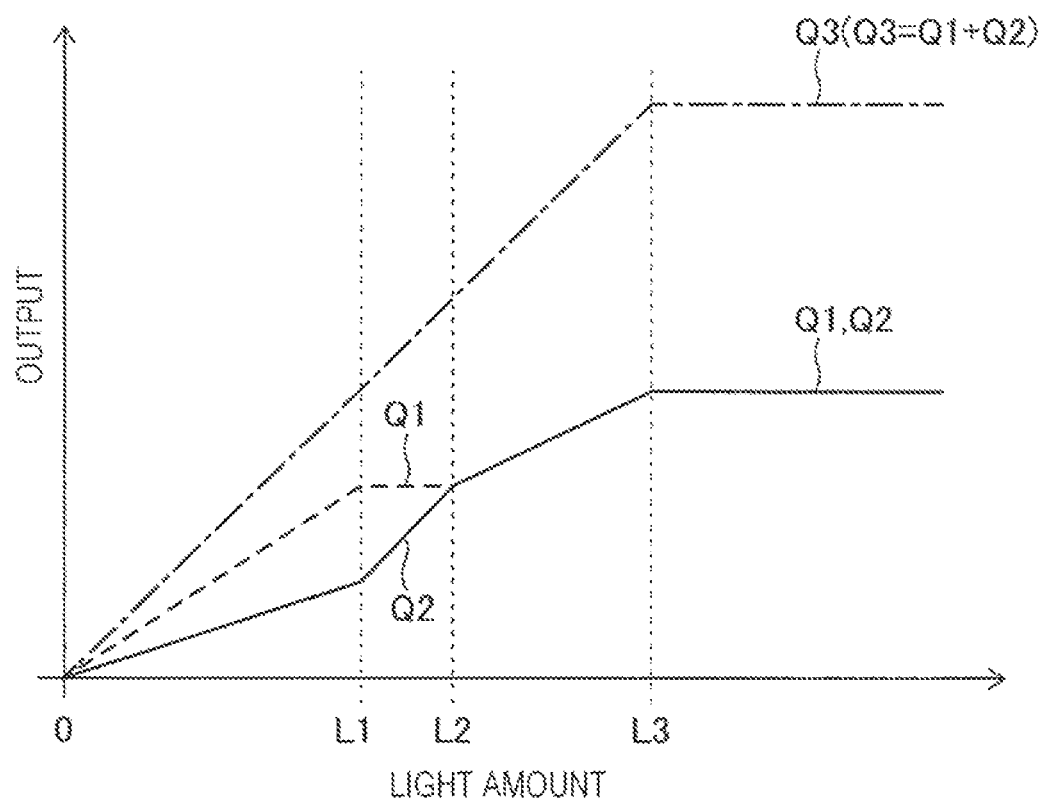
FIG. 7 is a graph illustrating output of a photoelectric conversion portion of the solid-state imaging device according to the first embodiment of the present technology with respect to the amount of incident light.

Then, if the focus adjustment is completed, the electronic device generates an image using an added signal charge Q3 accumulated in the range where the light amount is 0 to L3 in FIG. 7, for example. Here, the added signal charge Q3 is a sum of Q1 and Q2 (Q3=Q1+Q2).

<<Specific Configuration of Solid-State Imaging Device>>

Next, a specific configuration of the solid-state imaging device 1 will be described with reference to FIGS. 4A, 4B, 5, and 6A to 6C.

<Stacked Structure of Solid-State Imaging Device>

Figure 5:
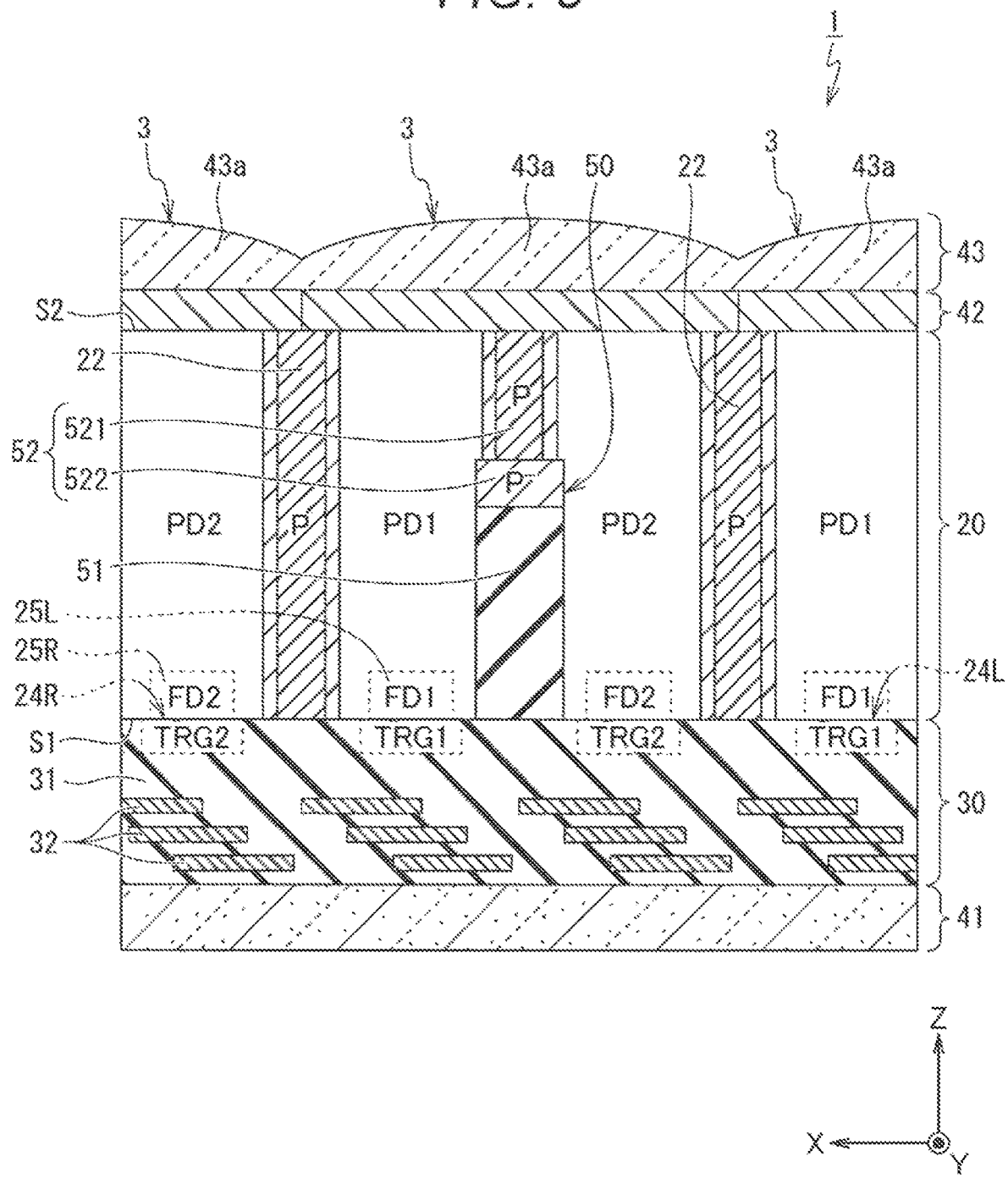
FIG. 5 is a longitudinal cross-sectional view illustrating a cross-sectional structure of a pixel of the solid-state imaging device according to the first embodiment of the present technology.

As illustrated in FIG. 5, the solid-state imaging device 1 includes a semiconductor layer 20 having a first surface S1 and a second surface S2 located opposite to each other, a multilayer wiring layer 30 including an interlayer insulating film 31 and a wiring layer 32 sequentially provided on the first surface S1 side of the semiconductor layer 20 from the first surface S1 side, and a support substrate 41. In addition, the semiconductor chip 2 includes known members such as a color filter 42 and a microlens (on-chip lens) layer 43 on the second surface S2 side of the semiconductor layer 20. Here, illustration of a known member other than the color filter 42 and the microlens layer 43 is omitted. Further, the microlens layer 43 includes a plurality of microlenses 43*a*.

The semiconductor layer 20 includes, for example, a single crystal silicon substrate. Then, a p-type well region is provided in the semiconductor layer 20.

Figure 4A:
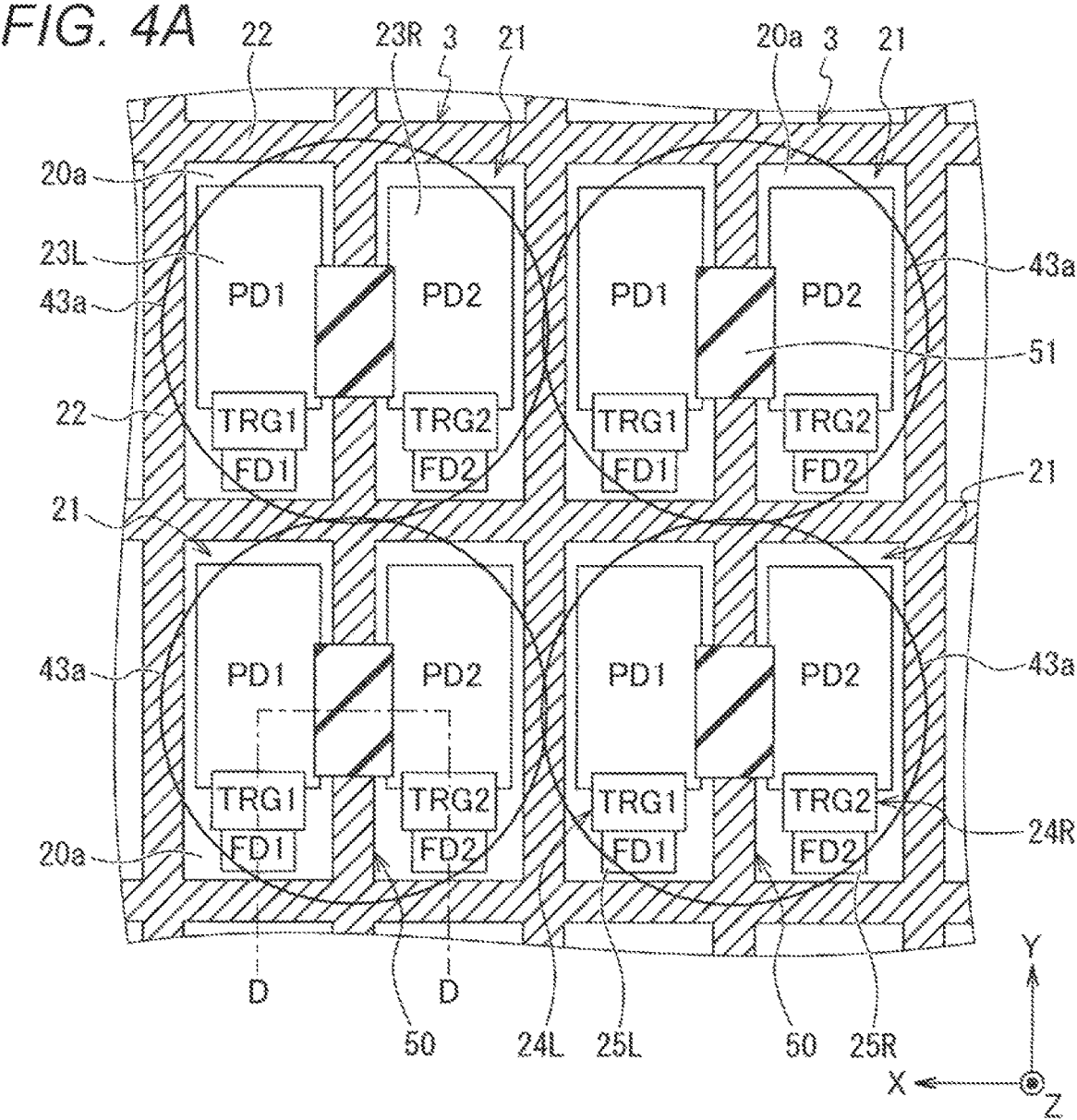
FIG. 4A is a transverse cross-sectional view illustrating a relative relationship between respective components when a plurality of pixels of the solid-state imaging device according to the first embodiment of the present technology is viewed in a cross section on a first plane.

As illustrated in FIGS. 4A and 5, each of the color filter 42 and the microlens 43*a* is provided for each pixel 3. The color filter 42 color-separates incident light incident from the light incidence surface side of the semiconductor chip 2 and passing through the microlens 43*a*. The microlens 43*a* condenses irradiation light and allows the condensed light to efficiently enter the pixel 3. Also, one color filter 42 and one microlens 43*a* are provided to cover both a first photoelectric conversion portion 23L and a second photoelectric conversion portion 23R, which will be described later.

Here, the first surface S1 of the semiconductor layer 20 is sometimes called an element formation surface or main surface, and the second surface S2 side is sometimes called a light incidence surface or back surface. In the solid-state imaging device 1 according to the first embodiment, light incident from the second surface (light incidence surface, back surface) S2 side of the semiconductor layer 20 is photoelectrically converted by a first photoelectric conversion portion 23L and a second photoelectric conversion portion 23R, which will be described later, provided in the semiconductor layer 20.

<Active Region>

As illustrated in FIG. 4A, the semiconductor layer 20 has an island-shaped active region (element formation region) 20a defined by a unit isolation portion 22. The active region 20a is provided for each pixel 3. The semiconductor layer 20 includes a plurality of such unit isolation portions 22. In FIG. 4A, a total of four pixels 3 repeatedly arranged in the X direction and the Y direction are illustrated, but the number of pixels 3 is not limited thereto.

<Photoelectric Conversion Unit>

As illustrated in FIG. 4A, a photoelectric conversion unit 21 is provided in each of the active regions 20a provided for the respective pixels 3. That is, the semiconductor layer 20 includes a plurality of photoelectric conversion units 21 provided for each pixel 3. Further, the adjacent photoelectric conversion units 21 are isolated from each other by the unit isolation portion 22 provided in the semiconductor layer 20. Furthermore, since the plurality of pixels 3 is arranged in a matrix, one photoelectric conversion unit 21 is surrounded by the unit isolation portion 22.

Each of the photoelectric conversion units 21 includes a first photoelectric conversion portion 23L (photoelectric conversion element PD1), a second photoelectric conversion portion 23R (photoelectric conversion element PD2), an isolation portion 50, a first transfer transistor 24L, a second transfer transistor 24R, a first charge accumulation region (FD1) 25L, and a second charge accumulation region (FD2) 25R provided in the active region 20a.

(Photoelectric Conversion Portion)

Each of the first photoelectric conversion portion 23L and the second photoelectric conversion portion 23R photoelectrically converts light incident from the second surface (light incidence surface, back surface) S2 side of the semiconductor layer 20 to generate signal charges. In addition, each of the first photoelectric conversion portion 23L and the second photoelectric conversion portion 23R also functions as a charge accumulation region that temporarily accumulates the generated signal charges. The first photoelectric conversion portion 23L and the second photoelectric conversion portion 23R are arranged in a first direction in the photoelectric conversion unit 21. Here, the first direction is described as the X direction, but may be a direction other than the X direction as long as it is a direction perpendicular to the thickness direction. In addition, each of the first photoelectric conversion portion 23L and the second photoelectric conversion portion 23R includes a semiconductor region of a second conductivity type, for example, n-type.

(Transfer Transistor)

The first transfer transistor 24L illustrated in FIGS. 4A, 5, and the like corresponds to the transfer transistor TR1 in FIG. 3. As illustrated in FIGS. 4A and 5, the first transfer transistor 24L is provided on the first surface S1 side of the semiconductor layer 20, and is, for example, an n-channel MOSFET. The first transfer transistor 24L is provided to form a channel in an active region between the first photoelectric conversion portion 23L and the first charge accumulation region 25L, and includes a gate insulating film (not illustrated) and a transfer gate electrode TRG1 sequentially stacked on the first surface S1. The first transfer transistor 24L may or may not transfer the signal charge from the first photoelectric conversion portion 23L functioning as the source region to the first charge accumulation region 25L functioning as the drain region by being turned on and off according to the voltage between the gate and the source. Here, a description will be given assuming that the signal charge is transferred when the first transfer transistor 24L is on, and the signal charge is not transferred when the first transfer transistor 24L is off.

Figure 4B:
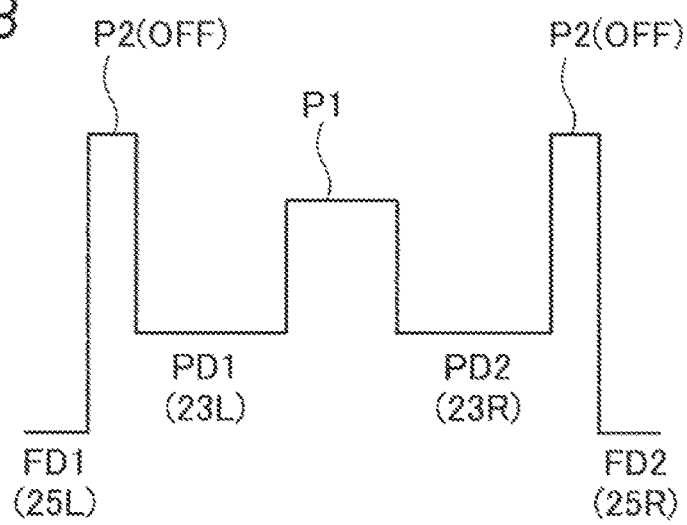
FIG. 4B is a schematic diagram illustrating a relationship of a potential distribution of each component along line D-D in FIG. 4A.

As illustrated in FIG. 4B, when the first transfer transistor 24L is off, that is, when the signal charge is not transferred from the first photoelectric conversion portion 23L to the first charge accumulation region 25L, a second potential barrier P2 higher than the first potential barrier P1 to be described later can be formed. If the first transfer transistor 24L is turned on, the second potential barrier P2 is lowered by modulation, and the signal charge flows from the first photoelectric conversion portion 23L to the first charge accumulation region 25L.

The second transfer transistor 24R illustrated in FIGS. 4A, 5, and the like corresponds to the transfer transistor TR2 in FIG. 3. As illustrated in FIGS. 4A and 5, the second transfer transistor 24R is provided on the first surface S1 side of the semiconductor layer 20, and is, for example, an n-channel MOSFET. The second transfer transistor 24R is provided to form a channel in an active region between the second photoelectric conversion portion 23R and the second charge accumulation region 25R, and includes a gate insulating film (not illustrated) and a transfer gate electrode TRG2 sequentially stacked on the first surface S1. The second transfer transistor 24R may or may not transfer the signal charge from the second photoelectric conversion portion 23R functioning as the source region to the second charge accumulation region 25R functioning as the drain region by being turned on and off according to the voltage between the gate and the source. Here, a description will be given assuming that the signal charge is transferred when the second transfer transistor 24R is on, and the signal charge is not transferred when the second transfer transistor 24R is off.

As illustrated in FIG. 4B, when the second transfer transistor 24R is off, that is, when the signal charge is not transferred from the second photoelectric conversion portion 23R to the second charge accumulation region 25R, a second potential barrier P2 higher than the first potential barrier P1 to be described later can be formed. If the second transfer transistor 24R is turned on, the second potential barrier P2 is lowered by modulation, and the signal charge flows from the second photoelectric conversion portion 23R to the second charge accumulation region 25R.

(Charge Accumulation Region)

The first charge accumulation region 25L is a charge accumulation region that is provided closer to the first surface S1 side of the semiconductor layer 20 and temporarily accumulates the signal charge transferred from the first photoelectric conversion portion 23L. The first charge accumulation region 25L is a floating diffusion region of the second conductivity type, for example, n-type. The second charge accumulation region 25R is a charge accumulation region that is provided closer to the first surface S1 side of the semiconductor layer 20 and temporarily accumulates the signal charge transferred from the second photoelectric conversion portion 23R. The second charge accumulation region 25R is a floating diffusion region of the second conductivity type, for example, n-type.

(Isolation Portion)

Figure 6A:
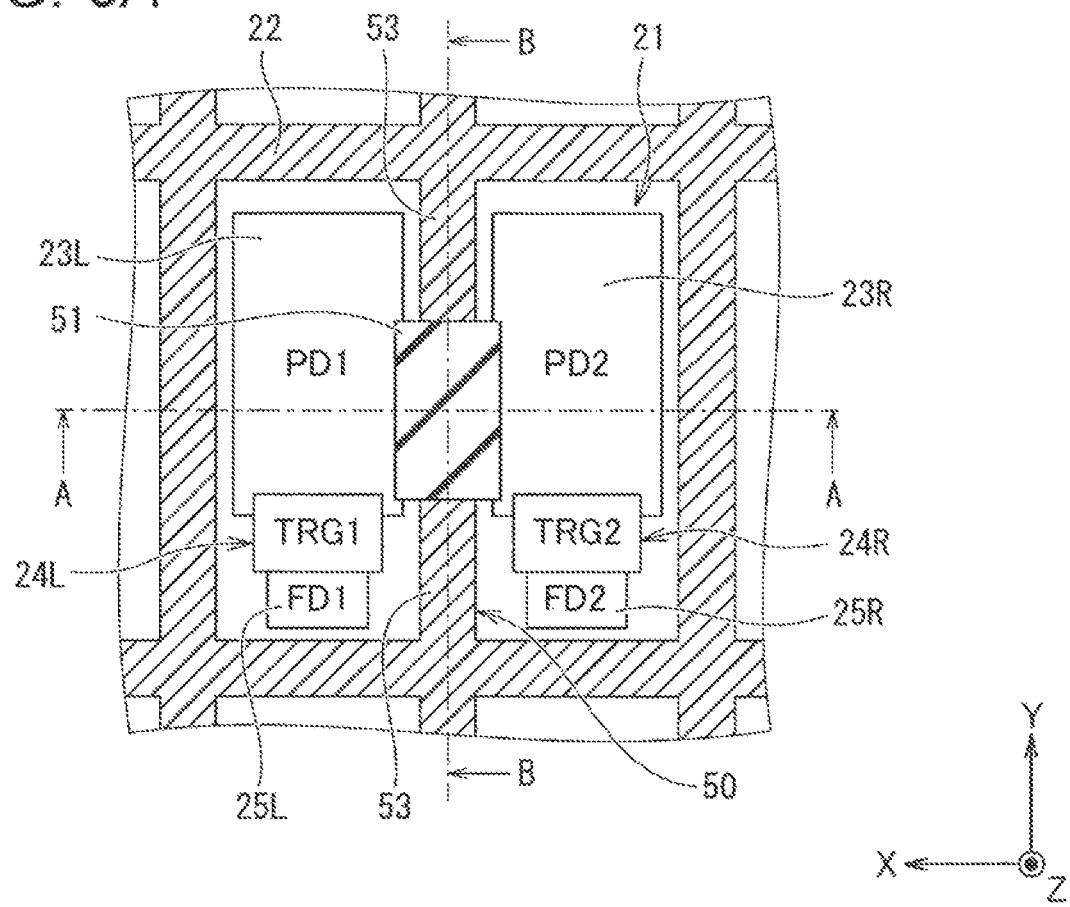
FIG. 6A is a transverse cross-sectional view illustrating a relative relationship between respective components when a pixel of the solid-state imaging device according to the first embodiment of the present technology is viewed in a cross section on a first plane.
Figure 6B:
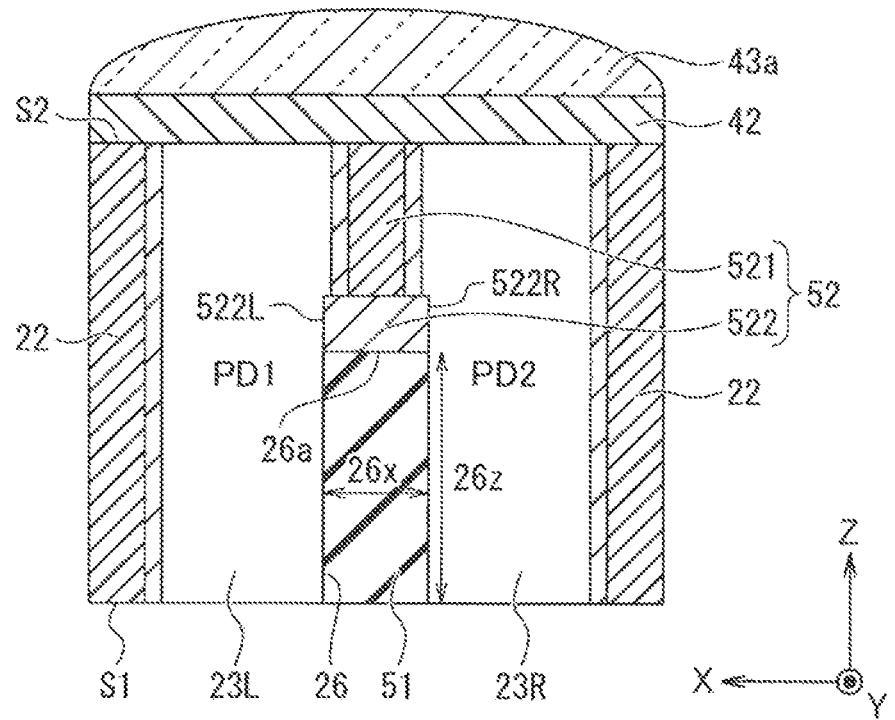
FIG. 6B is a longitudinal cross-sectional view illustrating a main part of the cross-sectional structure along line A-A in FIG. 6A.
Figure 6C:
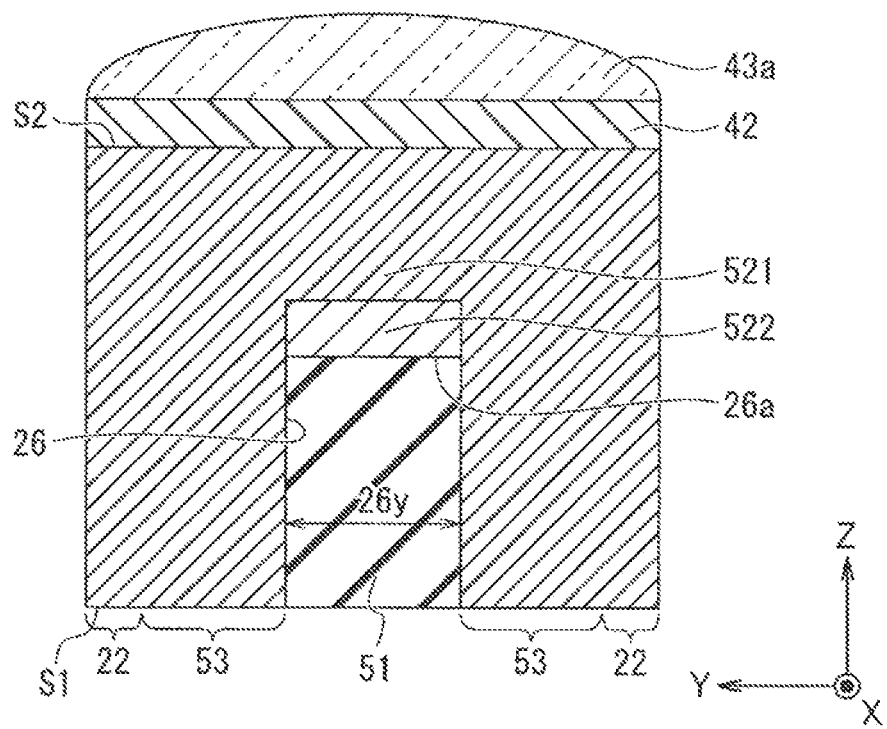
FIG. 6C is a longitudinal cross-sectional view illustrating a main part of the cross-sectional structure along line B-B in FIG. 6A.

As illustrated in FIGS. 6A, 6B, and 6C, the isolation portion 50 is an in-pixel unit isolation portion that is provided between the first photoelectric conversion portion 23L and the second photoelectric conversion portion 23R and isolates the first photoelectric conversion portion 23L and the second photoelectric conversion portion 23R from each other. As illustrated in FIG. 4B, the isolation portion 50 can form a first potential barrier P1 lower than the above-described second potential barrier P2. Since the first potential barrier P1 is formed between the first photoelectric conversion portion 23L and the second photoelectric conversion portion 23R by the isolation portion 50, each of the first photoelectric conversion portion 23L and the second photoelectric conversion portion 23R can independently accumulate signal charges up to the height of the first potential barrier P1. Then, if the amount of accumulated signal charges exceeds the height of the first potential barrier P1, signal charges flow from one of the first photoelectric conversion portion 23L and the second photoelectric conversion portion 23R to the other via an overflow path provided between the first photoelectric conversion portion 23L and the second photoelectric conversion portion 23R. The height of the first potential barrier P1 is controlled by the concentration of impurities.

As illustrated in FIG. 6B, such an isolation portion 50 includes a first region 51 formed by an insulating material and extending in the thickness direction of the semiconductor layer 20 from the first surface S1 side, and a second region 52 provided on the second surface S2 side of the first region 51 in the thickness direction and formed by a semiconductor region into which impurities exhibiting the first conductivity type are implanted. As illustrated in FIG. 6A, the isolation portion 50 further includes a third region 53 which protrudes in a protruding shape from the unit isolation portion 22 provided in the X direction toward the first region 51 and the second region 52 in a plan view and is formed by a semiconductor region into which impurities exhibiting the first conductivity type are implanted. In a region other than a second portion 522, which will be described later, functioning as an overflow path in the isolation portion 50, it is preferable to suppress movement of signal charges between the first photoelectric conversion portion 23L and the second photoelectric conversion portion 23R as much as possible.

As illustrated in FIG. 6B, the semiconductor layer 20 is provided with a groove 26 extending from the first surface S1 in the thickness direction of the semiconductor layer 20. The first region 51 is formed by an insulating material embedded (provided) in the groove 26 of the semiconductor layer 20, and functions as an insulator isolation region that suppresses movement of signal charges between the first photoelectric conversion portion 23L and the second photoelectric conversion portion 23R. The first region 51 is a shallow trench isolation (STI) provided in the semiconductor layer 20. The insulating material is, for example, silicon oxide ($SiO_2$).

As illustrated in FIG. 6B, the groove 26 has a dimension of 26x in the X direction, a dimension of 26z in the Z direction (thickness direction of the semiconductor layer 20), and a dimension of 26y in the Y direction as illustrated in FIG. 6C. A dimension 26z of the groove 26 in the Z direction is smaller than a dimension of the semiconductor layer 20 in the thickness direction. More specifically, as illustrated in FIG. 6B, the dimension 26z of the groove 26 in the Z direction is smaller than the dimension of the semiconductor layer 20 of each of the first photoelectric conversion portion 23L and the second photoelectric conversion portion 23R in the thickness direction. The dimensions in the X direction, the Y direction, and the Z direction of the portion of the first region 51 embedded in the semiconductor layer 20 are basically the same as the dimensions of the groove 26.

As illustrated in FIG. 6B, the second region 52 is formed by a semiconductor region into which, for example, p-type impurities are implanted as the impurities in which the semiconductor region exhibits the first conductivity type. The second region 52 includes a first portion 521 in which the concentration of the p-type impurities (impurities exhibiting a first conductivity type) is a first concentration, and a second portion 522 in which the concentration of the p-type impurities (impurities exhibiting a first conductivity type) is a second concentration lower than the first concentration. As illustrated in FIG. 6B, in the second portion 522, one end 522L in the X direction which is the arrangement direction of the first photoelectric conversion portion 23L and the second photoelectric conversion portion 23R is in conductive contact with the first photoelectric conversion portion 23L, and the other end 522R in the X direction is in conductive contact with the second photoelectric conversion portion 23R. Then, the second portion 522 functions as an overflow path (passage) through which signal charges pass when the signal charges move between the first photoelectric conversion portion 23L and the second photoelectric conversion portion 23R. The second concentration that is the concentration of the p-type impurities in the second portion 522 is, for example, $1e15$ $cm^{-3}$ to $1e17$ $cm^{-3}$.

The first portion 521 functions as an impurity isolation region that suppresses movement of signal charges between the first photoelectric conversion portion 23L and the second photoelectric conversion portion 23R. That is, the first concentration that is the concentration of the p-type impurities in the first portion 521 is set higher than the second degree in order to suppress the movement of the signal charge. Then, in the thickness direction of the semiconductor layer 20, the second portion 522 is provided on the second surface S2 side of the first region 51, and the first portion 521 is provided on the second surface S2 side of the second portion 522. More specifically, the second portion 522 is in contact with the first region 51 in the thickness direction of the semiconductor layer 20. In other words, in the thickness direction of the semiconductor layer 20, the second portion 522 is provided on the second surface S2 side of the groove 26 in which the first region 51 is provided. More specifically, the second portion 522 is in contact with a bottom portion 26a of the groove 26 in which the first region 51 is provided.

The second portion 522 is provided at a position away from the first surface S1 in the thickness direction of the semiconductor layer 20. More specifically, the second portion 522 is provided at a position away from the transfer gate electrodes TRG1 and TRG2 (that is, the first transfer transistor 24L and the second transfer transistor 24R) in the thickness direction of the semiconductor layer 20. More specifically, the second portion 522 is provided on the light incidence surface side with respect to the center in the thickness direction in the thickness direction of the semiconductor layer 20. The distance between the second portion 522 and the first surface S1 (transfer gate electrodes TRG1 and TRG2) in the thickness direction of the semiconductor layer 20 is equal to the dimension 26z of the groove 26 in the Z direction.

In the second portion 522, a boundary with adjacent semiconductor regions such as, for example, the first portion 521 and the third region 53 is clear, that is, a change in impurity concentration at the boundary is clear. In addition, since the first region 51 is formed by an insulating material, the boundary between the second portion 522 and the first region 51 is also clear. Then, the second portion 522 is provided at a position designed in the X direction, the Y direction, and the Z direction with high accuracy. As will be described in detail in a manufacturing method to be described later, after the groove 26 is formed in the semiconductor layer 20, the second portion 522 is formed by implanting impurities into the bottom portion 26a of the groove 26 in a state where nothing is embedded in the groove 26. Therefore, since the second portion 522 is provided at a shallow position with respect to the bottom portion 26a, it is possible to provide the second portion 522 in which the boundary of the concentration distribution is clear as compared with the case where the second portion 522 is provided at a deep position from the surface. Further, by being manufactured in this manner, the distance between the second portion 522 and the first surface S1 (transfer gate electrodes TRG1 and TRG2) can be made equal to the dimension 26z of the groove 26 in the Z direction. Accordingly, the position of the second portion 522 in the thickness direction of the semiconductor layer 20 can be determined at a position corresponding to the dimension 26z of the groove 26 in the Z direction. In addition, the dimension of the second portion 522 in the X direction can be formed to correspond to the dimension 26x of the groove 26 in the X direction, and the dimension of the second portion 522 in the Y direction can be formed to correspond to the dimension 26y of the groove 26 in the Y direction. Then, variations in the second portion 522 (variations in position, dimension, and sharpness of boundaries with adjacent semiconductor regions) are small.

Two third regions 53 protruding from the unit isolation portion 22 in the X direction are provided for one photoelectric conversion unit 21. Two unit isolation portions 22 in the X direction are provided for one photoelectric conversion unit 21 to face each other. The third region 53 protrudes in a protruding shape from each of the unit isolation portions 22 in the X direction toward the first region 51 and the second region 52.

The third region 53 is formed by a semiconductor region into which impurities exhibiting the first conductivity type are implanted, and functions as an impurity isolation region that suppresses movement of signal charges between the first photoelectric conversion portion 23L and the second photoelectric conversion portion 23R. The third region 53 is formed by a semiconductor region into which, for example, p-type impurities are implanted as the impurities exhibiting the first conductivity type. The impurity concentration of the third region 53 is, for example, the same first concentration as that of the first portion 521. Further, as illustrated in FIG. 6C, the third region 53 is provided integrally with the second region 52 (first portion 521) and the unit isolation portion 22.

(Unit Isolation Portion)

As illustrated in FIG. 4A, the unit isolation portion 22 is provided between two adjacent photoelectric conversion units 21, and isolates the two adjacent photoelectric conversion units 21 from each other. The unit isolation portion 22 is provided between two photoelectric conversion units 21 adjacent in the X direction and between two photoelectric conversion units 21 adjacent in the Y direction.

The unit isolation portion 22 is formed by a semiconductor region into which impurities exhibiting the first conductivity type are implanted, and functions as an impurity isolation region that suppresses movement of signal charges between two adjacent photoelectric conversion units 21. The unit isolation portion 22 is formed by a semiconductor region into which, for example, p-type impurities are implanted as the impurities exhibiting the first conductivity type. The unit isolation portion 22 can form a third potential barrier higher than the first potential barrier P1 and the second potential barrier P2 described above. Since the third potential barrier is formed between the two adjacent photoelectric conversion units 21 by the unit isolation portion 22, the signal charges accumulated in the first photoelectric conversion portion 23L and the second photoelectric conversion portion 23R can be prevented from leaking to the adjacent photoelectric conversion unit 21.

<Readout Circuit>

In each of the active regions 20a (FIG. 4A) provided for each pixel 3, a reset transistor RST, an amplification transistor AMP, and a selection transistor SEL of the readout circuit 15 are configured. Note that, in the drawings other than FIG. 3, illustration of the reset transistor RST, the selection transistor SEL, and the amplification transistor AMP is omitted.

(Reset Transistor)

The reset transistor RST is, for example, an n-channel MOSFET. The reset transistor RST includes a gate insulating film and a reset gate electrode (not illustrated) sequentially stacked on the first surface S1. The reset transistor RST is turned on and off according to the voltage between the gate and the source. Then, if the reset transistor RST is turned on, the potentials of the first charge accumulation region 25L (FD1) and the second charge accumulation region 25R (FD2) are reset to a predetermined potential.

(Selection Transistor)

The selection transistor SEL is, for example, an n-channel MOSFET. The selection transistor SEL includes a gate insulating film and a selection gate electrode (not illustrated) sequentially stacked on the first surface S1. The selection transistor SEL is turned on and off according to the voltage between the gate and the source. Then, the pixel signal is output from the readout circuit 15 at the timing when the selection transistor SEL is turned on.

(Amplification Transistor)

The amplification transistor AMP is, for example, an n-channel MOSFET. The amplification transistor AMP includes a gate insulating film and an amplification gate electrode (not illustrated) sequentially stacked on the first surface S1. If the selection transistor SEL is turned on, the amplification transistor AMP amplifies the potential of the first charge accumulation region 25L and/or the second charge accumulation region 25R.

<<Operation of Solid-State Imaging Device>>

Hereinafter, an operation of the solid-state imaging device 1 according to the first embodiment of the present technology will be described with reference to the drawings. If light enters the solid-state imaging device 1, the light passes through the microlens 43a, the color filter 42, and the like, and enters the first photoelectric conversion portion 23L and the second photoelectric conversion portion 23R. Then, an output Q1 is obtained from the first photoelectric conversion portion 23L and an output Q2 is obtained from the second photoelectric conversion portion 23R according to the amount of incident light. Then, autofocus is performed on the basis of the outputs Q1 and Q2, and an image is generated on the basis of an addition signal Q3 (Q3=Q1+Q2) which is a sum of Q1 and Q2. In FIG. 7, the horizontal axis represents the amount of incident light, and the vertical axis represents the output of the photoelectric conversion portion. FIG. 7 illustrates the output Q1 of the first photoelectric conversion portion 23L, the output Q2 of the second photoelectric conversion portion 23R, and the addition signal Q3 (Q3=Q1+Q2) which is the sum of Q1 and Q2. In addition, a region where the light amount is from 0 to L1 is referred to as a first range, a region where the light amount is from L1 to L2 is referred to as a second range, a region where the light amount is from L2 to L3 is referred to as a third range, and a region where the light amount is from L3 is referred to as a fourth range. In addition, FIG. 7 illustrates an example in which the first photoelectric conversion portion 23L is saturated before the second photoelectric conversion portion 23R.

Figure 8A:
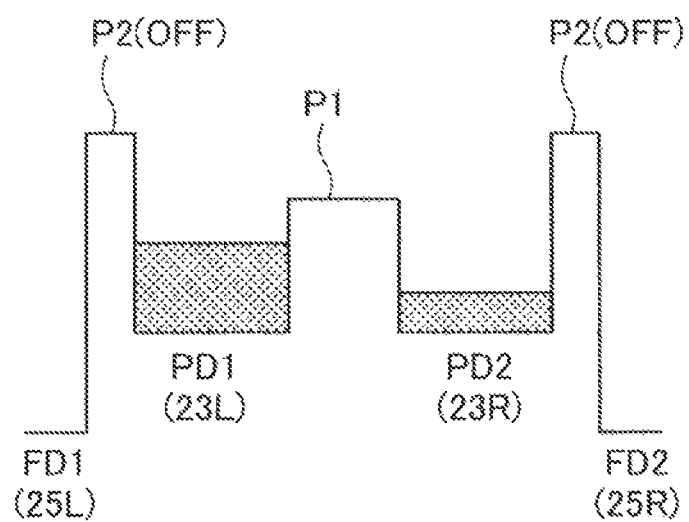
FIG. 8A is a schematic diagram illustrating a change in the amount of signal charges accumulated in the photoelectric conversion portion of the solid-state imaging device according to the first embodiment of the present technology.

In the first range illustrated in FIG. 7, no overflow occurs between the first photoelectric conversion portion 23L and the second photoelectric conversion portion 23R. This is a state as illustrated in FIG. 8A, and the signal charge generated by the first photoelectric conversion portion 23L and the signal charge generated by the second photoelectric conversion portion 23R are not mixed. The phase difference detection for autofocus is performed in the first range. More specifically, the phase difference detection is performed in the first range in which both the output Q1 of the first photoelectric conversion portion 23L and the output Q2 of the second photoelectric conversion portion 23R maintain linearity with respect to the light amount.

Figure 8B:
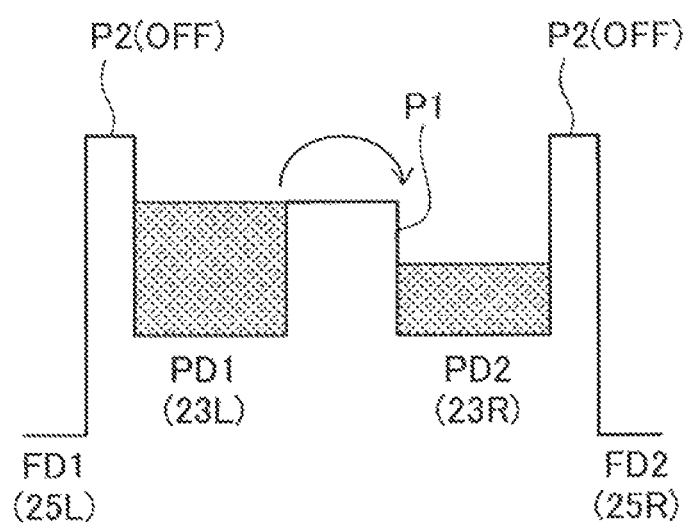
FIG. 8B is a schematic diagram illustrating a change subsequent to FIG. 8A.

In the second range illustrated in FIG. 7, the first photoelectric conversion portion 23L is saturated before the second photoelectric conversion portion 23R, and a part of the signal charge of the first photoelectric conversion portion 23L flows to the second photoelectric conversion portion 23R beyond the first potential barrier P1 of the isolation portion 50. This is the overflow (FIG. 8B). The phase difference detection cannot be performed in the second range and the subsequent ranges.

Figure 8C:
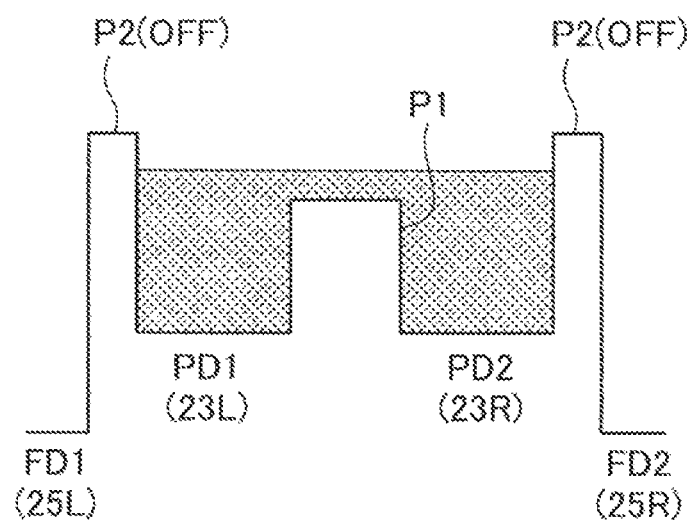
FIG. 8C is a schematic diagram illustrating a change subsequent to FIG. 8B.

In the third range illustrated in FIG. 7, the second photoelectric conversion portion 23R is also saturated. This is a state as illustrated in FIG. 8C, and signal charges are accumulated beyond the first potential barrier P1 of the isolation portion 50 without distinction between the first photoelectric conversion portion 23L and the second photoelectric conversion portion 23R. Then, until the charge overflows to the first charge accumulation region 25L and the second charge accumulation region 25R beyond the second potential barrier P2, the outputs of the first photoelectric conversion portion 23L and the second photoelectric conversion portion 23R increase.

Figure 8D:
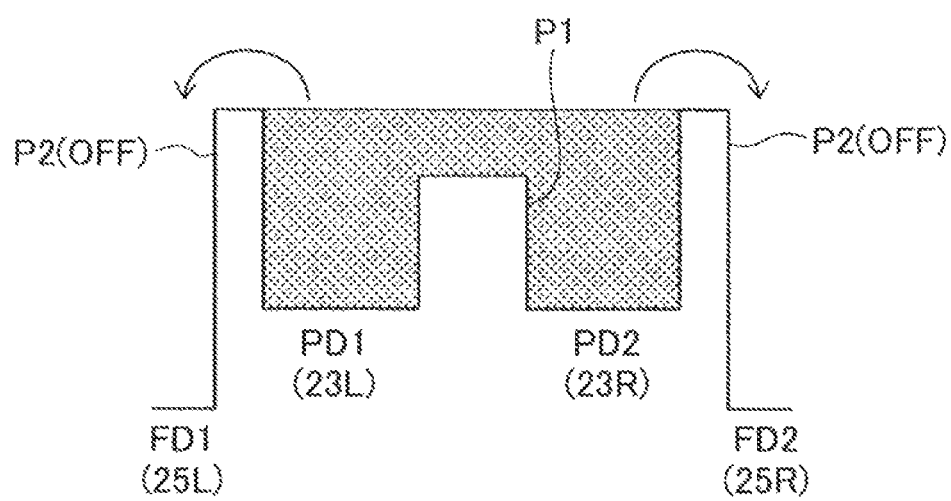
FIG. 8D is a schematic diagram illustrating a change subsequent to FIG. 8C.

In the fourth range illustrated in FIG. 7, the signal charge overflows to the first charge accumulation region 25L and the second charge accumulation region 25R beyond the second potential barrier P2 of the first transfer transistor 24L and the second transfer transistor 24R (FIG. 8D). The overflowed signal charge is erased by the reset transistor RST.

The image formation is performed using the addition signal Q3 from the first range to the third range. More specifically, the image formation is performed in the first range to the third range in which the linearity of the addition signal Q3 with respect to the light amount is maintained.

Then, since variations in the second portion 522 are small, variations in the height of the first potential barrier P1 are also small. As a result, even in a case where the first potential barrier P1 is designed to be high, it is possible to suppress the occurrence of the pixel 3 in which the first potential barrier P1 exceeds the second potential barrier P2 due to manufacturing variations. Accordingly, it is possible to suppress the occurrence of the pixel 3 in which the linearity of the addition signal Q3 with respect to the light amount is deteriorated. Furthermore, since the first potential barrier P1 can be designed to be high, it is possible to suppress narrowing of the signal range in which phase difference detection can be performed. Note that setting to be high means that the first potential barrier P1 is lower than the second potential barrier P2, but the lowering width from the second potential barrier P2 is relatively small.

In addition, the second portion 522 of the isolation portion 50 is provided at a position away from the first surface S1 in the thickness direction of the semiconductor layer 20. Therefore, even in a case where either the first transfer transistor 24L or the second transfer transistor 24R is turned on, the second portion 522 is less affected by the modulation of the first transfer transistor 24L and the second transfer transistor 24R as compared with a P-type semiconductor region 306 that functions as a potential barrier, as described in Patent Document 2.

Figure 9A:
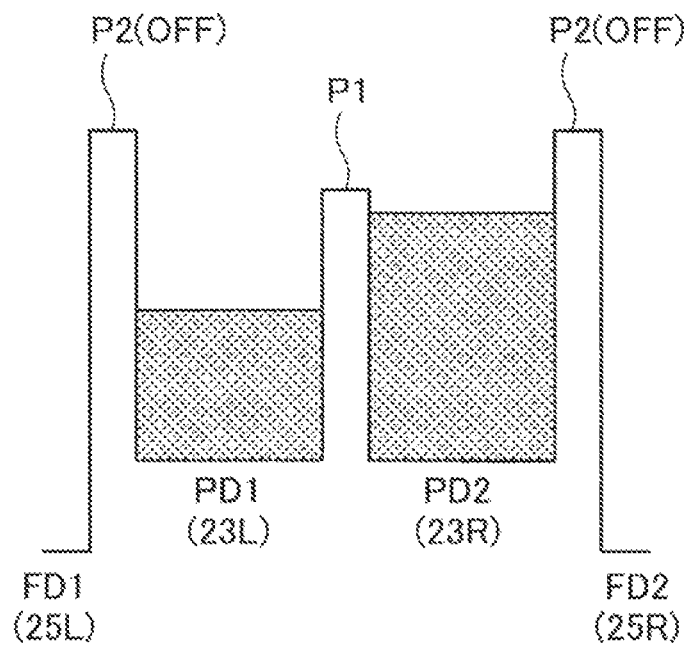
FIG. 9A is a schematic diagram illustrating a change in a potential barrier and movement of a signal charge in a case where a first transfer transistor is turned on and off in the solid-state imaging device according to the first embodiment of the present technology.
Figure 9B:
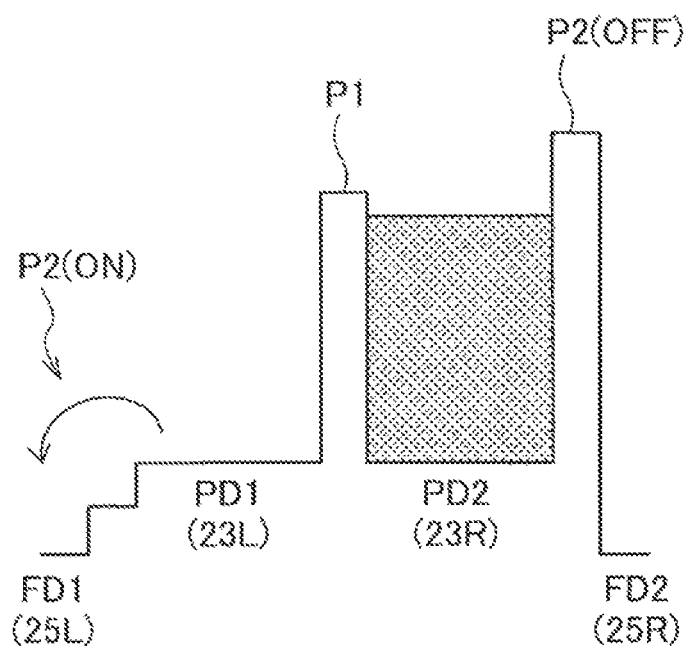
FIG. 9B is a schematic diagram illustrating a change in the potential barrier and movement of the signal charge subsequent to FIG. 9A.
Figure 9C:
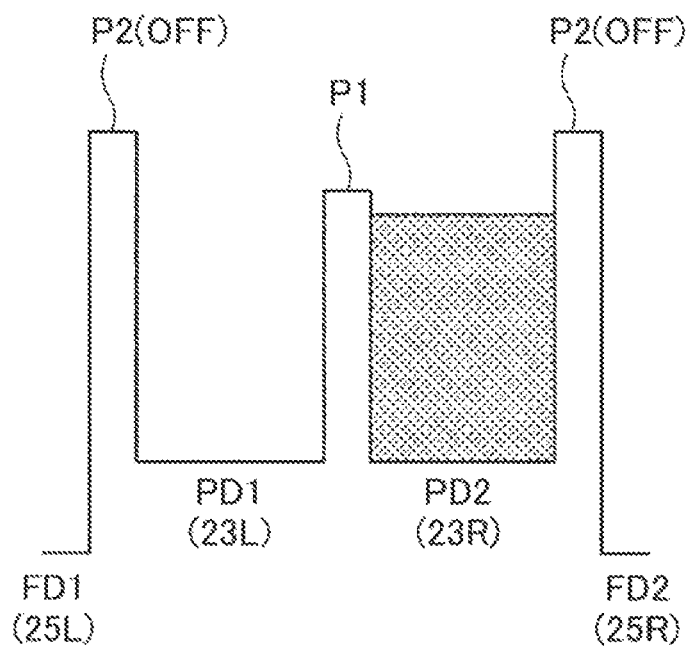
FIG. 9C is a schematic diagram illustrating a change in the potential barrier and movement of the signal charge subsequent to FIG. 9B.

A case where the first transfer transistor 24L is turned on in a state where signal charges are accumulated in the first charge accumulation region 25L and the second charge accumulation region 25R illustrated in FIG. 9A will be considered. As illustrated in FIG. 9B, if the first transfer transistor 24L is turned on, the second potential barrier P2 of the first transfer transistor 24L is lowered, and the signal charge accumulated in the first photoelectric conversion portion 23L is transferred to the first charge accumulation region 25L. However, the second portion 522 of the isolation portion 50 is less affected by the modulation of the first transfer transistor 24L. Therefore, the height of the first potential barrier P1 is also less affected by the modulation of the first transfer transistor 24L. Then, as illustrated in FIG. 9C, the first transfer transistor 24L is turned off again. Since the height of the first potential barrier P1 is less affected by modulation, even if the amount of signal charges accumulated in the second charge accumulation region 25R changes before and after a series of operations, the amount of change is small. Accordingly, it is possible to suppress a decrease in the accuracy of the phase difference detection. Furthermore, since the first potential barrier P1 is less affected by modulation, the height of the barrier can be used in a state close to the design, and it is possible to suppress narrowing of the signal range in which phase difference detection can be performed.

<<Method for Manufacturing Solid-State Imaging Device>>

Next, a method for manufacturing the solid-state imaging device 1 according to the first embodiment of the present technology will be described with reference to FIGS. 10A to 10F. In the first embodiment, manufacturing steps of the first photoelectric conversion portion 23L, the second photoelectric conversion portion 23R, the isolation portion 50, and the unit isolation portion 22, which are included in the manufacturing steps of the solid-state imaging device 1 will be mainly described. Then, manufacturing methods for other components of the solid-state imaging device 1 are omitted.

Figure 10A:
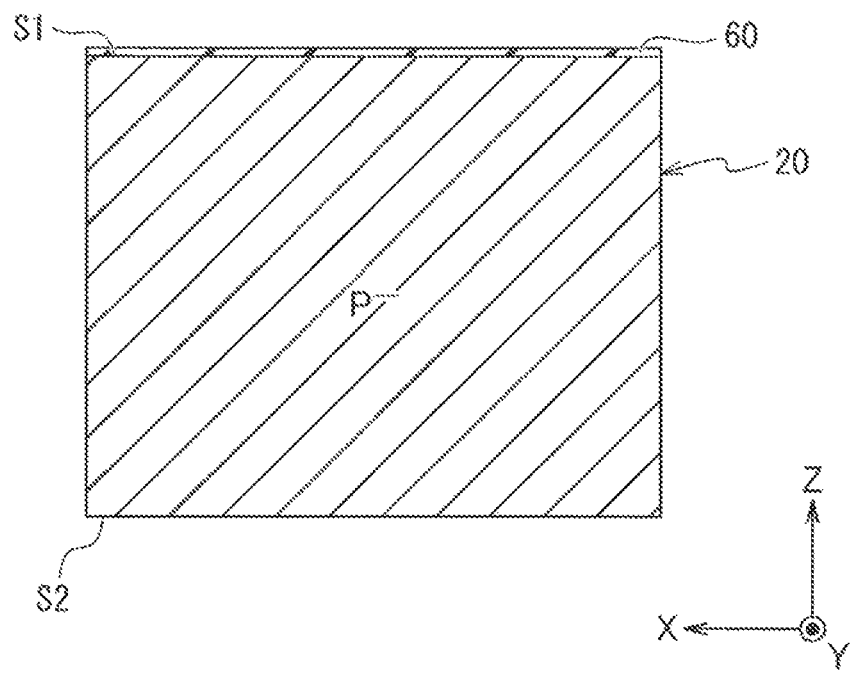
FIG. 10A is a process cross-sectional view illustrating a method for manufacturing the solid-state imaging device according to the first embodiment of the present technology.
Figure 10B:
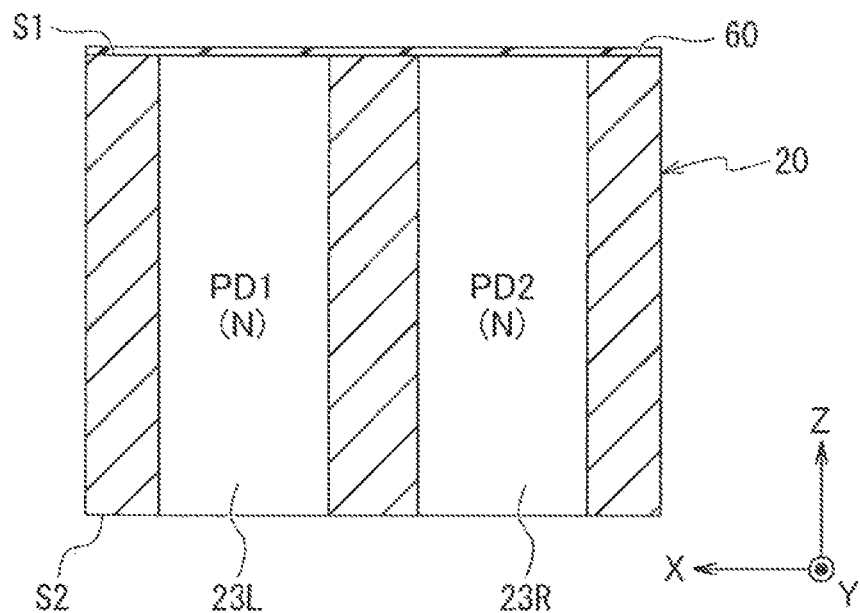
FIG. 10B is a process cross-sectional view subsequent to FIG. 10A.

First, as illustrated in FIG. 10A, a silicon oxide film ($SiO_2$ film) 60 is formed on the first surface S1 side of the semiconductor layer 20 having the first surface S1 and the second surface S2 located on opposite sides. Then, as illustrated in FIG. 10B, the first photoelectric conversion portion 23L and the second photoelectric conversion portion 23R are formed in the semiconductor layer 20 at intervals. The first photoelectric conversion portion 23L and the second photoelectric conversion portion 23R are formed by implanting n-type impurities at intervals in the X direction. Then, the first photoelectric conversion portion 23L and the second photoelectric conversion portion 23R are formed for each pixel 3.

Figure 10C:
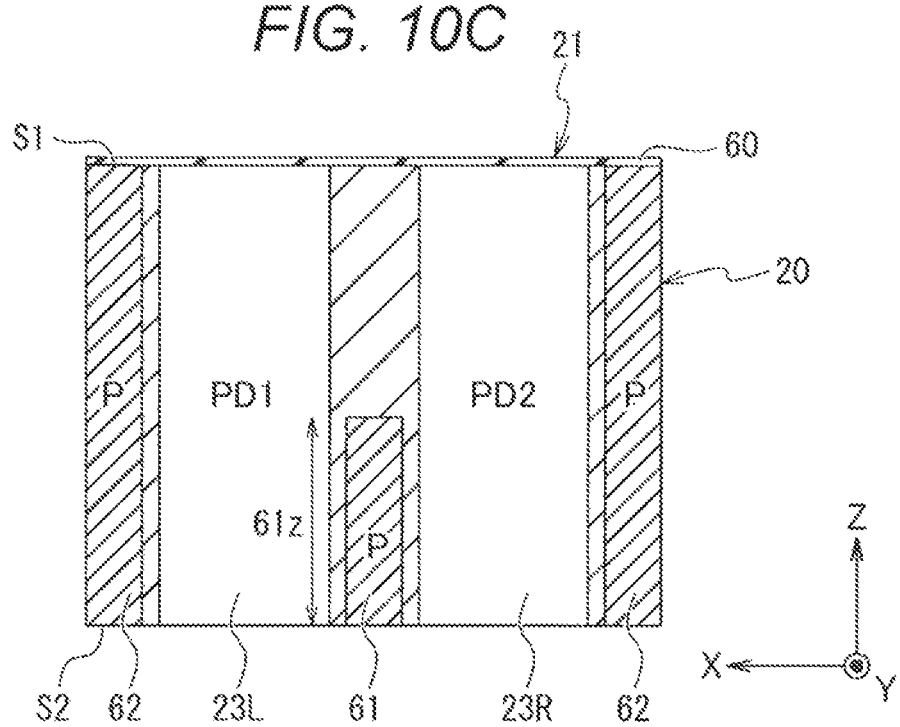
FIG. 10C is a process cross-sectional view subsequent to FIG. 10B.

Next, as illustrated in FIG. 10C, impurities are implanted into the semiconductor layer 20 between the first photoelectric conversion portion 23L and the second photoelectric conversion portion 23R and the semiconductor layer 20 in a portion serving as a boundary region between the photoelectric conversion units 21 (adjacent photoelectric conversion units 21) including a set of the first photoelectric conversion portion 23L and the second photoelectric conversion portion 23R to form first impurity regions 61 and 62 in which the impurity concentration is the first concentration. More specifically, for example, p-type impurities are implanted into the above-described region of the semiconductor layer 20 to form the first impurity regions 61 and 62 in which the concentration of the p-type impurities is the first concentration. A depth 61z in the Z direction of the first impurity region 61 formed between the first photoelectric conversion portion 23L and the second photoelectric conversion portion 23R may be at least as long as the bottom portion 26a of the groove 26 formed in the next step can be in contact with the first impurity region 61. In addition, the first impurity region 62 is formed in a portion serving as a boundary region between the photoelectric conversion units 21.

Figure 10D:
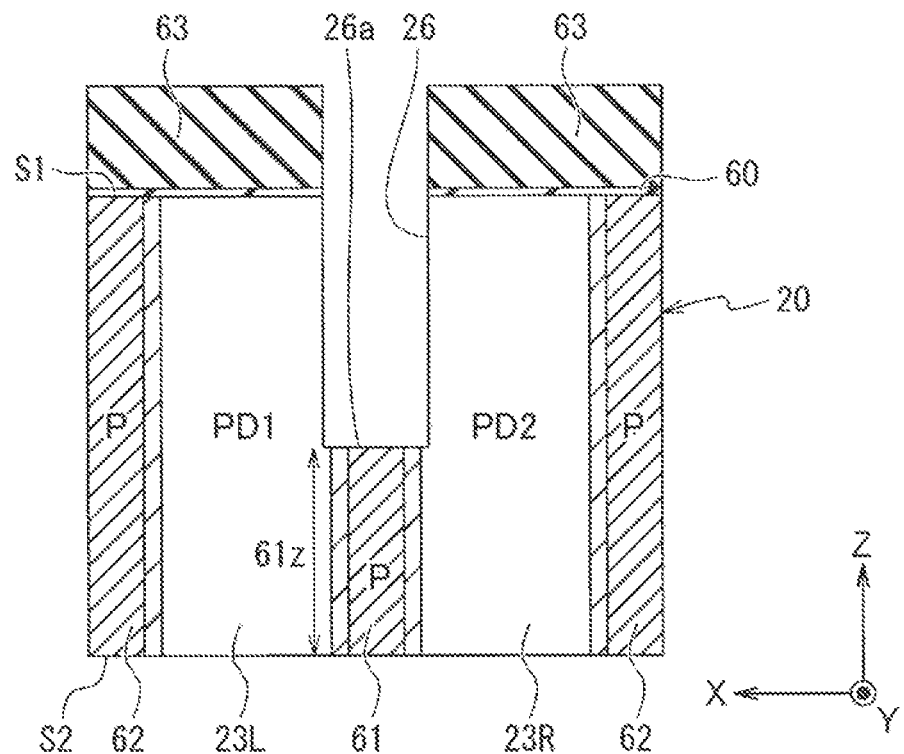
FIG. 10D is a process cross-sectional view subsequent to FIG. 10C.

Then, as illustrated in FIG. 10D, the groove 26 is formed in the semiconductor layer 20. More specifically, in the semiconductor layer 20 between the first photoelectric conversion portion 23L and the second photoelectric conversion portion 23R, the groove 26 is formed in the thickness direction of the semiconductor layer 20 from the first surface S1 side. At this time, the groove 26 is formed to overlap the first impurity region 61 between the first photoelectric conversion portion 23L and the second photoelectric conversion portion 23R in the thickness direction of the semiconductor layer 20. Then, the bottom portion 26a of the groove 26 reaches the first impurity region 61. Therefore, the portion of the semiconductor layer 20 in contact with the bottom portion 26a is the first impurity region 61, and the concentration of the p-type impurities is the first concentration.

A dry etching process is used to form the groove 26, and for example, a silicon nitride film ($Si_3N_4$ film) 63 is used as a hard mask 63 for etching. The dimensions of the groove 26 in the X direction and the Y direction are only required to be determined according to the design of the second portion 522. In addition, the dimension of the groove 26 in the Z direction is only required to be determined according to the design of how far the second portion 522 is separated from the transfer gate electrodes TRG1 and TRG2 in the Z direction.

Figure 10E:
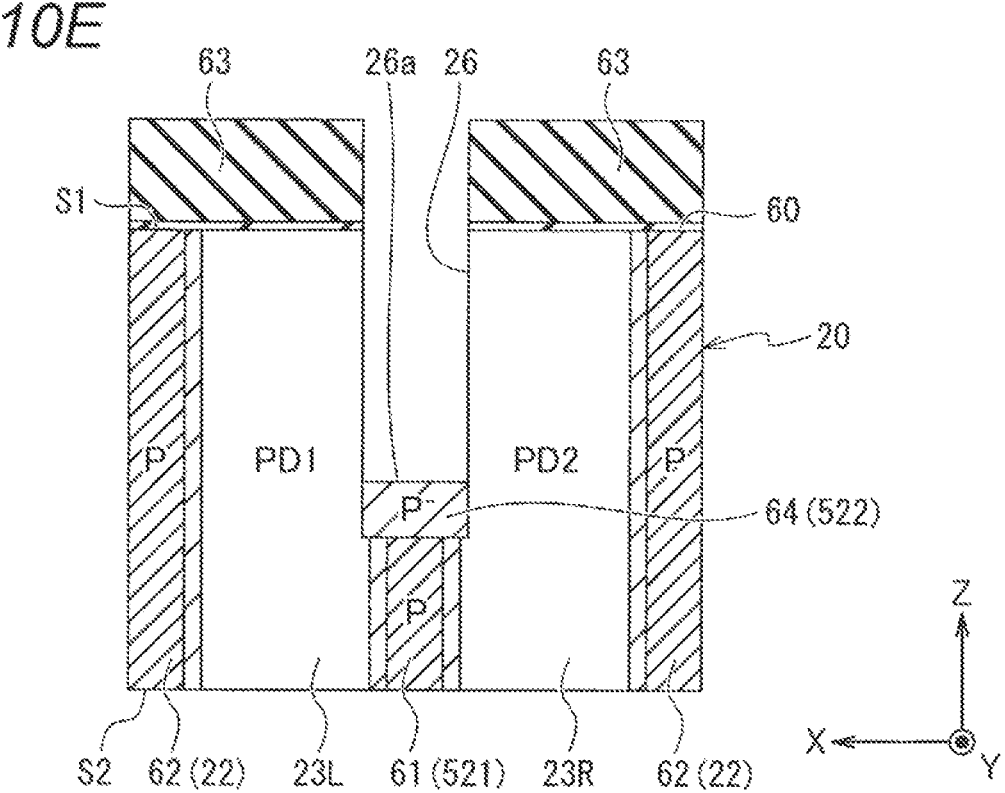
FIG. 10E is a process cross-sectional view subsequent to FIG. 10D.

Next, as illustrated in FIG. 10E, impurities are selectively implanted into the bottom portion 26a of the groove 26 from the first surface S1 side, and a second impurity region 64 (second portion 522) having the second concentration in which the impurity concentration is lower than the first concentration is selectively formed in the semiconductor layer 20 adjacent to the bottom portion 26a. This selective impurity implantation is achieved by implanting impurities in a state where there is the hard mask 63 provided for forming the groove 26. That is, the hard mask 63 used for forming the groove 26 is reused also in this step, and impurities are selectively implanted. In addition, the groove 26 itself is also provided to form the STI, but the second portion 522 is formed using the groove 26 before the step of embedding the insulating material in the groove 26. In this manner, the second portion 522 is formed by self-alignment using the step for forming the STI (first region 51).

In addition, in order to set the concentration of the p-type impurities in the second portion 522 to the second concentration, n-type impurities are implanted into the first impurity region 61 of the portion 64 in contact with the bottom portion 26a. Accordingly, the concentration of the p-type impurities is diluted from the first concentration to the second concentration. The second portion 522 is provided in a region shallow in the thickness direction as viewed from the bottom portion 26a. Therefore, the implantation energy for impurity implantation can be kept low.

Further, after this step, the first impurity region 61 maintaining the impurity concentration of the first concentration becomes the first portion 521 and the third region 53 not illustrated in FIG. 10E, and functions as an impurity isolation region. Furthermore, the first impurity region 62 maintaining the impurity concentration of the first concentration becomes the unit isolation portion 22 and functions as an impurity isolation region.

Figure 10F:
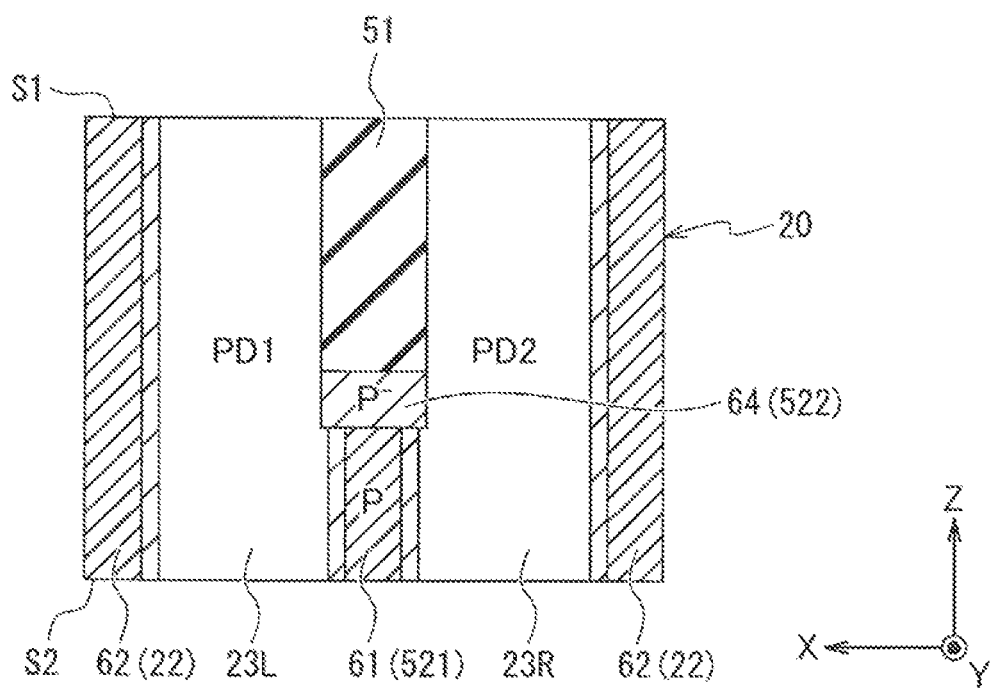
FIG. 10F is a process cross-sectional view subsequent to FIG. 10E.

Thereafter, as illustrated in FIG. 10F, the first region 51 is formed by embedding an insulating material such as silicon oxide in the groove 26. Then, the hard mask 63 is removed. Thereafter, the solid-state imaging device 1 illustrated in FIG. 5 is almost completed by performing necessary known manufacturing steps.

Main Effects of First Embodiment

Here, first, a conventional isolation portion 50' will be considered. The conventional isolation portion 50' is, for example, a P-type semiconductor region 306 that functions as a potential barrier, as described in Patent Document 2. In a case where the potential barrier (first potential barrier P1) of the conventional isolation portion 50' is made lower than the potential barrier (second potential barrier P2) of the transfer transistor, it is important to set the height of the first potential barrier P1. The setting of the height of the first potential barrier P1 will be described below with reference to FIGS. 11A to 11D.

Figure 11A:
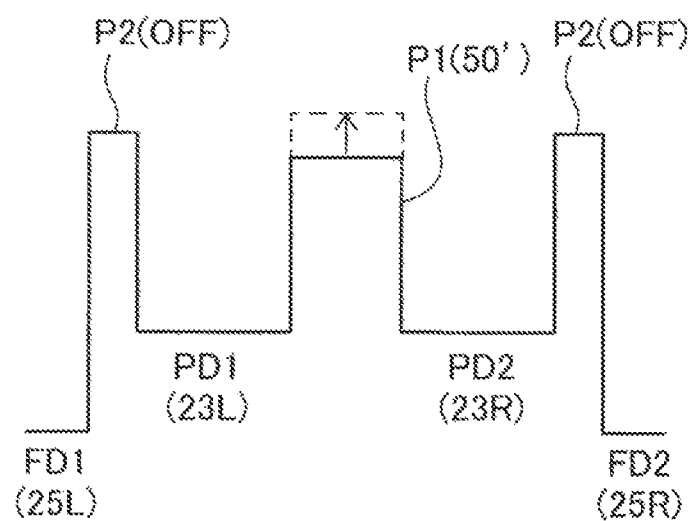
FIG. 11A is a schematic diagram illustrating a relationship of a potential distribution of each component in a case where a first potential barrier is set to be high in a conventional solid-state imaging device.
Figure 11B:
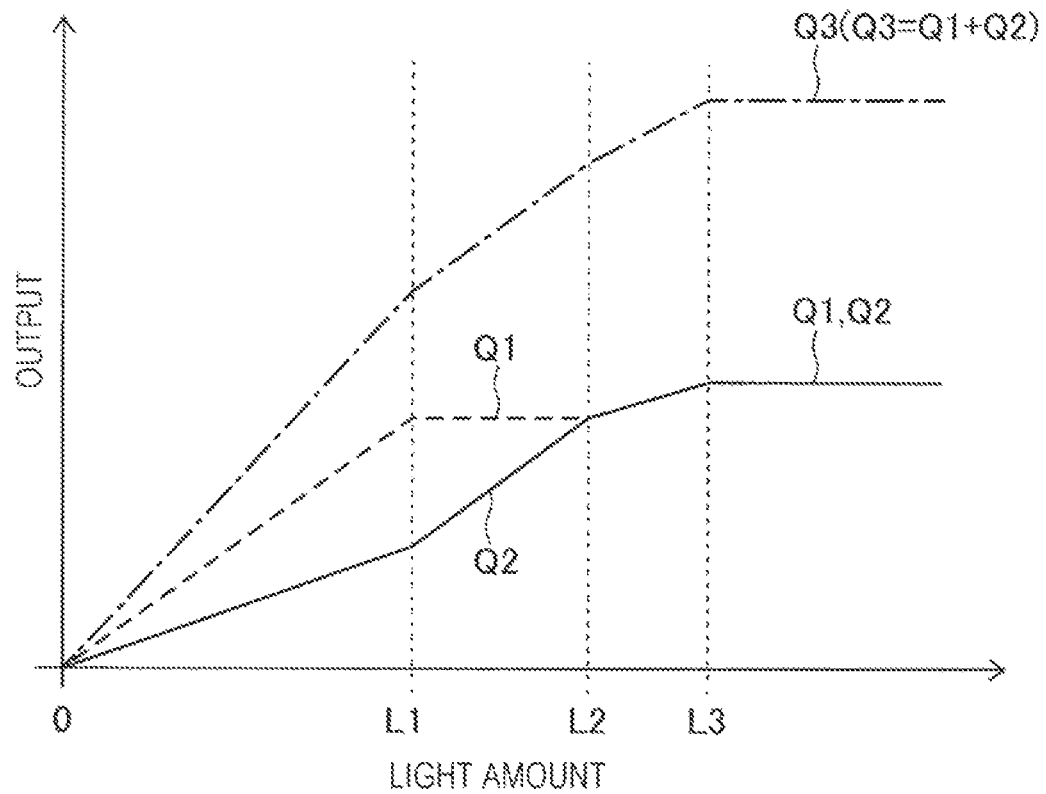
FIG. 11B is a graph illustrating the output of the photoelectric conversion portion with respect to the amount of incident light in a case where the first potential barrier fluctuates to become larger in the setting of the first potential barrier in FIG. 11A.

The first potential barrier P1 indicated by a solid line in FIG. 11A is set to be high. In this case, although the signal range (first range) in which phase difference detection can be performed illustrated in FIG. 11B can be widened, there has been a possibility that the pixel 3 that cannot maintain the linearity of the addition signal Q3 with respect to the light amount may occur due to manufacturing variations. More specifically, in the conventional manufacturing method, there has been a possibility that the first potential barrier P1 in FIG. 11A may rise to a position indicated by a broken line and exceed the second potential barrier P2 depending on the pixel 3 due to manufacturing variations. In such a pixel 3, as illustrated in FIG. 11B, linearity of the addition signal Q3 with respect to the light amount cannot be maintained. Therefore, in designing the height of the first potential barrier P1, it was necessary to provide a difference from the height of the second potential barrier P2 to some extent in consideration of process variations.

Furthermore, the pixel 3 that performs phase difference detection is provided over the entire pixel region 2A. Therefore, in all the plurality of pixels 3 provided in the pixel region 2A, it is necessary to obtain a phase difference for autofocus and further obtain the addition signal Q3 for image creation.

Although it is desired to widen the signal range in which phase difference detection can be performed by designing the first potential barrier P1 to be high, when the first potential barrier P1 is designed to be too high, there has been a possibility that the pixel 3 in which the linearity of the addition signal Q3 with respect to the light amount is deteriorated may occur in at least one of the pixel region 2A, the wafer surface, and the wafers due to manufacturing variations. Therefore, it was necessary to design the first potential barrier P1 to be low to some extent to prevent the occurrence of the pixel 3 in which the linearity of the addition signal Q3 with respect to the light amount is deteriorated. However, as a result, the signal range in which phase difference detection can be performed was narrowed as described below.

Figure 11C:
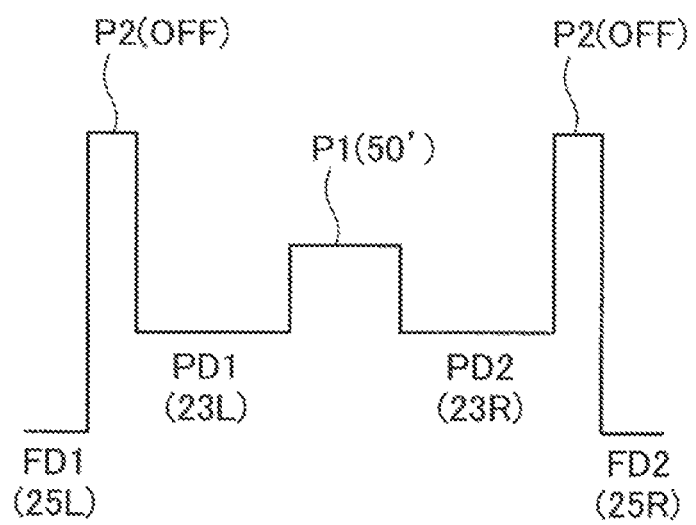
FIG. 11C is a schematic diagram illustrating a relationship of a potential distribution of each component in a case where the first potential barrier is set to be low in the conventional solid-state imaging device.
Figure 11D:
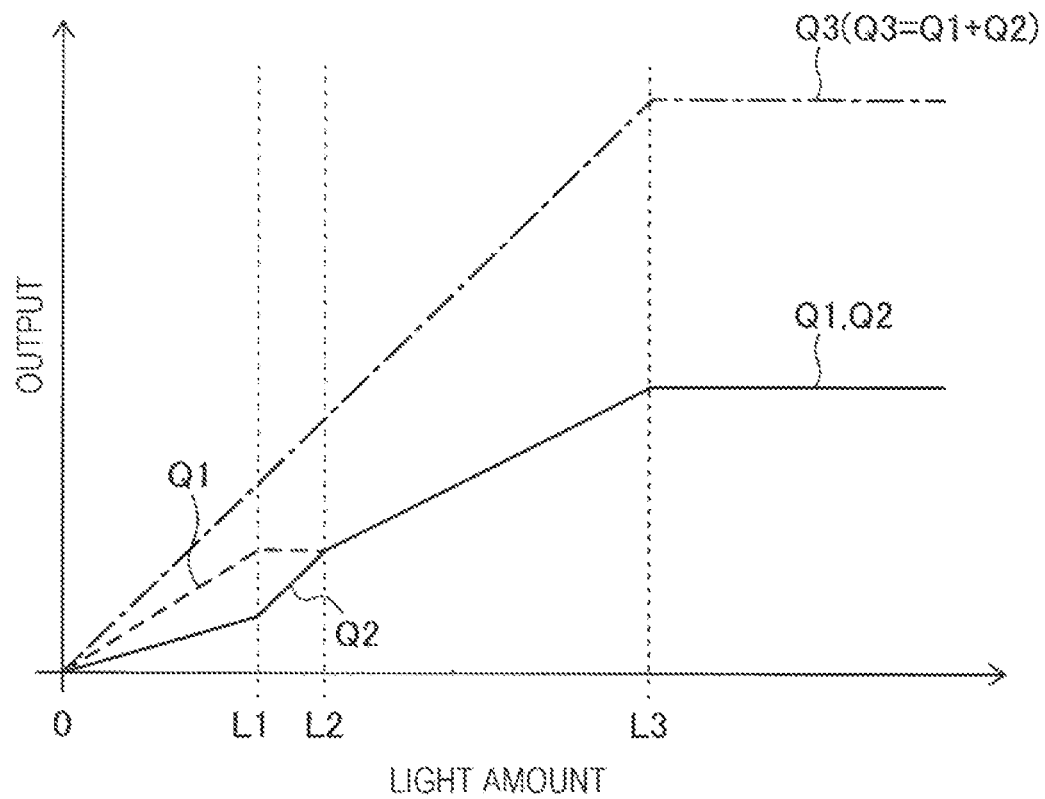
FIG. 11D is a graph illustrating the output of the photoelectric conversion portion with respect to the amount of incident light in the setting of the first potential barrier in FIG. 11C.

The conventional first potential barrier P1 illustrated in FIG. 11C is designed to be sufficiently low. In this case, even if the height of the first potential barrier P1 fluctuates due to manufacturing variations, the height does not exceed the height of the second potential barrier P2. Therefore, as illustrated in FIG. 11D, it is possible to suppress narrowing of the range of the addition signal Q3 in which linearity with respect to the light amount can be obtained in each of the pixels 3. However, on the other hand, the signal range (first range) in which phase difference detection can be performed was narrowed. Comparing FIG. 11B with FIG. 11D, it can be seen that the signal range (first range) in which phase difference detection can be performed is narrowed by designing the first potential barrier P1 to be low.

In the solid-state imaging device 1 according to the first embodiment, the variation in the second portion 522 of the isolation portion 50 is small. Accordingly, even in a case where the first potential barrier P1 is designed to be high, it is possible to suppress the occurrence of the pixel 3 in which the linearity of the addition signal Q3 with respect to the light amount is deteriorated. Furthermore, since the first potential barrier P1 can be designed to be high, it is possible to suppress narrowing of the signal range in which phase difference detection can be performed.

Furthermore, in the method for manufacturing the solid-state imaging device 1 according to the first embodiment, since the second portion 522 is formed in self-alignment, that is, by using the step for forming the first region 51, the variation in the second portion 522 can be reduced, and the variation in the first potential barrier P1 is also reduced. More specifically, in the first embodiment, impurities are implanted into the bottom portion 26a of the groove 26 using the groove 26 and the hard mask 63 for forming the groove 26. Since the formation accuracy of the groove 26 is higher than the accuracy of normal impurity implantation, the second portion 522 can be formed with high accuracy. In addition, since impurities are implanted using the groove 26, the second portion 522 can be formed at a position shallower than the bottom portion 26a of the groove 26. Therefore, implantation energy can be kept to be low as compared with a case where impurities are implanted into a deep position of the semiconductor layer 20 in a state where the groove 26 is not provided. Furthermore, since impurities can be more accurately implanted, the impurity concentration, formation position, and range of the second portion 522 can be stably controlled. Accordingly, variations in the first potential barrier P1 among the plurality of pixels 3 can be suppressed.

In addition, the P-type semiconductor region 306 described in Patent Document 2 extends in the thickness direction from the element formation surface along the photoelectric conversion portion. For example, if the pixel is miniaturized, the first transfer transistor 24L and the second transfer transistor 24R come close to the isolation portion 50' on the element formation surface, that is, the distance between the first transfer transistor 24L and the second transfer transistor 24R and the isolation portion 50' decreases. Then, there is a possibility that the height of the first potential barrier P1 of the isolation portion 50' will change due to the influence of modulation when the first transfer transistor 24L and the second transfer transistor 24R are turned on and off. Hereinafter, a case where the first potential barrier P1 of the conventional isolation portion 50' is affected by the modulation of the first transfer transistor 24L and the second transfer transistor 24R will be described with reference to FIGS. 9A and 12A to 12C.

Figure 12A:
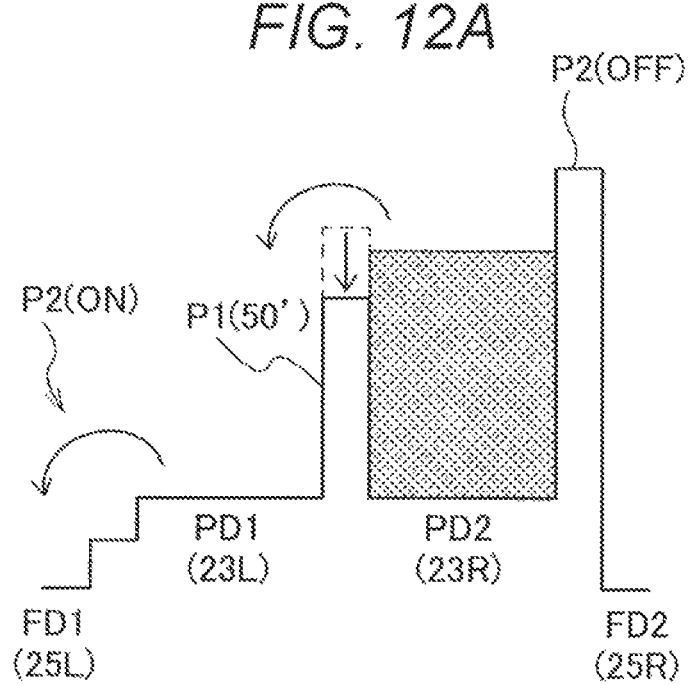
FIG. 12A is a schematic diagram illustrating a change in a potential barrier and movement of a signal charge in a case where a first transfer transistor is turned on and off in the conventional solid-state imaging device.
Figure 12B:
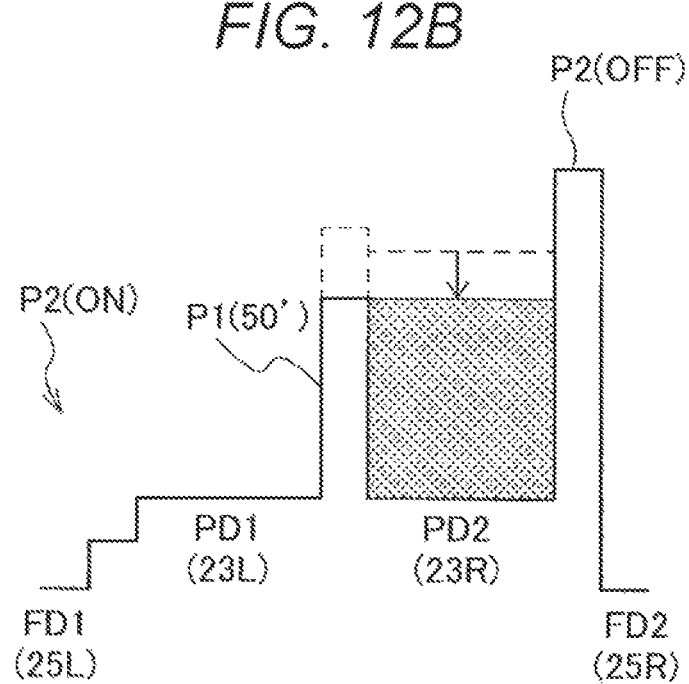
FIG. 12B is a schematic diagram illustrating a change in the potential barrier and movement of the signal charge subsequent to FIG. 12A.
Figure 12C:
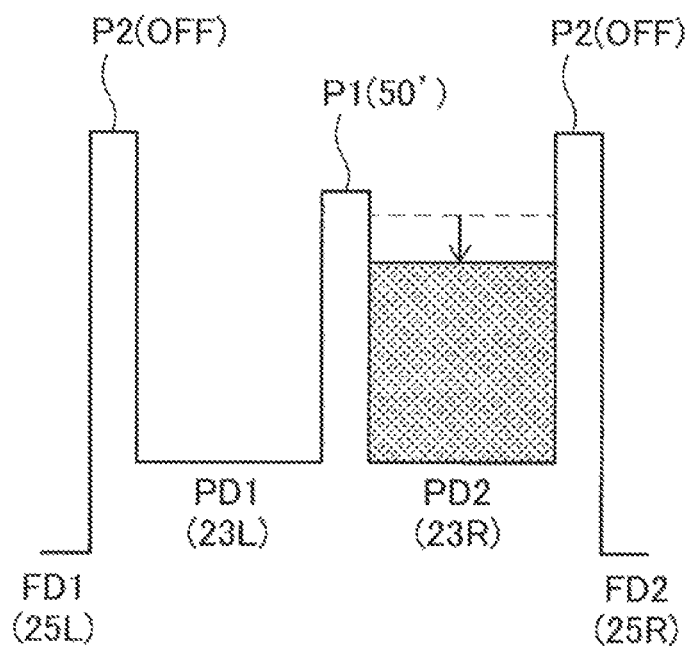
FIG. 12C is a schematic diagram illustrating a change in the potential barrier and movement of the signal charge subsequent to FIG. 12B.

If the first transfer transistor 24L is turned on from the state of FIG. 9A, the second potential barrier P2 corresponding to the first transfer transistor 24L is lowered, and the signal charge accumulated in the first photoelectric conversion portion 23L flows to the first charge accumulation region 25L. The first potential barrier P1 of the isolation portion 50' is also affected by the modulation of the first transfer transistor 24L, and the height of the barrier decreases as indicated by an arrow in FIG. 12A. Since the first potential barrier P1 is lowered, some of the signal charges accumulated in the second photoelectric conversion portion 23R exceed the first potential barrier P1 and flow to the first charge accumulation region 25L as illustrated in FIG. 12B. Then, the first transfer transistor 24L is turned off, and the first potential barrier P1 and the second potential barrier P2 return to the original heights (heights illustrated in FIG. 9A). However, the amount of the signal charge accumulated in the second photoelectric conversion portion 23R decreases because some of the signal charges have flowed out as indicated by an arrow in FIG. 12C.

In this way, in the conventional isolation portion 50', the signal charges accumulated in the first photoelectric conversion portion 23L and the signal charges accumulated in the second photoelectric conversion portion 23R are mixed, and the accuracy of the phase difference detection may be deteriorated or the phase difference detection may not be possible. The amount of signal charge that does not reliably exceed the first potential barrier P1 is the amount after the decrease illustrated in FIG. 12C. This is an amount smaller than the maximum amount that can be independently accumulated by the first photoelectric conversion portion 23L and the second photoelectric conversion portion 23R. Since the first potential barrier P1 is thus affected by the modulation of the transfer transistor, the signal range (light amount range) in which phase difference detection can be performed was narrowed.

On the other hand, the isolation portion 50 included in the solid-state imaging device 1 according to the first embodiment includes the first region 51 formed by an insulating material extending in the thickness direction of the semiconductor layer 20 from the first surface S1 side, and the second portion 522 provided on the second surface S2 side of the first region 51 and functioning as an overflow path.

With the above-described configuration, the second portion 522 can be separated from the transfer gate electrodes TRG1 and TRG2 in the thickness direction of the semiconductor layer 20. In particular, in a case where the pixel 3 is miniaturized, the dimension of the pixel in the X-Y plane becomes small, and thus it may be difficult to provide the second portion 522 and the transfer gate electrodes TRG1 and TRG2 apart from each other in the direction along the X-Y plane. In the first embodiment, since both can be provided apart from each other in the thickness direction of the semiconductor layer 20, the distance between them can be increased. Accordingly, the first potential barrier P1 of the isolation portion 50 is less affected by the modulation of the first transfer transistor 24L and the second transfer transistor 24R. Accordingly, it is possible to suppress a decrease in the accuracy of the phase difference detection. Furthermore, since the first potential barrier P1 is less affected by modulation, the height of the barrier can be used in a state close to the design, and it is possible to suppress narrowing of the signal range in which phase difference detection can be performed.

Here, in general, the height of the potential barrier is controlled by the concentration of impurities. Therefore, it is required to control the impurity concentration in the overflow path. However, in the conventional method, since impurities are implanted from the surface of the semiconductor layer 20 (either the first surface S1 or the second surface S2), it was particularly difficult to accurately form an overflow path at a position deep from the surface of the semiconductor layer 20 in the thickness direction. In order to implant impurities at a deep position in the thickness direction, it was necessary to increase implantation energy. Therefore, it was necessary to increase the thickness of the resist provided for selective implantation. If a thick resist is provided, the variation in the line width of the resist increases, or the cross-sectional shape of the resist is tapered. Due to such characteristics of the thick resist, there has been a possibility that the amount of impurities implanted into the overflow path may vary, and the position and range where the overflow path is formed may also vary.

In the method for manufacturing the solid-state imaging device 1 according to the first embodiment, in order to provide the second portion 522 of the isolation portion 50 at a deep position of the semiconductor layer 20, first, the groove 26 is formed, impurities are implanted using the groove 26 to form the second portion 522, and then, an insulating material is embedded in the groove 26 to form the first region 51. Therefore, the second portion 522 can be accurately formed at a deep position in the thickness direction of the semiconductor layer 20. This is because since the second portion 522 is formed at a shallow position as viewed from the bottom portion 26a of the groove 26, the implantation energy can be kept to be low, and furthermore, it is not necessary to provide a thick resist layer, and thus the impurity concentration is less likely to vary. Furthermore, since the formation accuracy of the groove 26 is higher than the accuracy of impurity implantation, the dimension of the groove 26 in the Z direction and the dimensions of the groove 26 (bottom portion 26a) in the X direction and the Y direction can be accurately controlled, and the second portion 522 can be accurately formed at a position corresponding to the groove 26 (bottom portion 26a). Accordingly, the second portion 522 having a small variation in the first potential barrier P1 can be formed even at a deep position in the thickness direction of the semiconductor layer 20.

Figure 13:
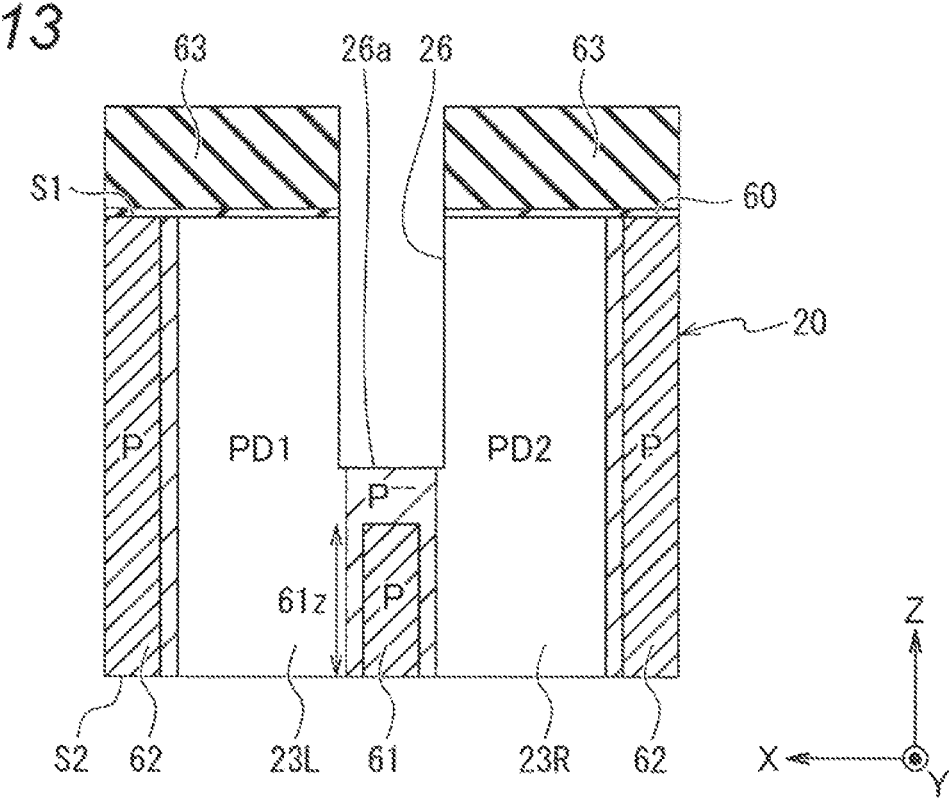
FIG. 13 is a process cross-sectional view illustrating another method for manufacturing the solid-state imaging device according to the first embodiment of the present technology.

Note that, in the first embodiment, when impurities are implanted to form the second portion 522, as illustrated in FIG. 10E, n-type impurities are implanted into the p-type first impurity region 61, and the concentration of the p-type impurities in the first impurity region 61 is relatively diluted from the first concentration to the second concentration, but the present disclosure is not limited thereto. For example, as illustrated in FIG. 13, the first impurity region 61 may be formed to have a small depth 61z in the Z direction, and p-type impurities may be implanted into the semiconductor layer 20 between the first impurity region 61 and the groove 26 to form the second portion 522 in which the impurity concentration is the second concentration. In this manner, the second portion 522 can be formed by a plurality of methods. Note that the second concentration (concentration of the p-type impurities) in the case of the manufacturing method illustrated in FIG. 10D and the like is a net impurity concentration obtained by subtracting the n-type impurity concentration from the p-type impurity concentration. Such a second concentration is the same even if the second portion 522 is formed by a different manufacturing method, for example, a manufacturing method as illustrated in FIG. 13. That is, the impurity concentrations such as the first concentration and the second concentration here are concentrations in consideration of holes and electrons that cancel each other. Further, in any manufacturing method, the function of the second portion 522 as the overflow path is the same.

Second Embodiment

A second embodiment of the present technology illustrated in FIGS. 14A to 14D will be described below. The solid-state imaging device 1 according to the second embodiment is different from the solid-state imaging device 1 according to the first embodiment described above in that a part of the unit isolation portion 22 is formed by an insulating material, and other configurations of the solid-state imaging device 1 are basically similar to those of the solid-state imaging device 1 according to the first embodiment described above. Note that the components already described are denoted by the same reference numerals, and the description thereof will be omitted.

<Unit Isolation Portion>

The solid-state imaging device 1 includes a unit isolation portion 22A instead of the unit isolation portion 22. The unit isolation portion 22A is formed by a semiconductor region into which impurities exhibiting the first conductivity type are implanted, and includes a unit isolation portion 22A1 which is a portion functioning as an impurity isolation region that suppresses the movement of signal charges, and a unit isolation portion 22A2 which is a portion formed by an insulating material. In the thickness direction of the semiconductor layer 20, the unit isolation portion 22A has the unit isolation portion 22A1 closer to the first surface S1 side and the unit isolation portion 22A2 closer to the second surface S2 side.

The unit isolation portion 22A1 functions as an impurity isolation region that suppresses movement of signal charges between two adjacent photoelectric conversion units 21. The unit isolation portion 22A1 is formed by a semiconductor region into which, for example, p-type impurities are implanted as the impurities exhibiting the first conductivity type. The concentration of the p-type impurities in the unit isolation portion 22A1 is the first concentration.

The unit isolation portion 22A2 is formed by an insulating material embedded (provided) in a groove formed in the semiconductor layer 20, and functions as an insulator isolation region that suppresses movement of signal charges between two adjacent photoelectric conversion units 21. Here, the groove is provided in the semiconductor layer 20 in the range of a depth d from the second surface S2 side of the semiconductor layer 20. That is, the unit isolation portion 22A2 is a shallow trench isolation (STI) provided from the second surface S2 side of the semiconductor layer 20 to the depth d in the thickness direction of the semiconductor layer 20. The insulating material is, for example, silicon oxide ($SiO_2$).

Figure 14A:
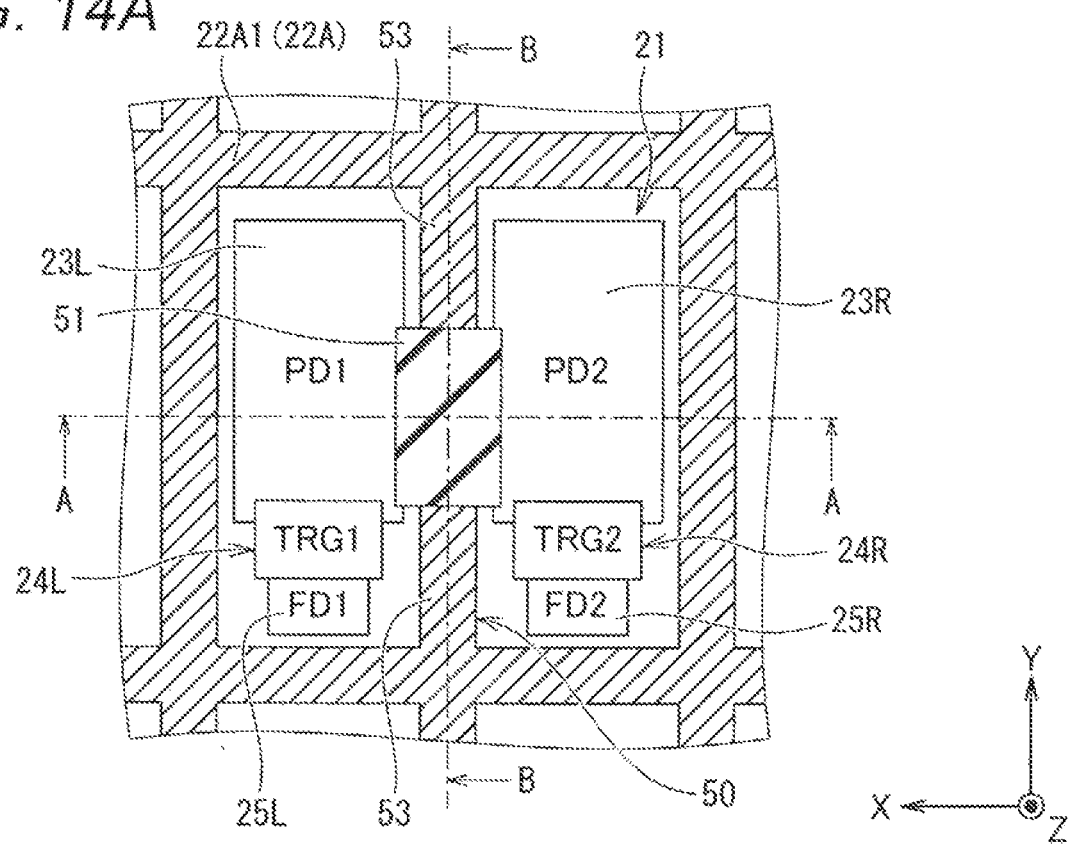
FIG. 14A is a transverse cross-sectional view illustrating a relative relationship between respective components when a pixel of a solid-state imaging device according to a second embodiment of the present technology is viewed in a cross section on a first plane.
Figure 14B:
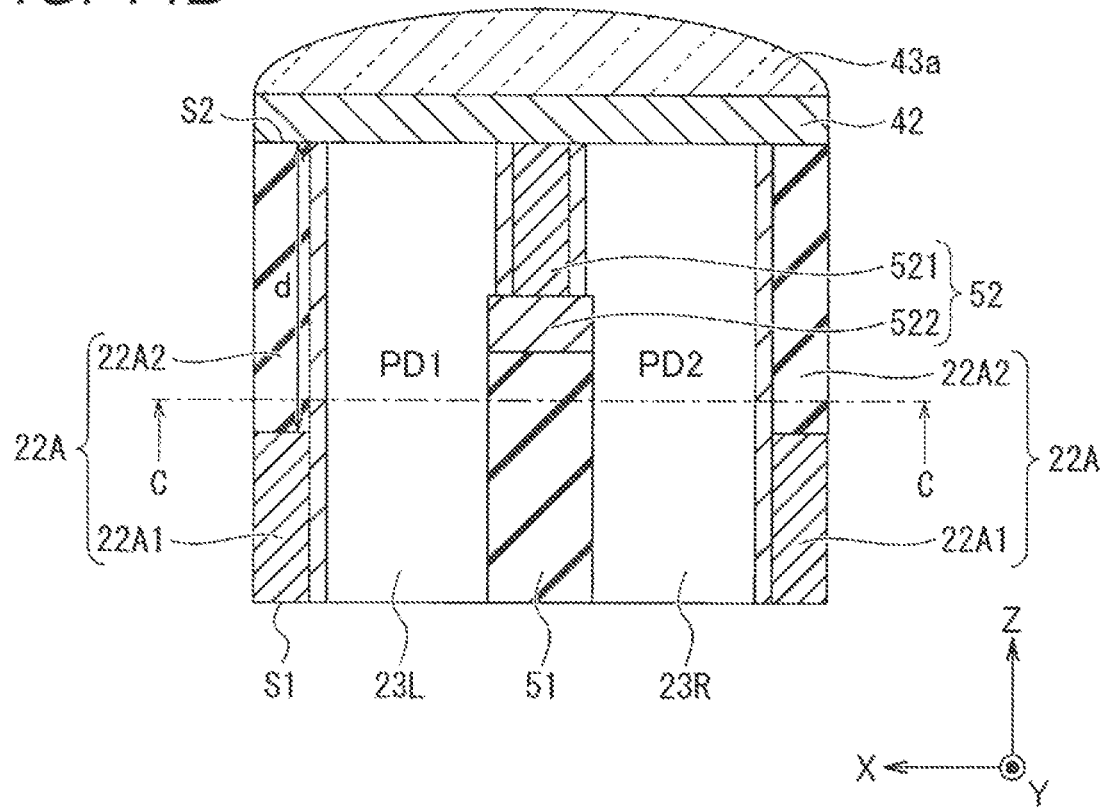
FIG. 14B is a longitudinal cross-sectional view illustrating a main part of the cross-sectional structure along line A-A in FIG. 14A.
Figure 14C:
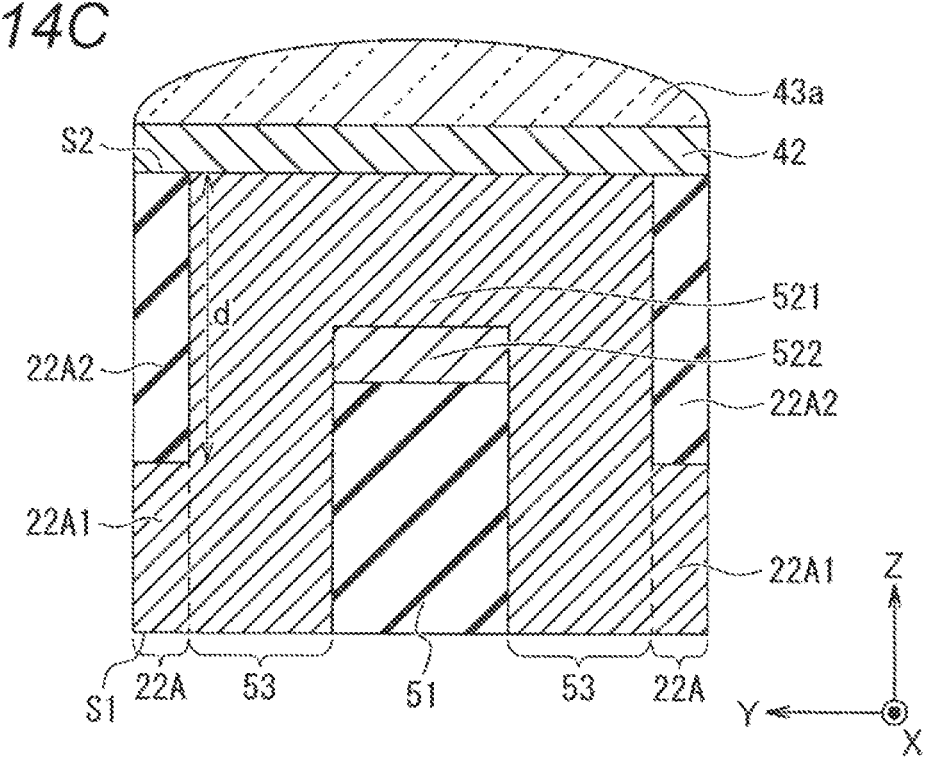
FIG. 14C is a longitudinal cross-sectional view illustrating a main part of the cross-sectional structure along line B-B in FIG. 14A.
Figure 14D:
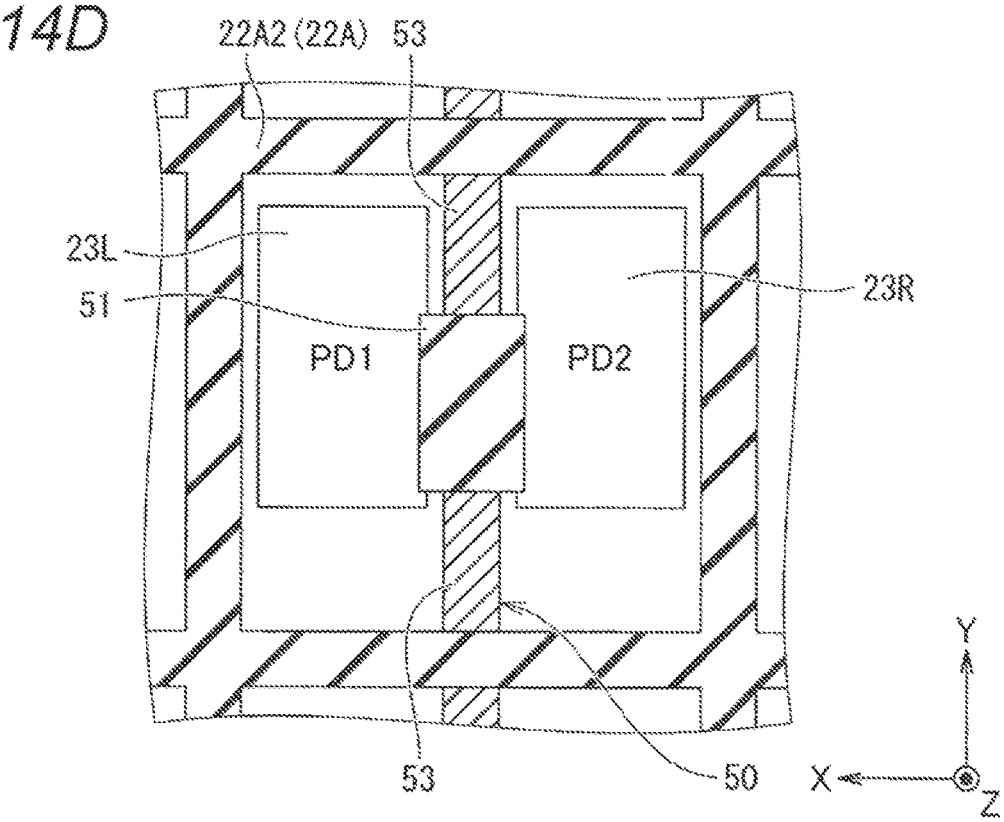
FIG. 14D is a transverse cross-sectional view illustrating a cross-sectional structure along line C-C in FIG. 14B.

In addition, as illustrated in FIG. 14D, a portion of the photoelectric conversion unit 21 closer to the second surface S2 side in the thickness direction of the semiconductor layer 20 is surrounded by the unit isolation portion 22A2. More specifically, in the photoelectric conversion unit 21, a range from the second surface S2 to the depth d in the thickness direction of the semiconductor layer 20 is surrounded by the unit isolation portion 22A2.

Main Effects of Second Embodiment

Even with the solid-state imaging device 1 according to the second embodiment, effects similar to those of the solid-state imaging device 1 according to the first embodiment described above can be obtained.

Furthermore, the solid-state imaging device 1 according to the second embodiment has the unit isolation portion 22A2 formed by an insulating material near the second surface S2 side, and the portion of the photoelectric conversion unit 21 closer to the second surface S2 side is surrounded by the unit isolation portion 22A2. Therefore, it is possible to further suppress leakage of the generated signal charge to the adjacent photoelectric conversion unit 21, and to suppress deterioration in image quality due to color mixture.

Note that the relative relationship between the dimension in the Z direction of the unit isolation portion 22A1 and the dimension in the Z direction of the unit isolation portion 22A2 is not limited to the illustrated relationship.

Third Embodiment

A third embodiment of the present technology illustrated in FIGS. 15A to 15D will be described below. The solid-state imaging device 1 according to the third embodiment is different from the solid-state imaging device 1 according to the first embodiment described above in that a part of the third region 53 of the isolation portion 50 is formed by an insulating material, and that the unit isolation portion 22A of the second embodiment is included instead of the unit isolation portion 22. Other configurations of the solid-state imaging device 1 are basically similar to those of the solid-state imaging device 1 according to the first embodiment described above. Note that the components already described are denoted by the same reference numerals, and the description thereof will be omitted.

<Isolation Portion>

The solid-state imaging device 1 includes an isolation portion 50B instead of the isolation portion 50. The isolation portion 50B is provided in the same region as the isolation portion 50 of the first embodiment in the semiconductor layer 20. The isolation portion 50B includes a first region 51, a second region 52, and a third region 53B. The third region 53B is formed by a semiconductor region into which impurities exhibiting the first conductivity type are implanted, and includes a third region 53B1 which is a portion functioning as an impurity isolation region that suppresses the movement of signal charges, and a third region 53B2 which is a portion formed by an insulating material. In the thickness direction of the semiconductor layer 20, the third region 53B has the third region 53B1 closer to the first surface S1 side and the third region 53B2 closer to the second surface S2 side.

The third region 53B1 functions as an impurity isolation region that suppresses movement of signal charges. The third region 53B1 is formed by a semiconductor region into which, for example, p-type impurities are implanted as the impurities exhibiting the first conductivity type. The concentration of the p-type impurities in the third region 53B1 is the first concentration.

The third region 53B2 is formed by an insulating material embedded (provided) in a groove formed in the semiconductor layer 20, and functions as an insulator isolation region that suppresses movement of signal charges. Here, the groove is provided in the semiconductor layer 20 in the range of a depth d from the second surface S2 side of the semiconductor layer 20. That is, the third region 53B2 is a shallow trench isolation (STI) provided from the second surface S2 side of the semiconductor layer 20 to the depth d in the thickness direction of the semiconductor layer 20. The insulating material is, for example, silicon oxide ($SiO_2$).

Figure 15A:
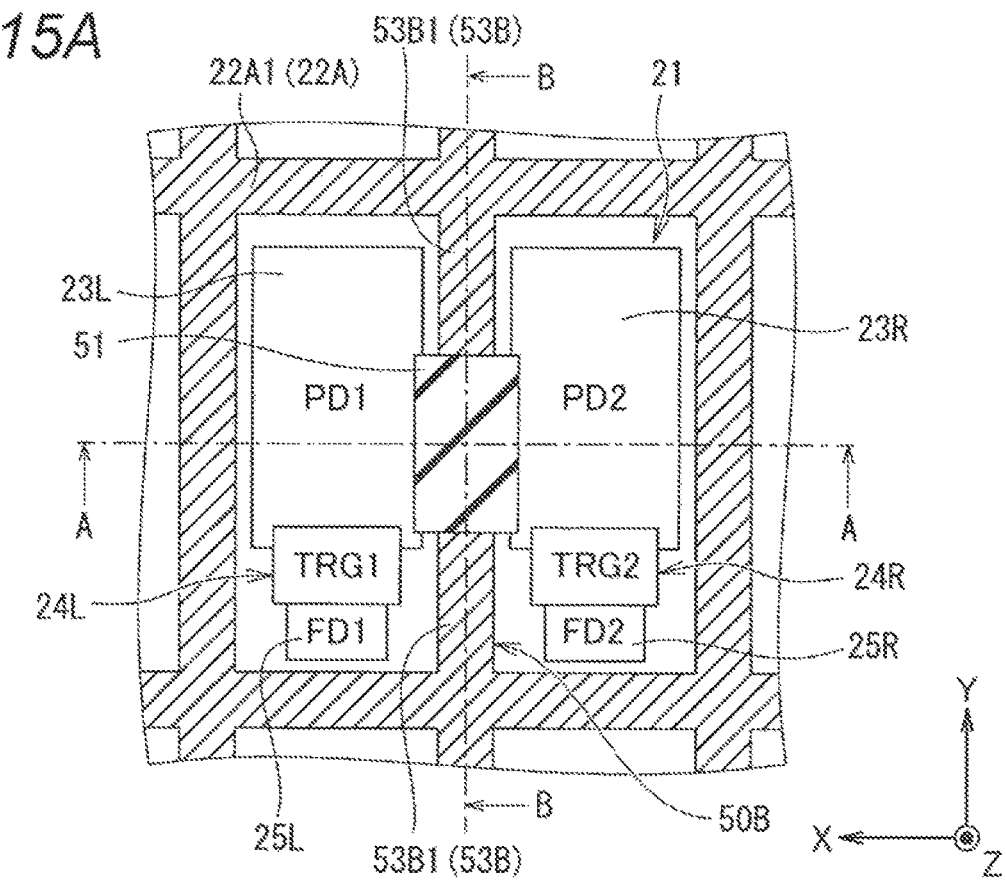
FIG. 15A is a transverse cross-sectional view illustrating a relative relationship between respective components when a pixel of a solid-state imaging device according to a third embodiment of the present technology is viewed in a cross section on a first plane.
Figure 15B:
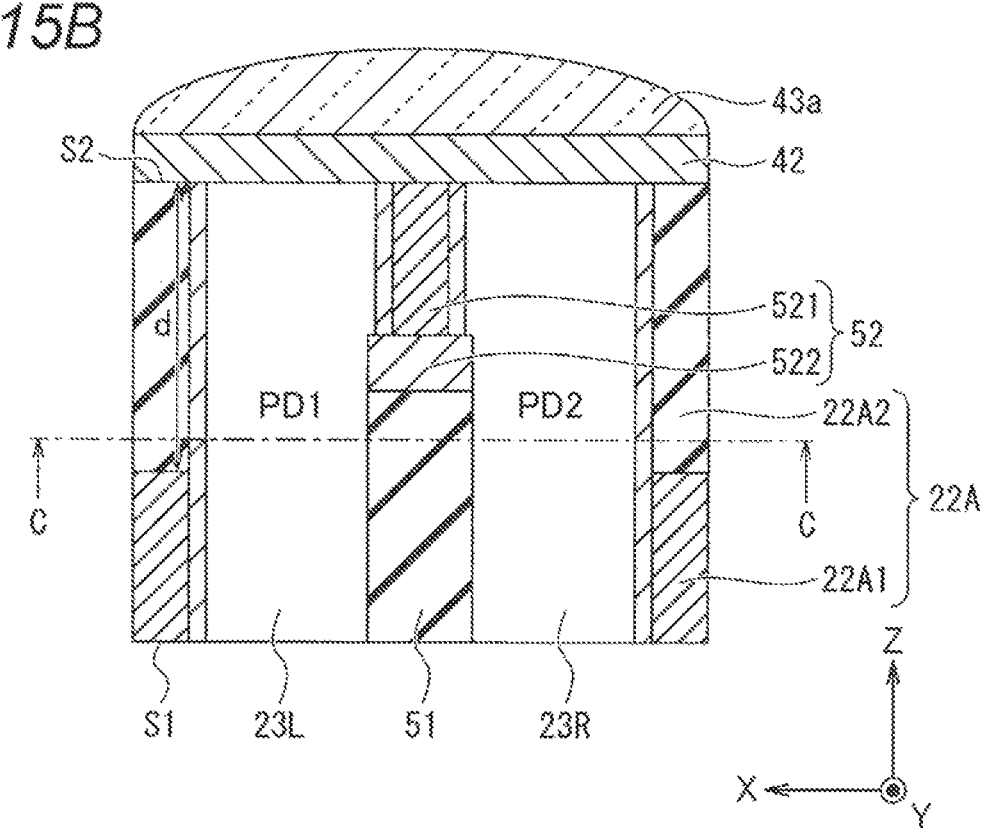
FIG. 15B is a longitudinal cross-sectional view illustrating a main part of the cross-sectional structure along line A-A in FIG. 15A.
Figure 15C:
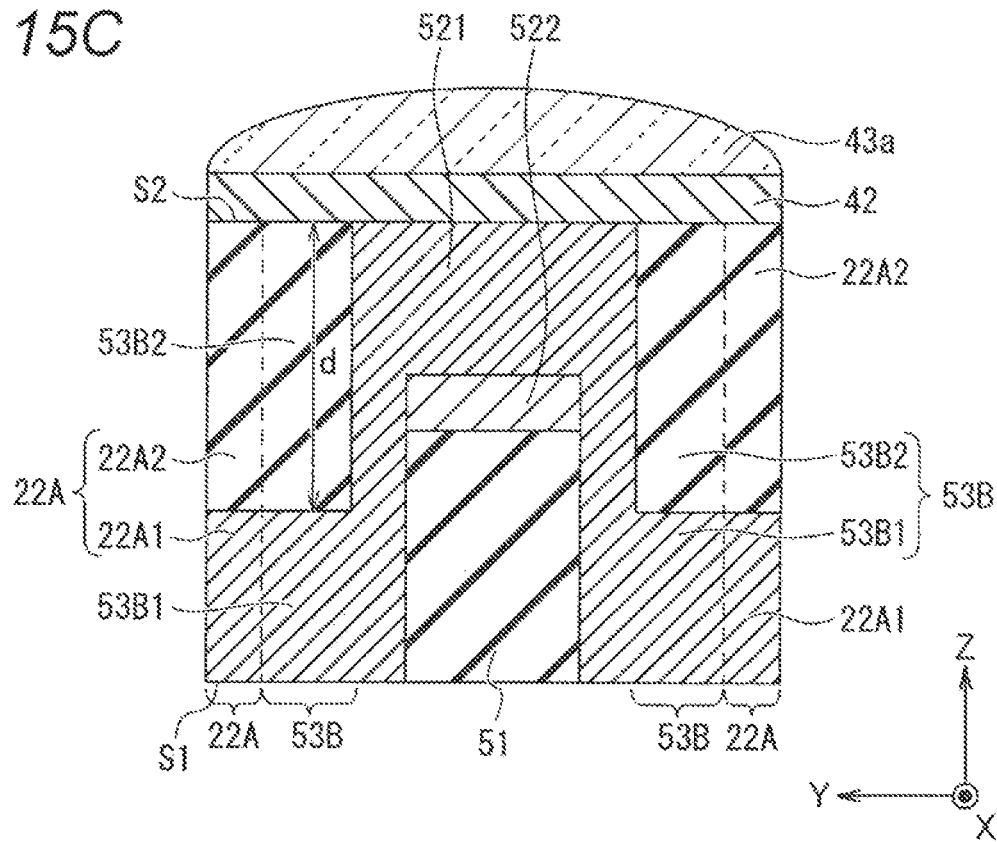
FIG. 15C is a longitudinal cross-sectional view illustrating a main part of the cross-sectional structure along line B-B in FIG. 15A.
Figure 15D:
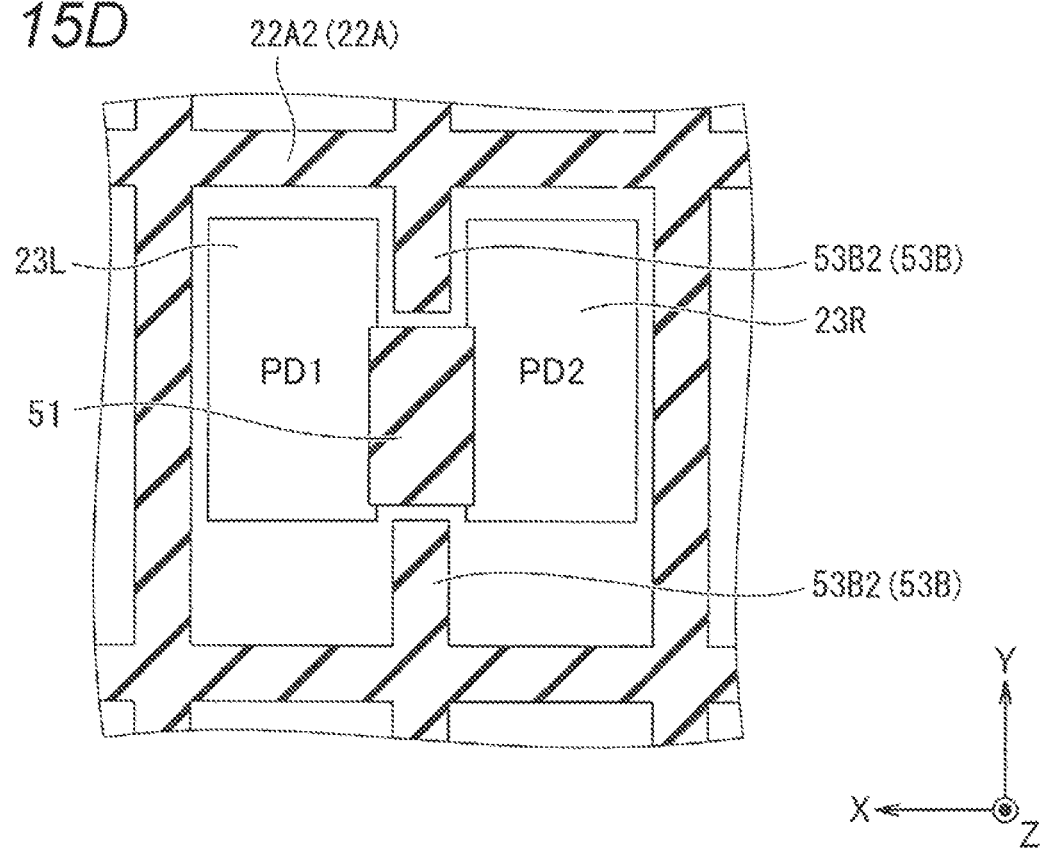
FIG. 15D is a transverse cross-sectional view illustrating a cross-sectional structure along line C-C in FIG. 15B.

Further, as illustrated in FIGS. 15C and 15D, the third region 53B2 is formed to the depth d integrally with the unit isolation portion 22A2. Then, as illustrated in FIG. 15D, the third region 53B2 protrudes from the unit isolation portion 22A2 in a range from the second surface S2 to the depth d in the thickness direction of the semiconductor layer 20.

Main Effects of Third Embodiment

Even with the solid-state imaging device 1 according to the third embodiment, effects similar to those of the solid-state imaging device 1 according to the first embodiment described above can be obtained.

Further, in a region other than the second portion 522 functioning as an overflow path in the isolation portion 50B, it is preferable to suppress movement of signal charges between the first photoelectric conversion portion 23L and the second photoelectric conversion portion 23R as much as possible. Since the solid-state imaging device 1 according to the third embodiment includes the third region 53B2 formed by an insulating material, it is possible to further suppress movement of the generated signal charges between the first photoelectric conversion portion 23L and the second photoelectric conversion portion 23R via the third region 53B. Accordingly, it is possible to improve the phase difference detection accuracy without deteriorating color mixing occurring between the first photoelectric conversion portion 23L and the second photoelectric conversion portion 23R in the photoelectric conversion unit 21.

Furthermore, the isolation portion 50B of the solid-state imaging device 1 according to the third embodiment has the third region 53B2 formed by an insulating material near the second surface S2 side. Therefore, reflection and scattering of light condensed by the microlens 43a can be suppressed, and color mixing between the first photoelectric conversion portion 23L and the second photoelectric conversion portion 23R can be suppressed.

Fourth Embodiment

Figure 16A:
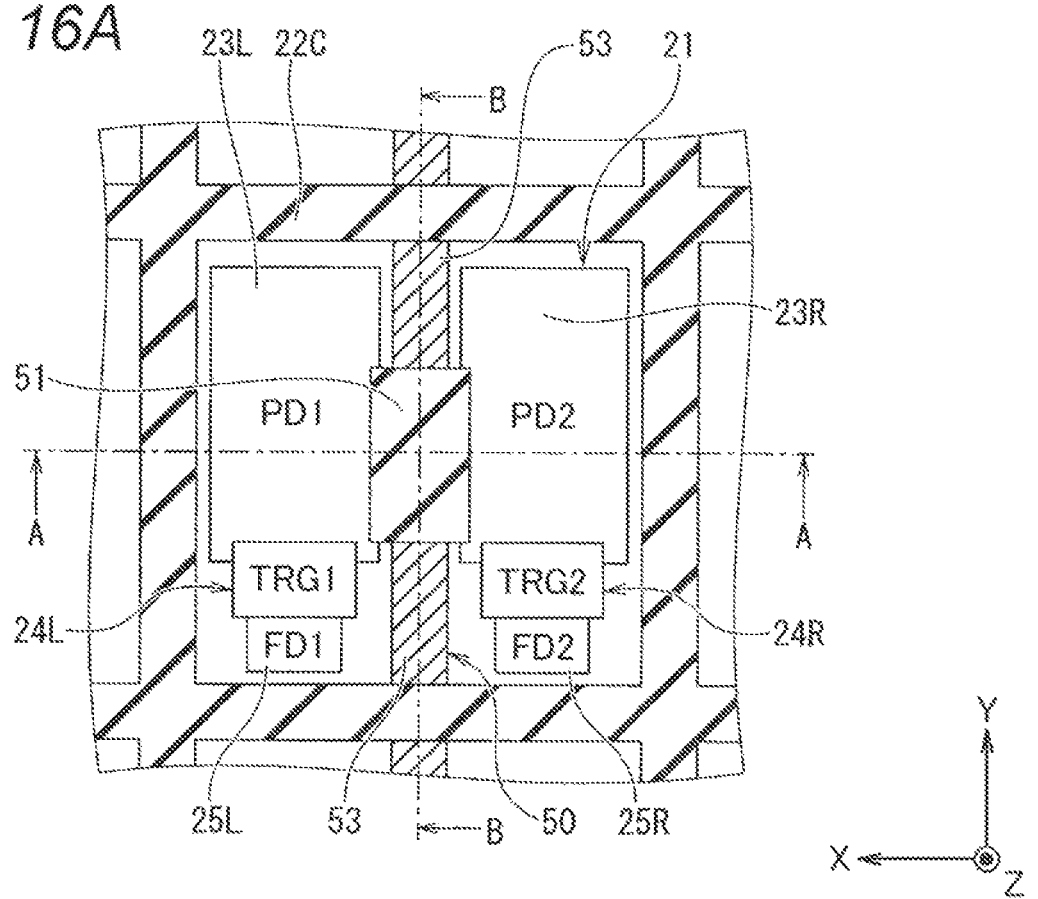
FIG. 16A is a transverse cross-sectional view illustrating a relative relationship between respective components when a pixel of a solid-state imaging device according to a fourth embodiment of the present technology is viewed in a cross section on a first plane.
Figure 16B:
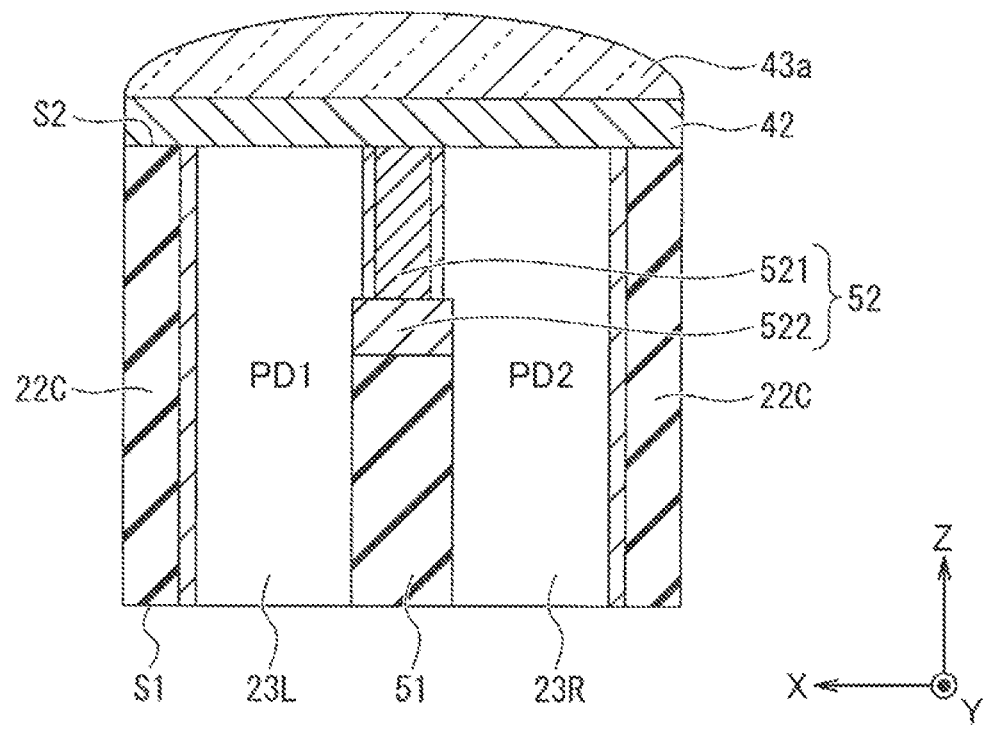
FIG. 16B is a longitudinal cross-sectional view illustrating a main part of the cross-sectional structure along line A-A in FIG. 16A.
Figure 16C:
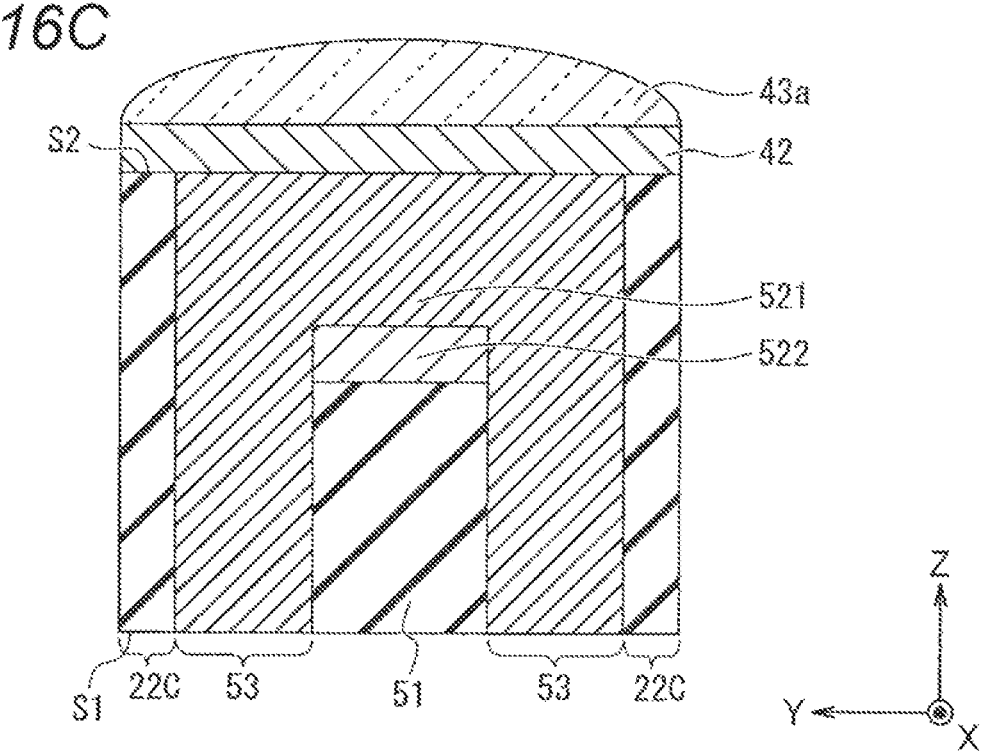
FIG. 16C is a longitudinal cross-sectional view illustrating a main part of the cross-sectional structure along line B-B in FIG. 16A.

A fourth embodiment of the present technology illustrated in FIGS. 16A to 16C will be described below. The solid-state imaging device 1 according to the fourth embodiment is different from the solid-state imaging device 1 according to the first embodiment described above in that the entire unit isolation portion 22 is formed by an insulating material, and other configurations of the solid-state imaging device 1 are basically similar to those of the solid-state imaging device 1 according to the first embodiment described above. Note that the components already described are denoted by the same reference numerals, and the description thereof will be omitted.

<Unit Isolation Portion>

The solid-state imaging device 1 includes a unit isolation portion 22C instead of the unit isolation portion 22. In the thickness direction of the semiconductor layer 20, the unit isolation portion 22C is formed by an insulating material provided from one of the second surface S2 and the first surface S1 to the other. The unit isolation portion 22C is formed by an insulating material embedded (provided) in a groove formed in the semiconductor layer 20, and functions as an insulator isolation region that suppresses movement of signal charges between two adjacent photoelectric conversion units 21. Here, the groove is provided from one of the second surface S2 and the first surface S1 of the semiconductor layer 20 to the other. That is, the unit isolation portion 22C is a full trench isolation (FTI) provided in the semiconductor layer 20. The insulating material is, for example, silicon oxide (SiO$_2$).

Main Effects of Fourth Embodiment

Even with the solid-state imaging device 1 according to the fourth embodiment, effects similar to those of the solid-state imaging device 1 according to the first embodiment described above can be obtained.

Furthermore, in the solid-state imaging device 1 according to the fourth embodiment, the outer peripheral portion of the photoelectric conversion unit 21 is insulated and isolated by FTI. Therefore, the adjacent photoelectric conversion units 21 are electrically completely isolated from each other, that is, the potential barrier formed between the adjacent photoelectric conversion units 21 by the FTI is increased. Therefore, it is possible to suppress occurrence of charge overflow (blooming) between the photoelectric conversion units 21, thereby suppressing image quality deterioration. In addition, since the potential barrier formed between the photoelectric conversion units 21 is increased, the second potential barrier P2 that is the potential barrier of the transfer transistor can also be increased. If the potential barrier P2 can be increased, the first potential barrier P1 between the first photoelectric conversion portion 23L and the second photoelectric conversion portion 23R can also be increased. Therefore, both the signal range in which phase difference detection can be performed and the signal range in which the image formation is performed can be enlarged.

Fifth Embodiment

Figure 17A:
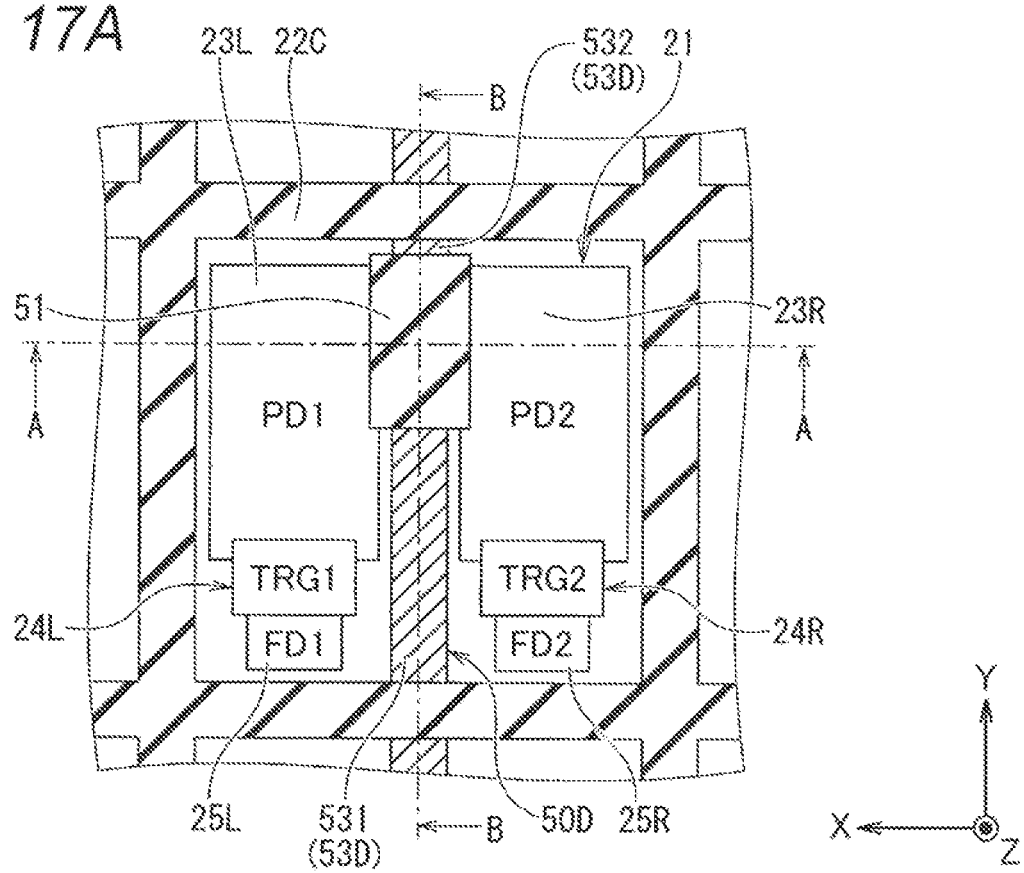
FIG. 17A is a transverse cross-sectional view illustrating a relative relationship between respective components when a pixel of a solid-state imaging device according to a fifth embodiment of the present technology is viewed in a cross section on a first plane.
Figure 17B:
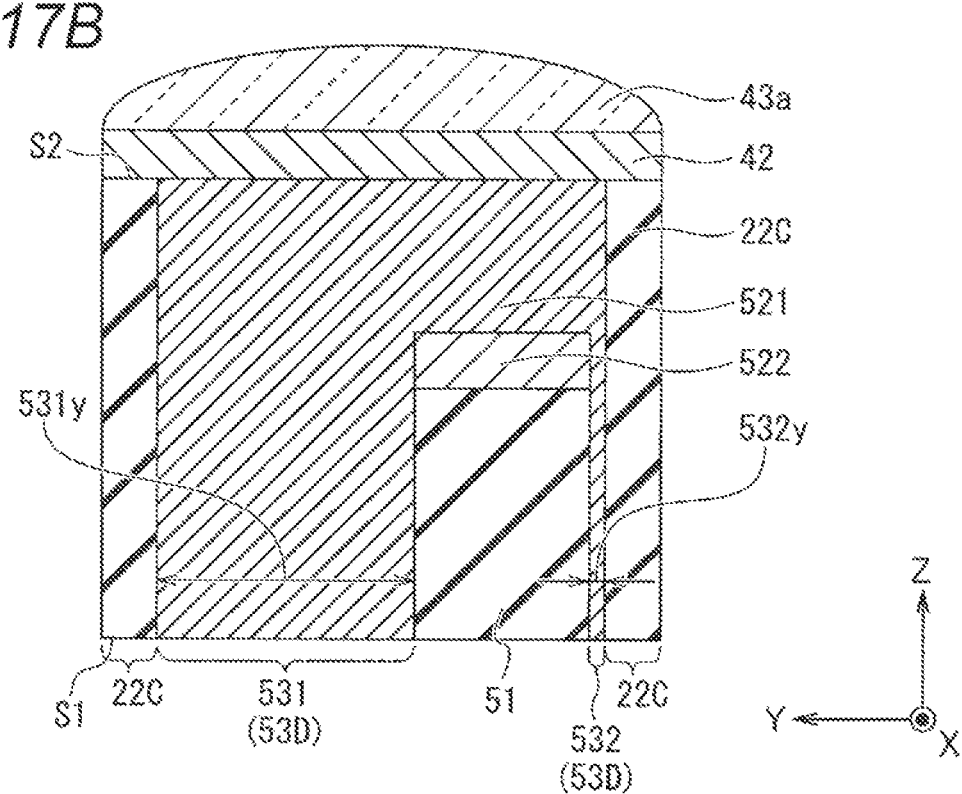
FIG. 17B is a longitudinal cross-sectional view illustrating a main part of the cross-sectional structure along line B-B in FIG. 17A.

A fifth embodiment of the present technology illustrated in FIGS. 17A and 17B will be described below. The solid-state imaging device 1 according to the fifth embodiment is different from the solid-state imaging device 1 according to the first embodiment described above in that the second portion 522 of the isolation portion is provided at a position away from the first transfer transistor 24L and the second transfer transistor 24R in the Y direction, and that a unit isolation portion 22C is included instead of the unit isolation portion 22. Other configurations of the solid-state imaging device 1 are basically similar to those of the solid-state imaging device 1 according to the first embodiment described above. Note that the components already described are denoted by the same reference numerals, and the description thereof will be omitted. Note that a longitudinal cross-sectional view illustrating a main part of the cross-sectional structure along line A-A in FIG. 17A is the same as that in FIG. 16B, and thus illustration is omitted here.

<Isolation Portion>

The solid-state imaging device 1 includes an isolation portion 50D instead of the isolation portion 50. The isolation portion 50D includes a first region 51, a second region 52, and a third region 53D. The first region 51 and the second region 52 relate to the positions of the first transfer transistor 24L and the second transfer transistor 24R, and are provided at positions different from those in the first embodiment described above. More specifically, the first transfer transistor 24L and the second transfer transistor 24R are provided closer to one side of the photoelectric conversion unit 21 in the Y direction (second direction) intersecting the X direction (first direction) in a plan view, whereas the first region 51 and the second region 52 are provided closer to the other side of the photoelectric conversion unit 21 in the second direction. More specifically, the first region 51 and the second region 52 are provided closer to the other side in the second direction than the center of the photoelectric conversion unit 21 in the second direction. Also, the first region 51 and the second region 52 are provided at positions not including the center of the photoelectric conversion unit 21 in the second direction. Other configurations of the first region 51 and the second region 52 are the same as those of the first region 51 and the second region 52 of the first embodiment.

The isolation portion 50D includes a third region 53D instead of the third region 53 of the first embodiment. The third region 53D includes third regions 531 and 532. As illustrated in FIG. 17B, the third regions 531 and 532 are different from the third region 53 in the dimension in the Y direction. In addition, a dimension 531$y$ in the Y direction of the third region 531 provided closer to one side in the Y direction is larger than a dimension 532$y$ in the Y direction of the third region 532 provided closer to the other side in the Y direction. Other configurations of the third regions 531 and 532 are the same as those of the third region 53.

In this way, the second portion 522 is provided at a position away from the transfer gate electrodes TRG1 and TRG2 in the thickness direction of the semiconductor layer 20, and is further provided at a position away from the transfer gate electrodes TRG1 and TRG2 in the Y direction of the semiconductor layer 20.

Main Effects of Fifth Embodiment

Even with the solid-state imaging device 1 according to the fifth embodiment, effects similar to those of the solid-state imaging device 1 according to the first embodiment described above can be obtained.

Further, the second portion 522 is provided at a position away from the transfer gate electrodes TRG1 and TRG2 in the thickness direction of the semiconductor layer 20, and is further provided at a position away from the transfer gate electrodes TRG1 and TRG2 in the Y direction of the semiconductor layer 20. With the above-described configuration, the second portion 522 can be further distanced from the transfer gate electrodes TRG1 and TRG2. Accordingly, the distance between the second portion 522 and the transfer gate electrodes TRG1 and TRG2 can be further increased. Accordingly, the first potential barrier P1 which is the potential barrier of the isolation portion 50D is less likely to be affected by the modulation of the first transfer transistor 24L and the second transfer transistor 24R. Accordingly, it is possible to further suppress a decrease in the accuracy of the phase difference detection. Furthermore, since the first potential barrier P1 is less likely to be affected by modulation, the height of the barrier can be used in a state close to the design, and it is possible to further suppress narrowing of the signal range in which phase difference detection can be performed.

Sixth Embodiment

Figure 18A:
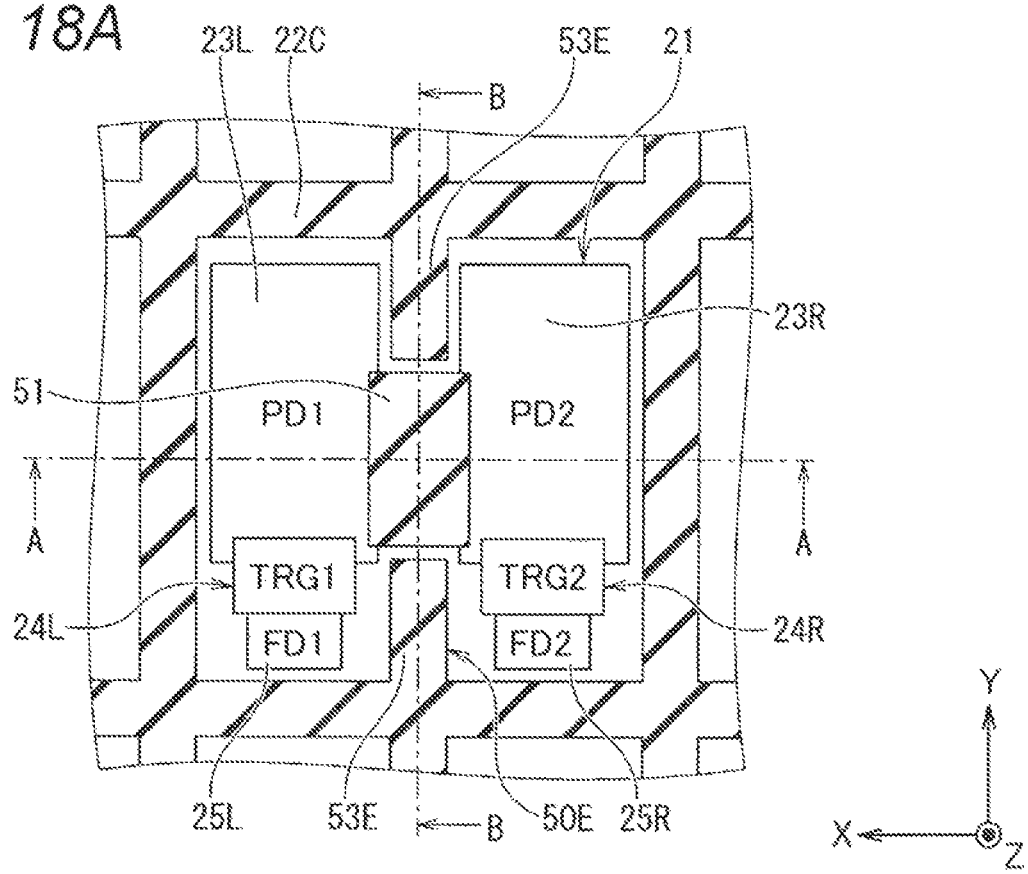
FIG. 18A is a transverse cross-sectional view illustrating a relative relationship between respective components when a pixel of a solid-state imaging device according to a sixth embodiment of the present technology is viewed in a cross section on a first plane.
Figure 18B:
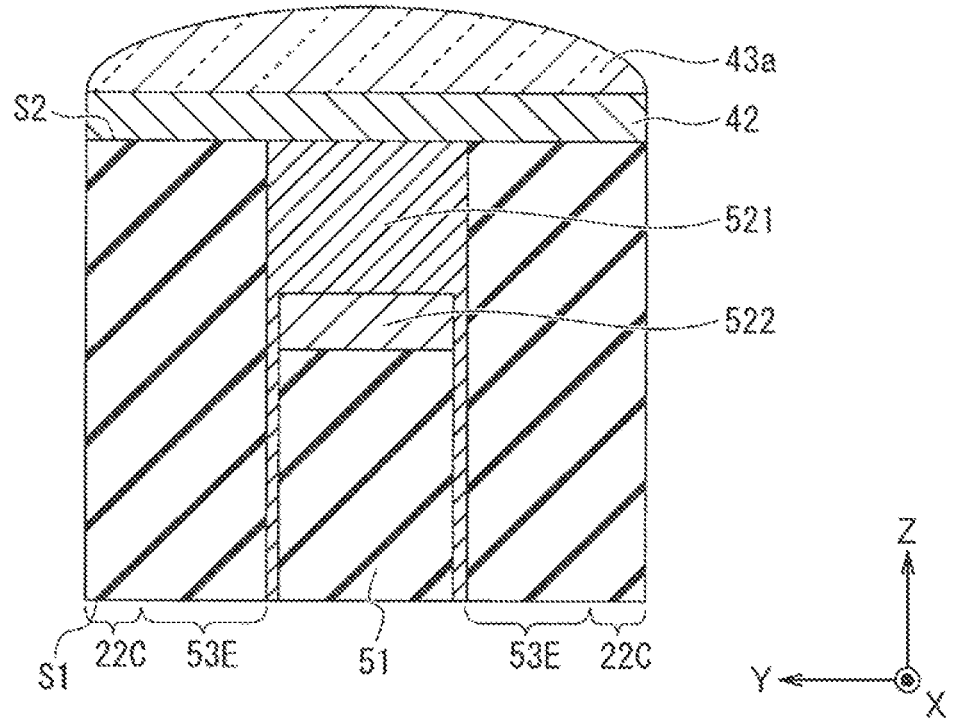
FIG. 18B is a longitudinal cross-sectional view illustrating a main part of the cross-sectional structure along line B-B in FIG. 18A.

A sixth embodiment of the present technology illustrated in FIGS. 18A and 18B will be described below. The solid-state imaging device 1 according to the sixth embodiment is different from the solid-state imaging device 1 according to the first embodiment described above in that the entire isolation portion 50 (third region 53E) is formed by an insulating material, and that a unit isolation portion 22C is included instead of the unit isolation portion 22. Other configurations of the solid-state imaging device 1 are basically similar to those of the solid-state imaging device 1 according to the first embodiment described above. Note that the components already described are denoted by the same reference numerals, and the description thereof will be omitted. Note that a longitudinal cross-sectional view illustrating a main part of the cross-sectional structure along line A-A in FIG. 18A is the same as that in FIG. 16B, and thus illustration is omitted here.

<Isolation Portion>

The solid-state imaging device 1 includes an isolation portion 50E instead of the isolation portion 50. The isolation portion 50E includes a first region 51, a second region 52, and a third region 53E. In the thickness direction of the semiconductor layer 20, the third region 53E is formed by an insulating material provided from one of the second surface S2 and the first surface S1 to the other. The third region 53E is formed by an insulating material embedded (provided) in a groove formed in the semiconductor layer 20, and functions as an insulator isolation region that suppresses movement of signal charges. Here, the groove is provided from one of the second surface S2 and the first surface S1 of the semiconductor layer 20 to the other. That is, the third region 53E is a full trench isolation (FTI) provided in the semiconductor layer 20. The insulating material is, for example, silicon oxide ($SiO_2$).

<<Method for Manufacturing Solid-State Imaging Device 1>>

Figure 19A:
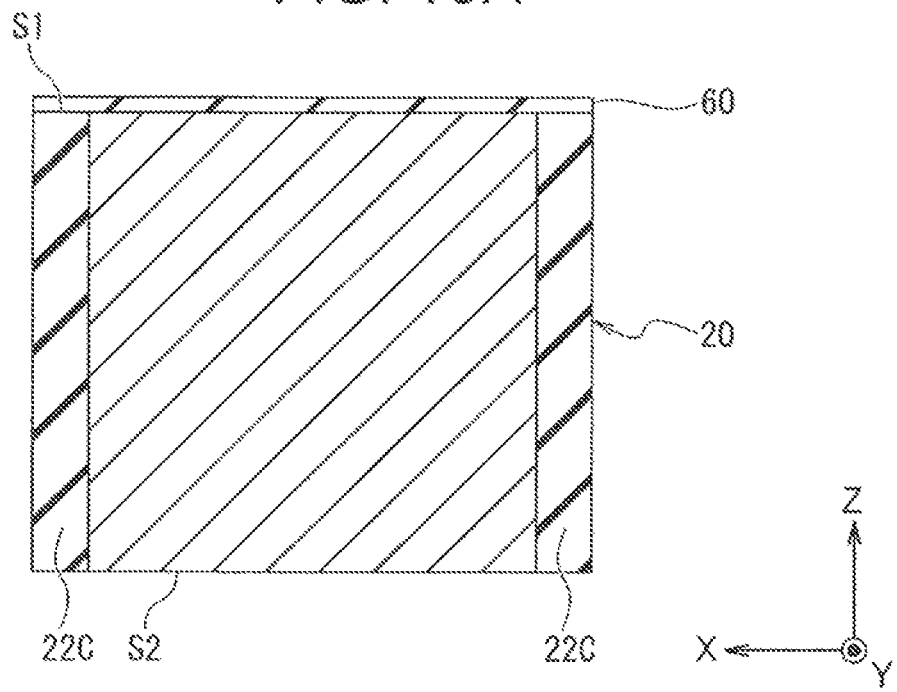
FIG. 19A is a process cross-sectional view illustrating a method for manufacturing the solid-state imaging device according to the sixth embodiment of the present technology.

Next, a method for manufacturing the solid-state imaging device 1 according to the sixth embodiment will be described with reference to the drawings. Note that, here, only differences from the method for manufacturing the solid-state imaging device 1 described in the first embodiment will be described. First, the step illustrated in 10A of the first embodiment is performed, and then, as illustrated in FIG. 19A, the unit isolation portion 22C is formed in the semiconductor layer 20. In this step, although not illustrated in FIG. 19A, the third region 53E is also formed.

Figure 19B:
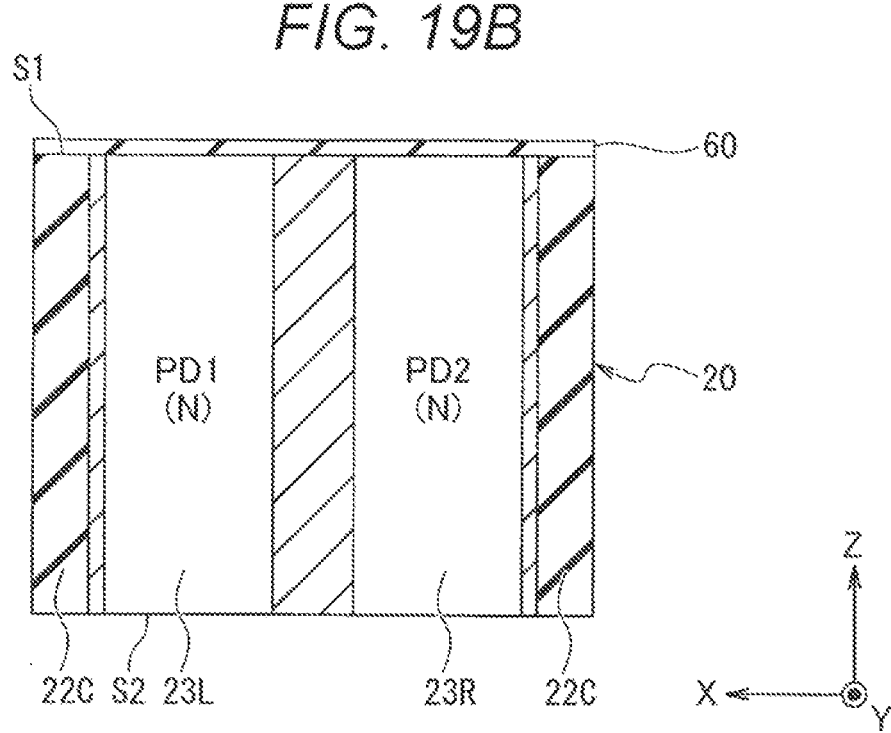
FIG. 19B is a process cross-sectional view subsequent to FIG. 19A.

Then, as illustrated in FIG. 19B, the first photoelectric conversion portion 23L and the second photoelectric conversion portion 23R are formed. Since the subsequent steps are the same as the steps of the solid-state imaging device 1 described in the first embodiment, the description thereof will be omitted here.

Main Effects of Sixth Embodiment

Even with the solid-state imaging device 1 according to the sixth embodiment, effects similar to those of the solid-state imaging device 1 according to the first embodiment described above can be obtained.

Furthermore, since the entire third region 53E is formed by an insulating material, the solid-state imaging device 1 according to the sixth embodiment can further suppress movement of the generated signal charges between the first photoelectric conversion portion 23L and the second photoelectric conversion portion 23R via the third region 53E, as compared with the third region 53 of the first embodiment and the third region 53B of the third embodiment described above. Accordingly, it is possible to improve the phase difference detection accuracy without deteriorating color mixing occurring between the first photoelectric conversion portion 23L and the second photoelectric conversion portion 23R in the photoelectric conversion unit 21.

Seventh Embodiment

Figure 20A:
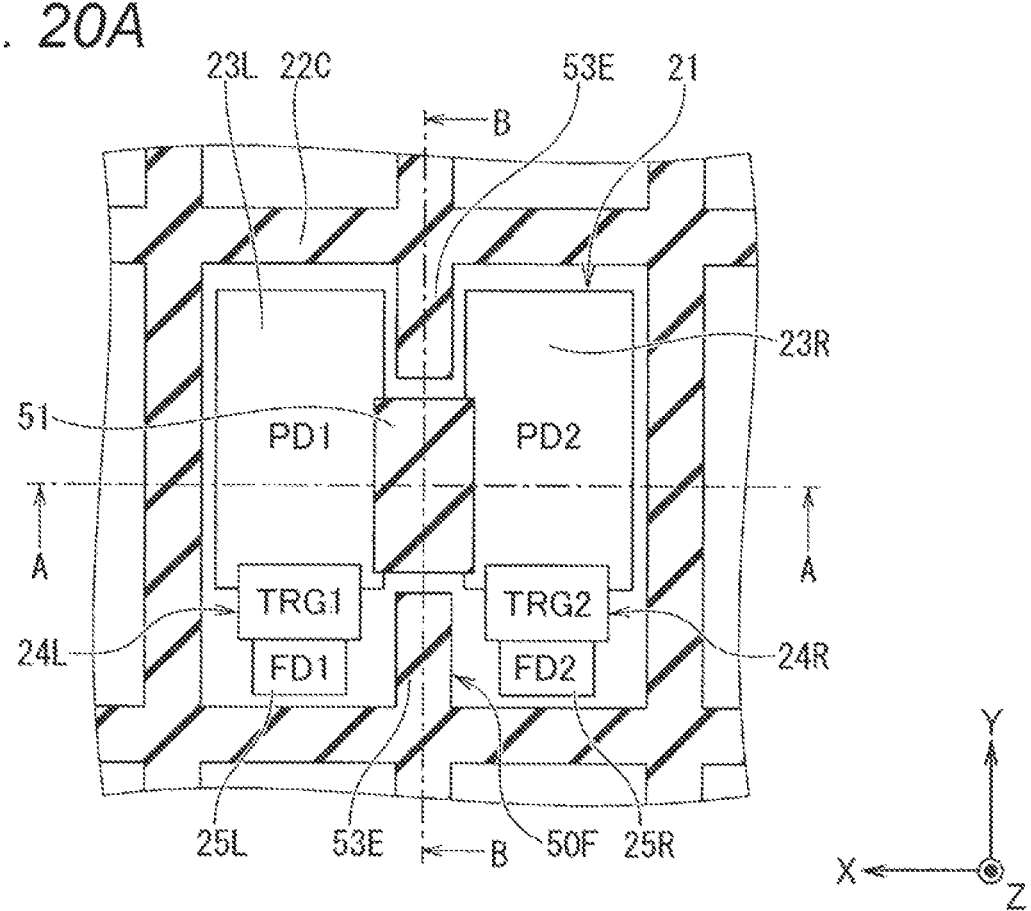
FIG. 20A is a transverse cross-sectional view illustrating a relative relationship between respective components when a pixel of a solid-state imaging device according to a seventh embodiment of the present technology is viewed in a cross section on a first plane.
Figure 20B:
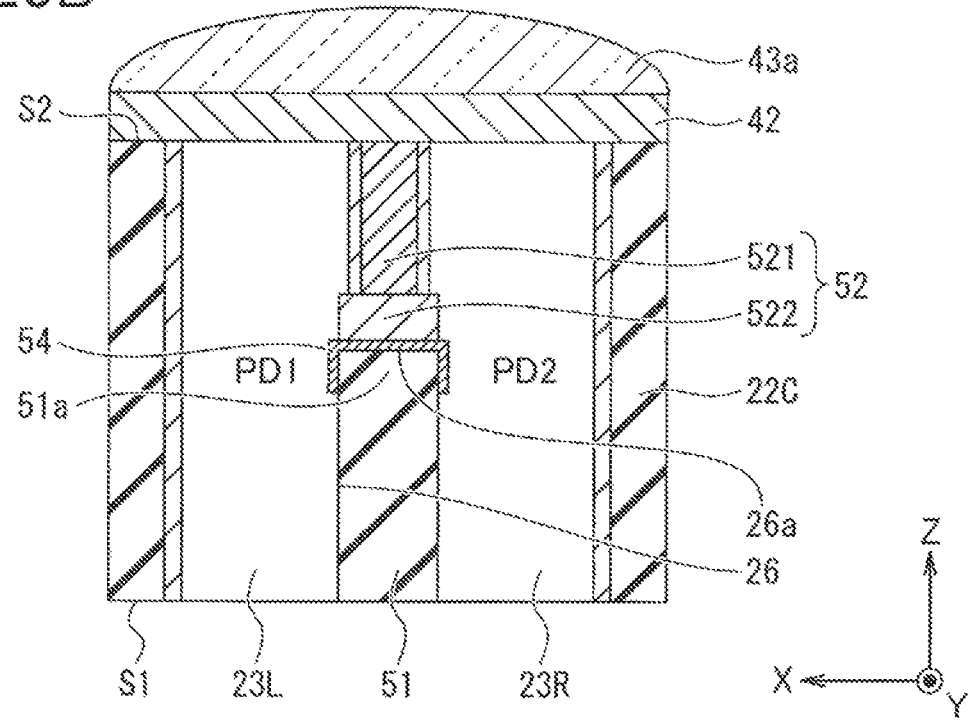
FIG. 20B is a longitudinal cross-sectional view illustrating a main part of the cross-sectional structure along line A-A in FIG. 20A.
Figure 20C:
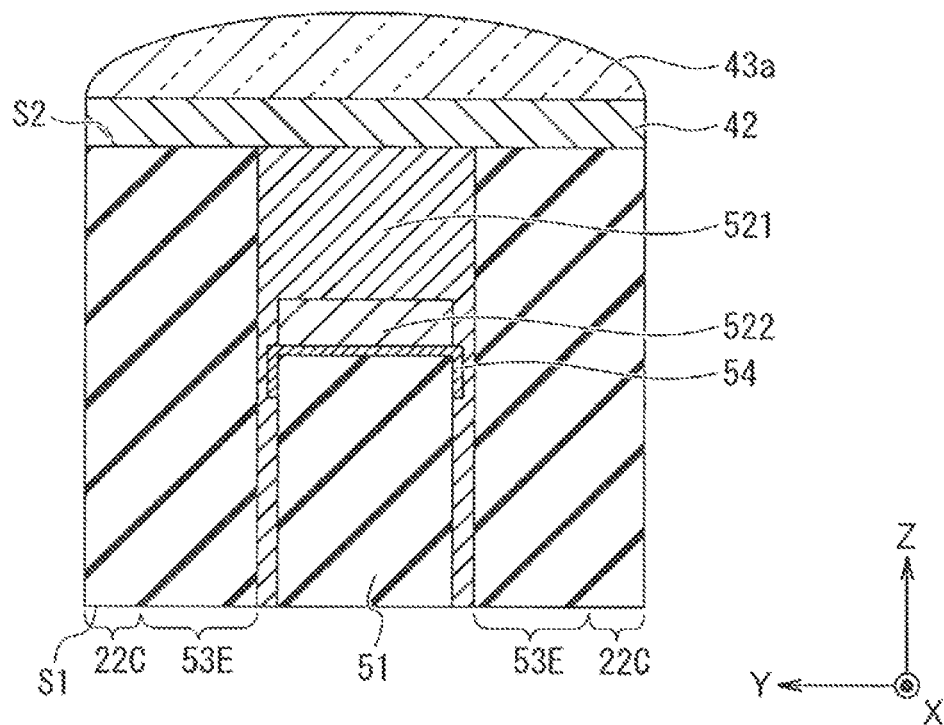
FIG. 20C is a longitudinal cross-sectional view illustrating a main part of the cross-sectional structure along line B-B in FIG. 20A.

A seventh embodiment of the present technology illustrated in FIGS. 20A to 20C will be described below. The solid-state imaging device 1 according to the seventh embodiment is different from the solid-state imaging device 1 according to the first embodiment described above in that an isolation portion includes a hole accumulation region, that a third region 53E is included instead of the third region 53, and that a unit isolation portion 22C is included instead of the unit isolation portion 22. Other configurations of the solid-state imaging device 1 are basically similar to those of the solid-state imaging device 1 according to the first embodiment described above. Note that the components already described are denoted by the same reference numerals, and the description thereof will be omitted.

<Isolation Portion>

The solid-state imaging device 1 includes an isolation portion 50F instead of the isolation portion 50. The isolation portion 50F includes a first region 51, a second region 52, a third region 53E, and a hole accumulation region 54. The hole accumulation region 54 is provided on the second surface S2 side of the first region 51 in the thickness direction of the semiconductor layer 20. More specifically, the hole accumulation region 54 is provided near an end portion 51a of the first region 51 on the second surface S2 side. Further, in the thickness direction of the semiconductor layer 20, the second portion 522 is provided on the second surface S2 side of the hole accumulation region 54, and the first portion 521 is provided on the second surface S2 side of the second portion 522.

In order to allow signal charges to overflow, the second portion 522 needs to have a low impurity concentration exhibiting p-type, but on the other hand, there is a possibility of inducing the occurrence of white spots and dark current due to depletion of STI. By providing the hole accumulation region 54, the interface between the insulating material and silicon is pinned with holes. Accordingly, depletion of the interface between the second portion 522 and the first region 51 is suppressed, thereby suppressing the occurrence of white spots and dark current. The concentration of the impurities exhibiting the first conductivity type, for example, the p-type impurities in the hole accumulation region 54 is only required to be, for example, $1e18 \text{ cm}^{-3}$ to $1e20 \text{ cm}^{-3}$.

The hole accumulation region 54 is provided by impurity implantation in the same step as the second portion 522. That is, the hole accumulation region 54 is provided in a step before the first region 51 is embedded in the groove 26. Note that the hole accumulation region 54 is provided either before or after the second portion 522 is provided. Note that, in order to provide the hole accumulation region 54 in a cap shape with respect to the end portion 51a of the first region 51 as illustrated, impurities are implanted into the groove 26 from an oblique direction. Thus, impurities can also be implanted into the side wall of the groove 26. In addition, since impurities are implanted near the surface of the groove 26, implantation is performed with low energy.

Main Effects of Seventh Embodiment

Even with the solid-state imaging device 1 according to the seventh embodiment, effects similar to those of the solid-state imaging device 1 according to the first embodiment described above can be obtained.

Furthermore, since the solid-state imaging device 1 according to the seventh embodiment includes the hole accumulation region 54, the occurrence of white spots and dark current can be suppressed.

Eighth Embodiment

Figure 21A:
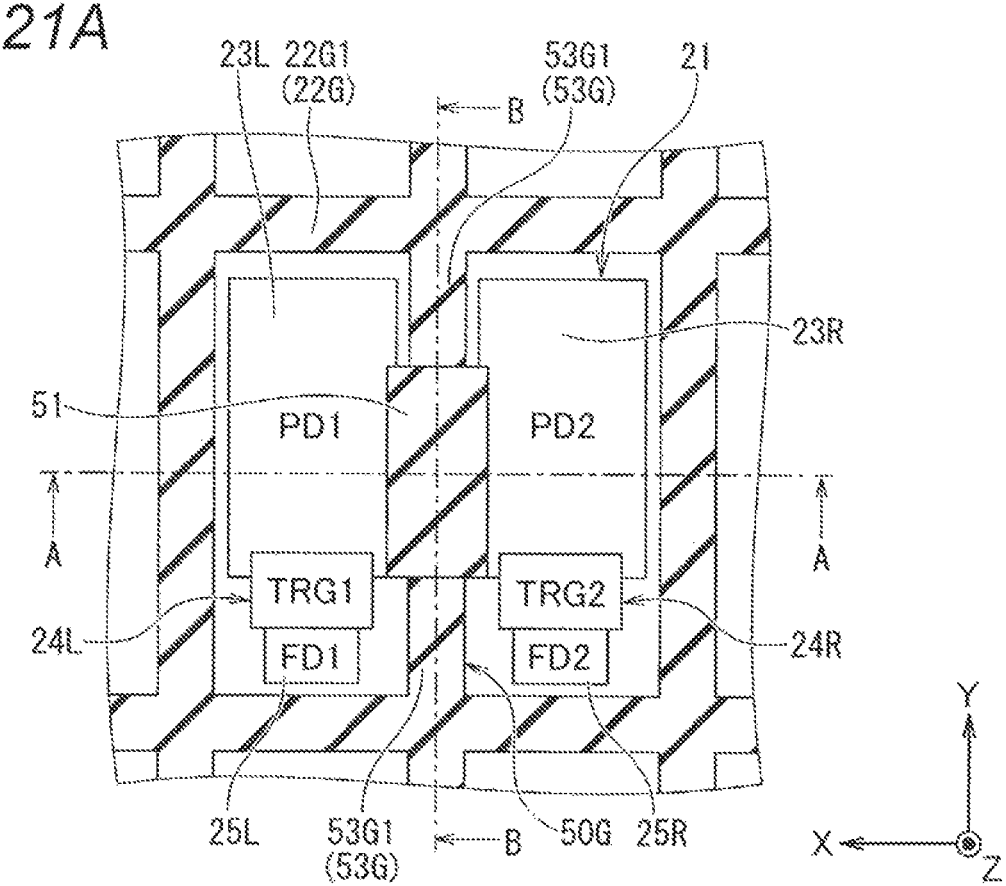
FIG. 21A is a transverse cross-sectional view illustrating a relative relationship between respective components when a pixel of a solid-state imaging device according to an eighth embodiment of the present technology is viewed in a cross section on a first plane.
Figure 21B:
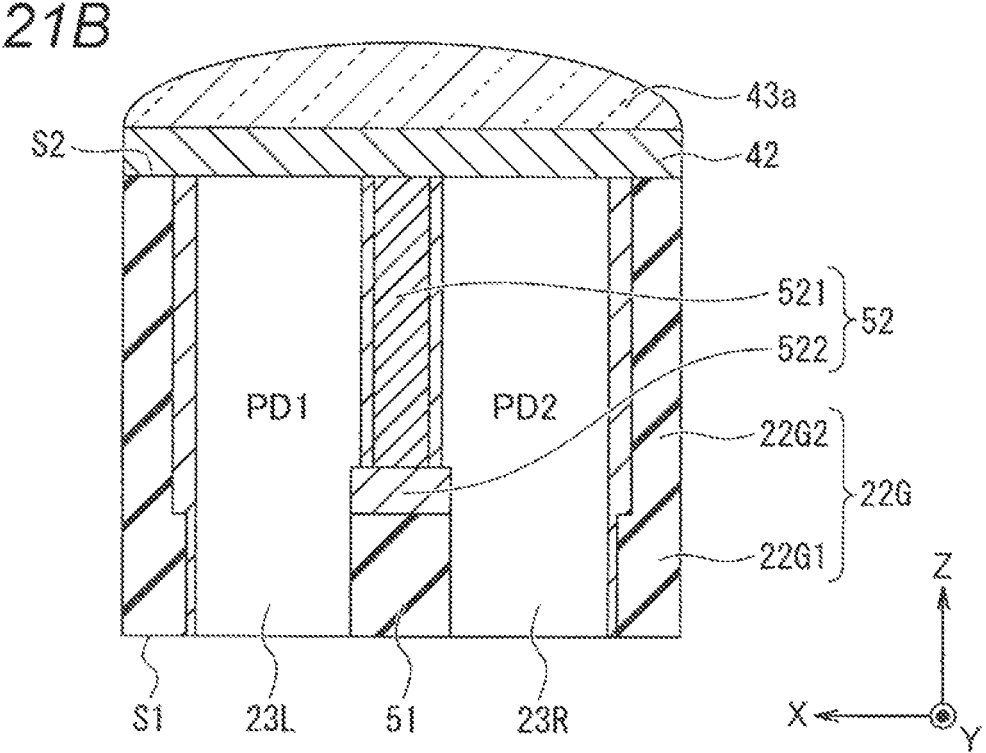
FIG. 21B is a longitudinal cross-sectional view illustrating a main part of the cross-sectional structure along line A-A in FIG. 21A.
Figure 21C:
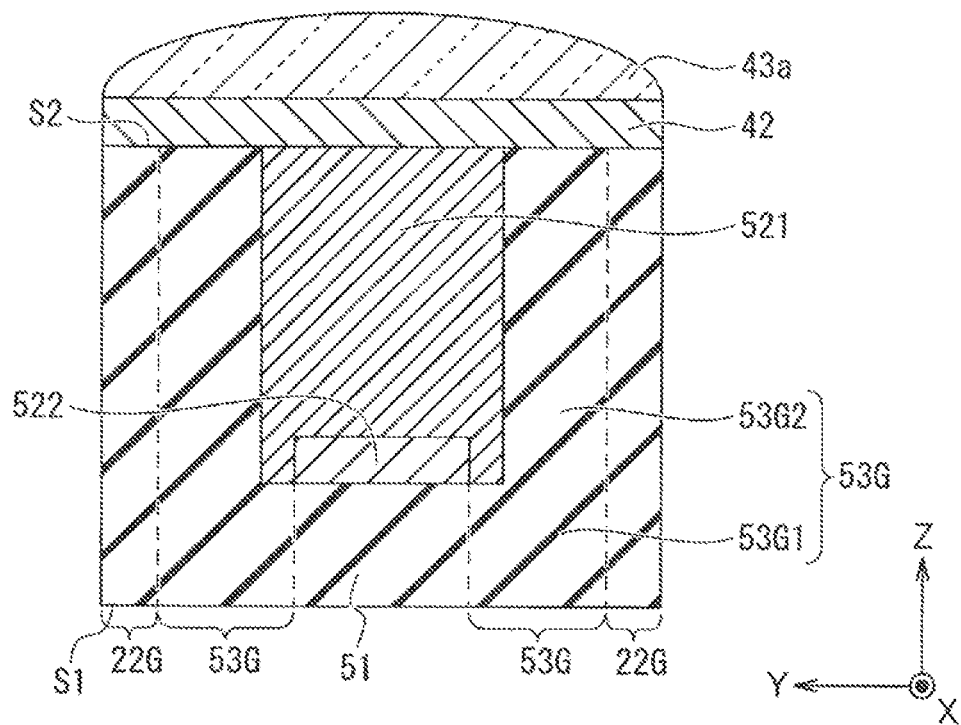
FIG. 21C is a longitudinal cross-sectional view illustrating a main part of the cross-sectional structure along line B-B in FIG. 21A.

An eighth embodiment of the present technology illustrated in FIGS. 21A to 21C will be described below. The solid-state imaging device 1 according to the eighth embodiment is different from the solid-state imaging device 1 according to the first embodiment described above in that the isolation portion (third region 53G) and the unit isolation portion are formed by an insulating material, and that the width of the isolation portion and the width of the unit isolation portion are different in the thickness direction of the semiconductor layer 20. Other configurations of the solid-state imaging device 1 are basically similar to those of the solid-state imaging device 1 according to the first embodiment described above. Note that the components already described are denoted by the same reference numerals, and the description thereof will be omitted.

<Isolation Portion>

The solid-state imaging device 1 includes an isolation portion 50G instead of the isolation portion 50. The isolation portion 50G includes a first region 51, a second region 52, and a third region 53G. The width of the third region 53G, more specifically, the width (dimension in the direction perpendicular to the Z direction) of the third region 53G in a plan view varies depending on the thickness direction of the semiconductor layer 20. More specifically, the width of the portion of the third region 53G close to the second surface S2 is narrower than the width of the portion close to the first surface S1. More specifically, the width of the portion of the third region 53G close to the second surface S2 is slightly narrower than the width of the portion close to the first surface S1.

The third region 53G includes a third region 53G2 on the light incidence surface side and a third region 53G1 on the element formation surface side having a width different from that of the third region 53G2. More specifically, the width of the third region 53G2 is slightly narrower than the width of the third region 53G1. In addition, in the thickness direction of the semiconductor layer 20, the third region 53G has the third region 53G1 closer to the first surface S1 side and the third region 53G2 closer to the second surface S2 side.

<Unit Isolation Portion>

The solid-state imaging device 1 includes a unit isolation portion 22G instead of the unit isolation portion 22. The width of the unit isolation portion 22G, more specifically, the width (dimension in the direction perpendicular to the Z direction) of the unit isolation portion 22G in a plan view varies depending on the thickness direction of the semiconductor layer 20. More specifically, the width of the portion of the unit isolation portion 22G close to the second surface S2 is narrower than the width of the portion close to the first surface S1. More specifically, the width of the portion of the unit isolation portion 22G close to the second surface S2 is slightly narrower than the width of the portion close to the first surface S1.

The unit isolation portion 22G includes a unit isolation portion 22G2 on the light incidence surface side and a unit isolation portion 22G1 on the element formation surface side having a width different from that of the unit isolation portion 22G2. More specifically, the width of the unit isolation portion 22G2 is slightly narrower than the width of the unit isolation portion 22G1. In addition, in the thickness direction of the semiconductor layer 20, the unit isolation portion 22G has the unit isolation portion 22G1 closer to the first surface S1 side and the unit isolation portion 22G2 closer to the second surface S2 side.

<<Method for Manufacturing Solid-State Imaging Device>>

Figure 22A:
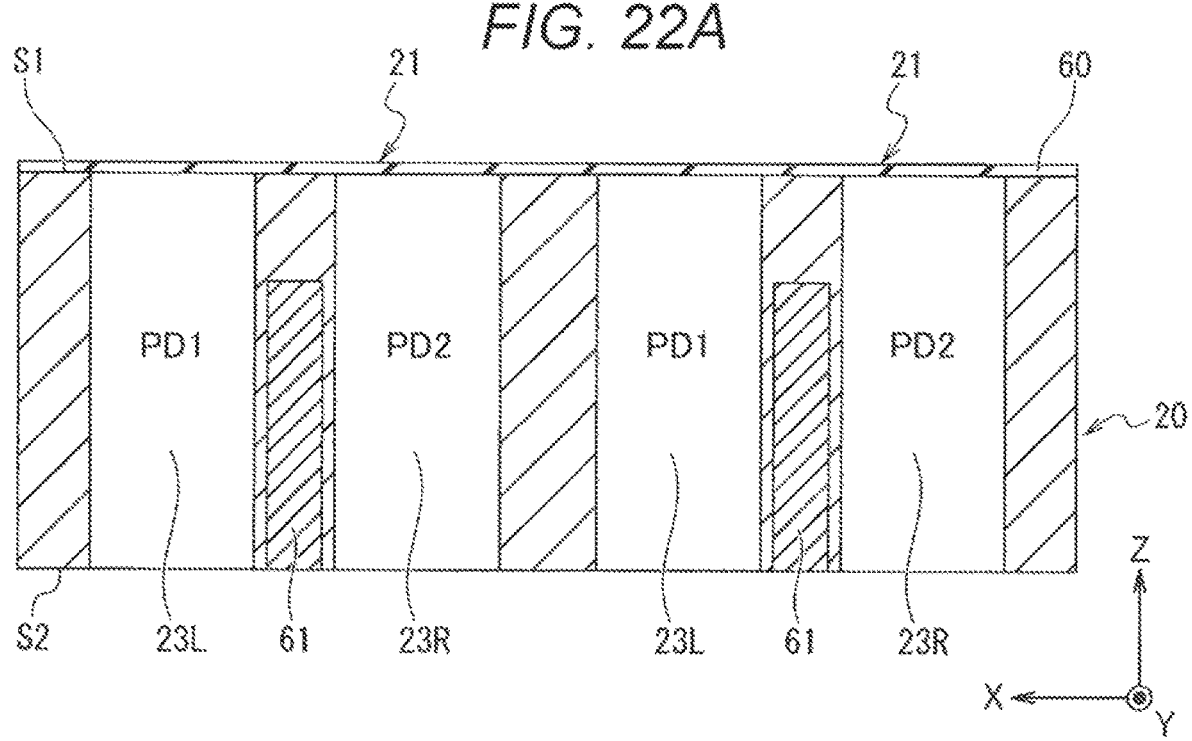
FIG. 22A is a process cross-sectional view illustrating a method for manufacturing the solid-state imaging device according to the eighth embodiment of the present technology.

Next, a method for manufacturing the solid-state imaging device 1 according to the eighth embodiment will be described with reference to the drawings. Note that, here, only differences from the method for manufacturing the solid-state imaging device 1 described in the first embodiment will be described. First, the steps illustrated in FIG. 10A and FIG. 10B of the first embodiment are performed. Next, as illustrated in FIG. 22A, in the photoelectric conversion unit 21, impurities are implanted into the semiconductor layer 20 between the first photoelectric conversion portion 23L and the second photoelectric conversion portion 23R to form the first impurity region 61 in which the impurity concentration is the first concentration.

Figure 22B:
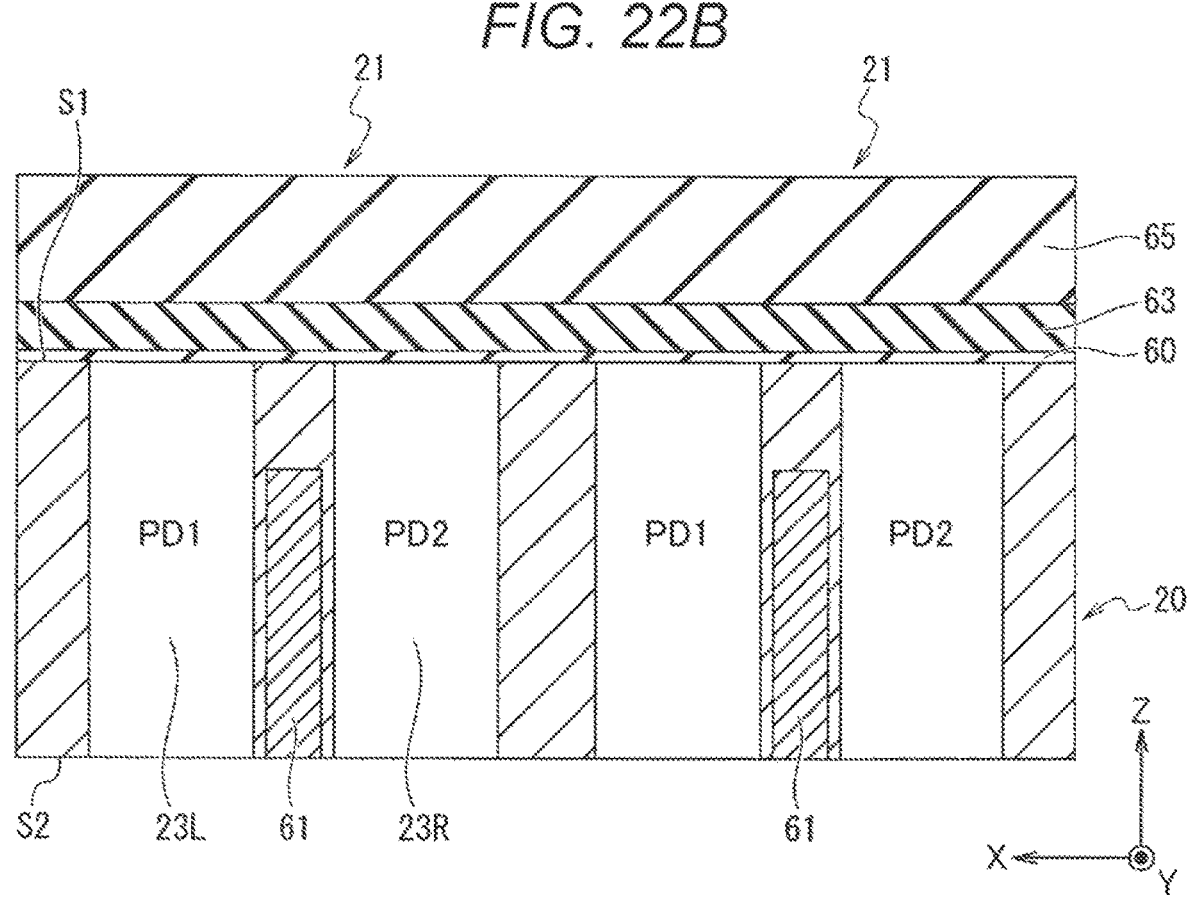
FIG. 22B is a process cross-sectional view subsequent to FIG. 22A.
Figure 22C:
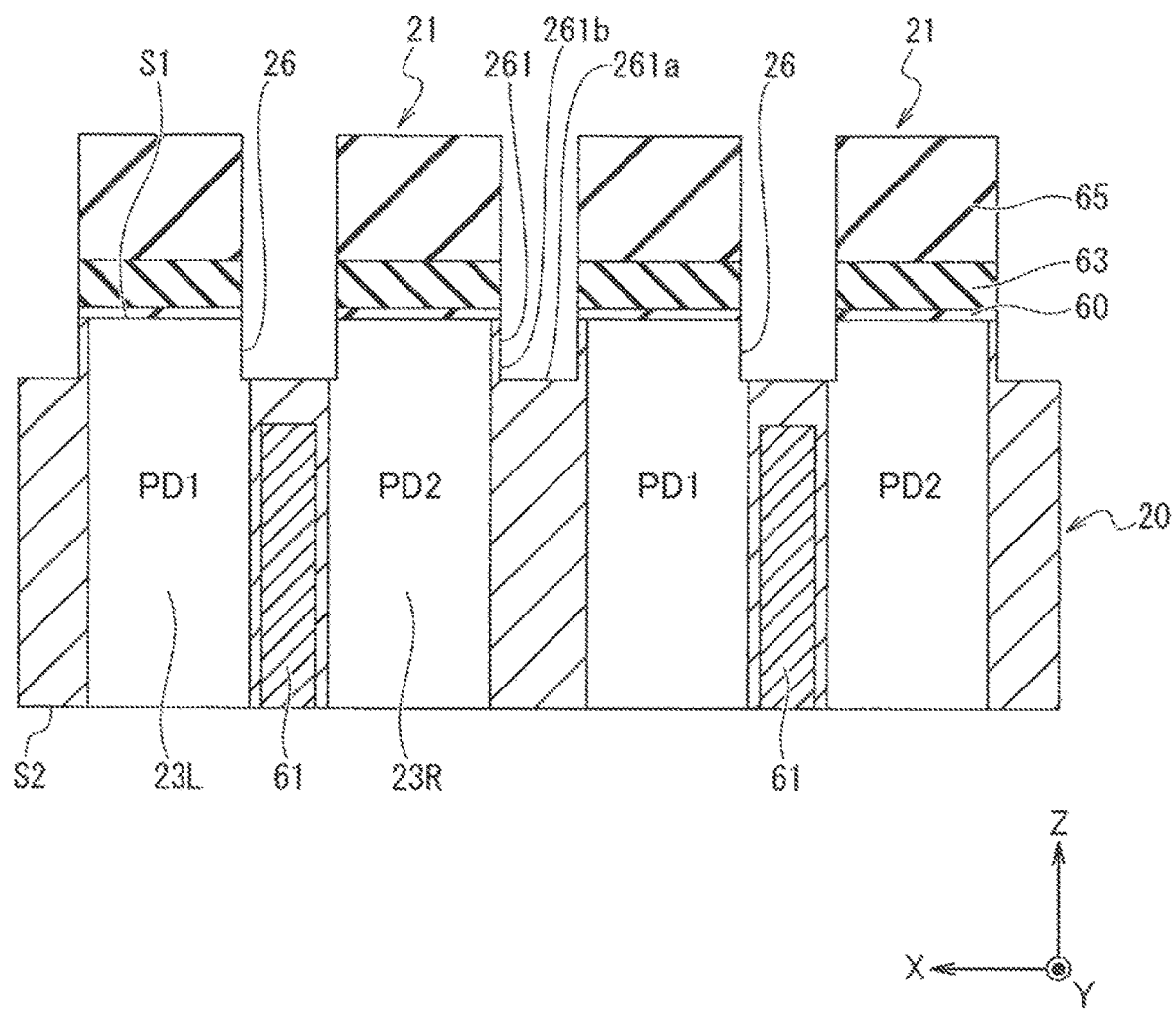
FIG. 22C is a process cross-sectional view subsequent to FIG. 22B.

Then, as illustrated in FIG. 22B, a silicon nitride film ($Si_3N_4$ film) 63 and a silicon oxide film ($SiO_2$ film) 65 are formed. Thereafter, these films are selectively etched using, for example, a resist mask to form a hard mask. Then, as illustrated in FIG. 22C, the first dry etching is performed using the hard mask to form the groove 26 and a groove 261 in the semiconductor layer 20. The groove 261 is formed in the semiconductor layer 20 between the adjacent photoelectric conversion units 21.

Figure 22D:
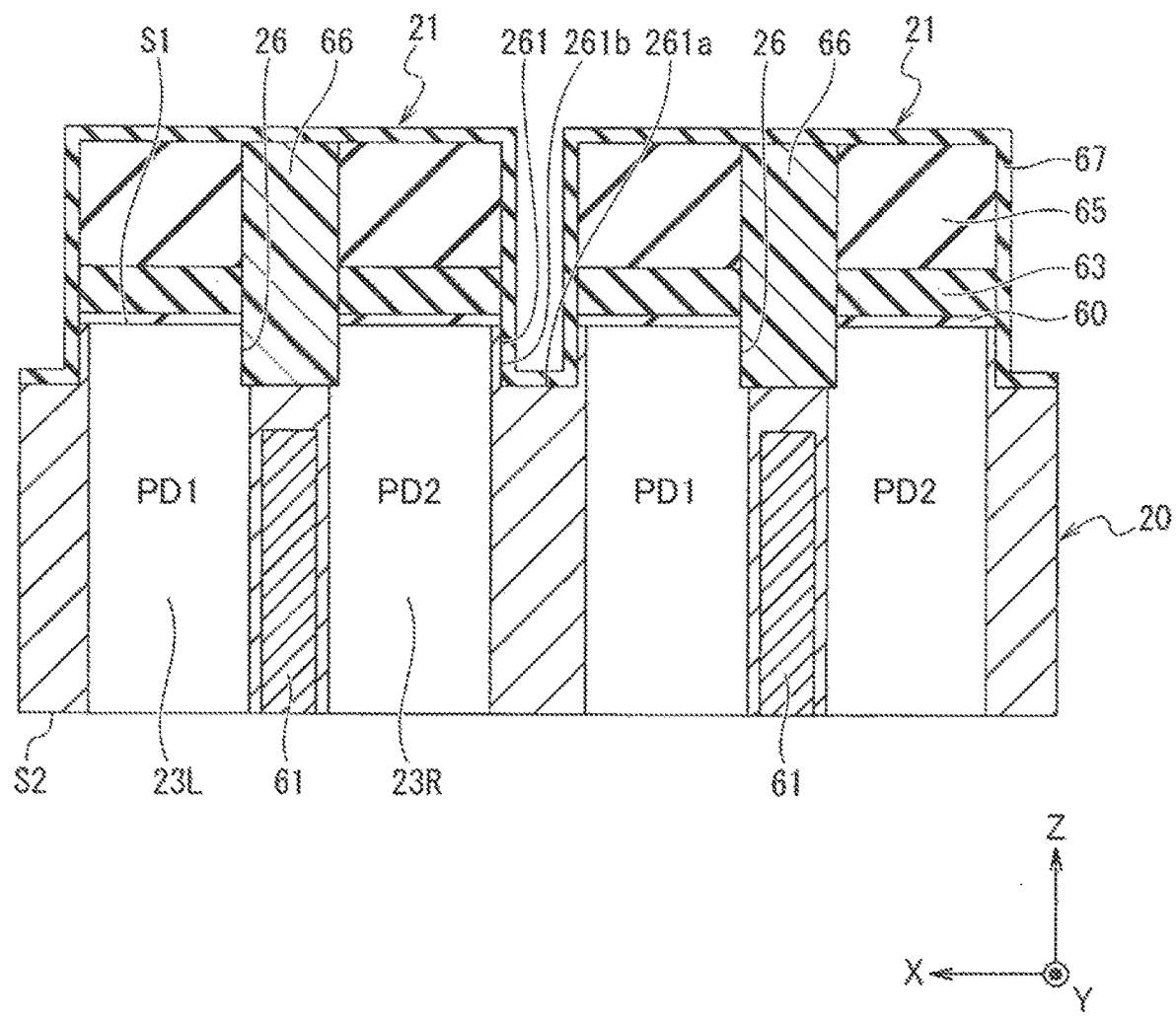
FIG. 22D is a process cross-sectional view subsequent to FIG. 22C.

Next, as illustrated in FIG. 22D, only the groove 26 out of the groove 26 and the groove 261 is filled with a resist 66, and then a silicon nitride film 67 is deposited. The silicon nitride film 67 is deposited in a region including the inner wall of the groove 261. More specifically, the silicon nitride film 67 is deposited in a region including a bottom portion 261a and a side wall 261b of the groove 261. Since the silicon nitride film 67 is deposited on the side wall 261b of the groove 261, the cavity portion in the groove 261 is smaller than that before deposition in a plan view.

Figure 22E:
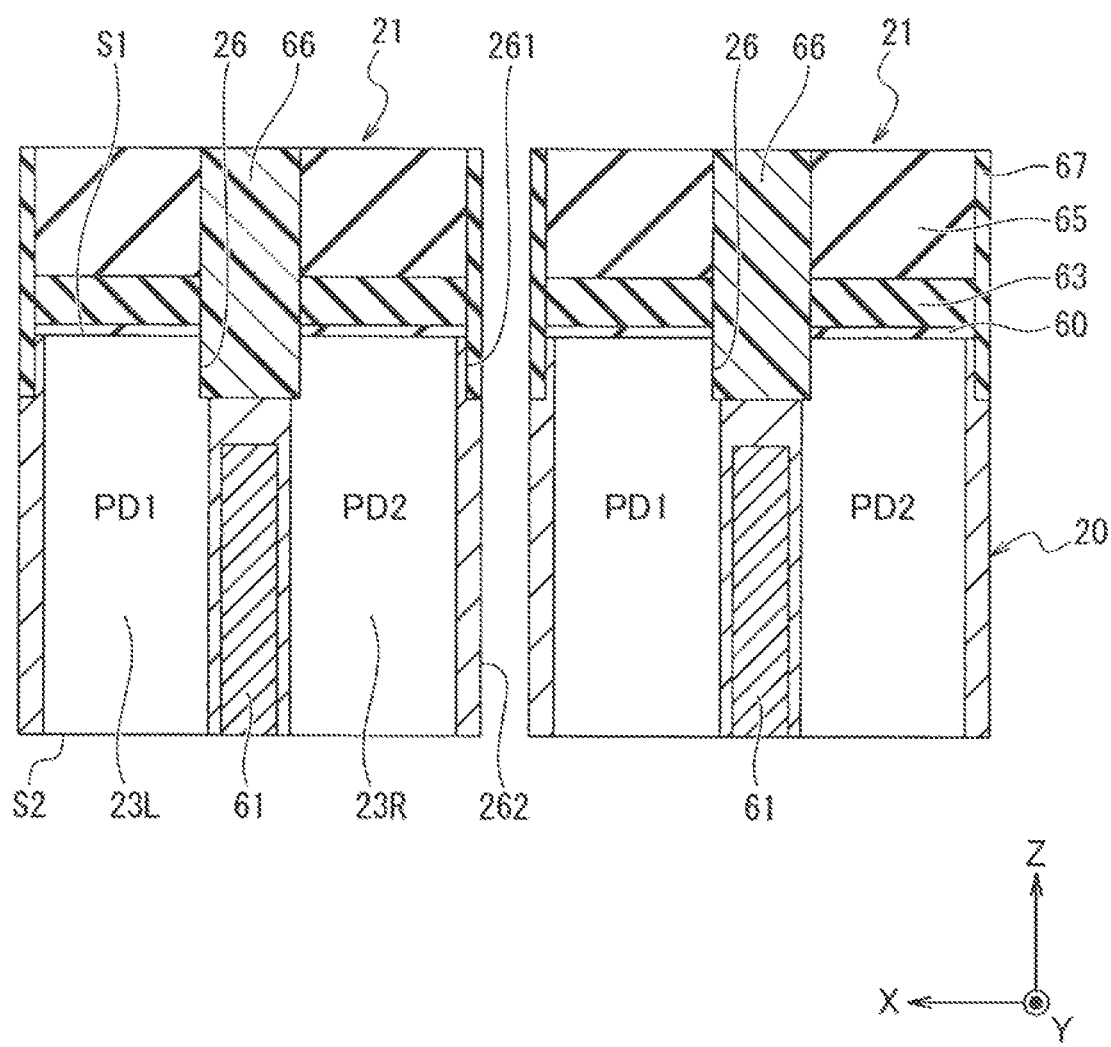
FIG. 22E is a process cross-sectional view subsequent to FIG. 22D.

Then, if the second dry etching is performed on the bottom portion 261a in the state illustrated in FIG. 22D, a groove 262 is formed as illustrated in FIG. 22E. The dimension of the formed groove 262 in a plan view is formed to be smaller than the dimension of the groove 261 in the plan view.

Figure 22F:
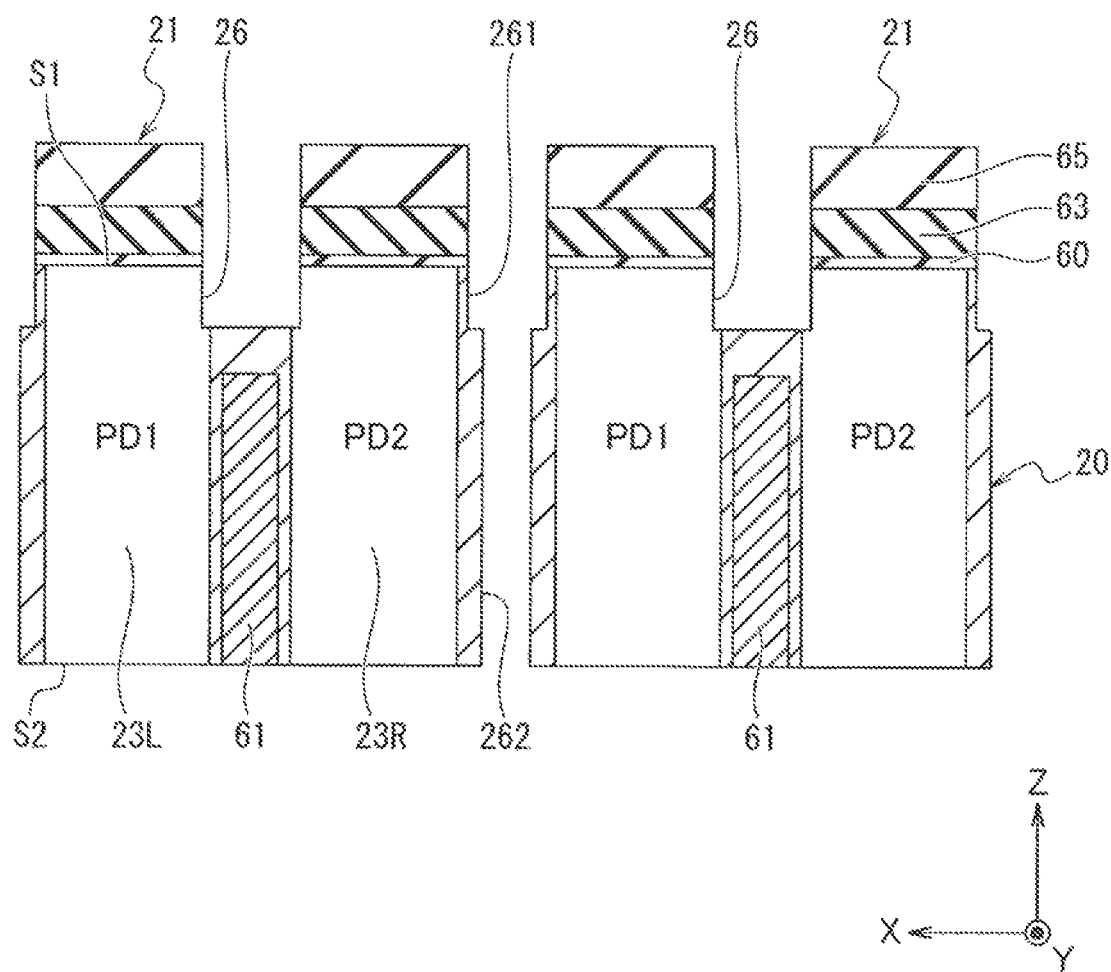
FIG. 22F is a process cross-sectional view subsequent to FIG. 22E.
Figure 22G:
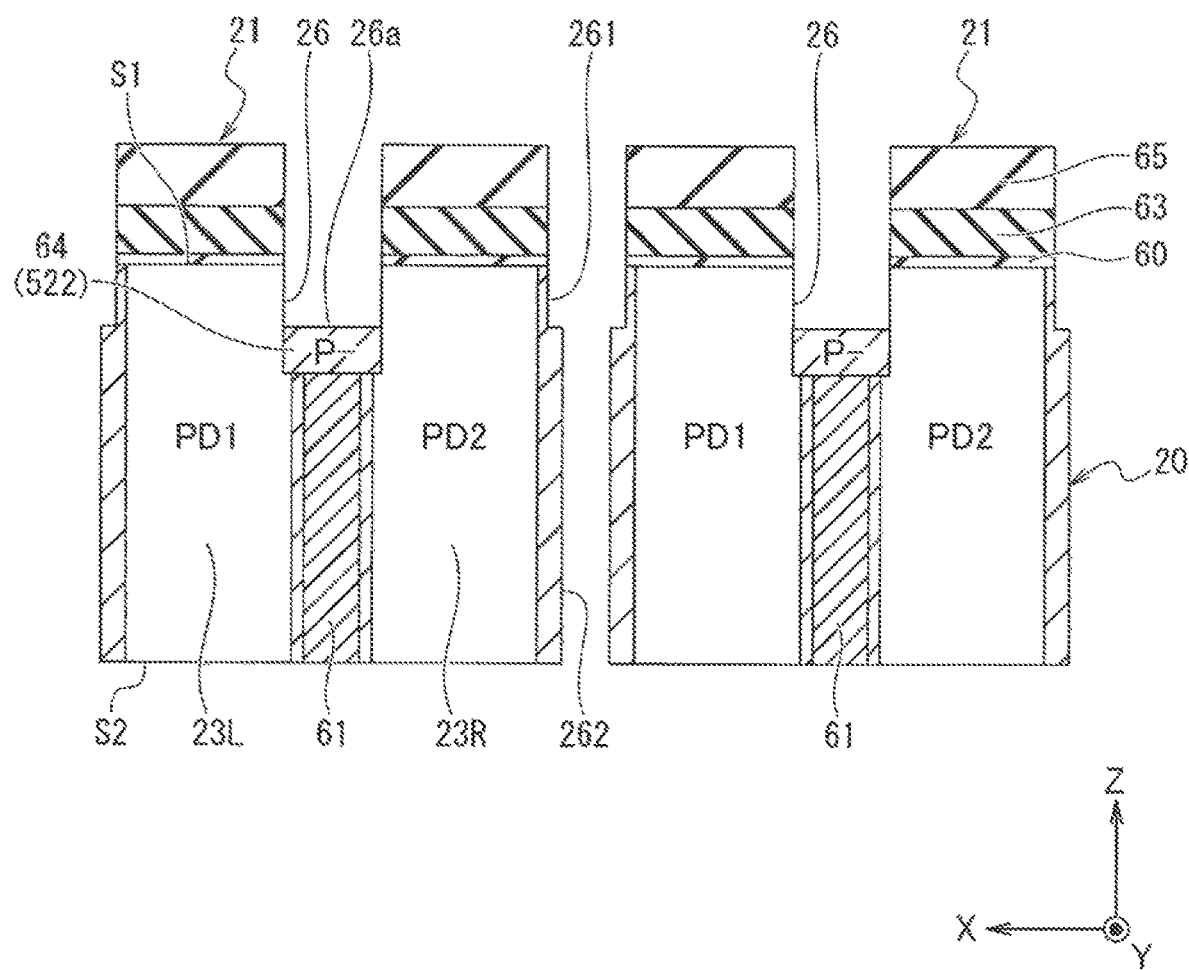
FIG. 22G is a process cross-sectional view subsequent to FIG. 22F.
Figure 22H:
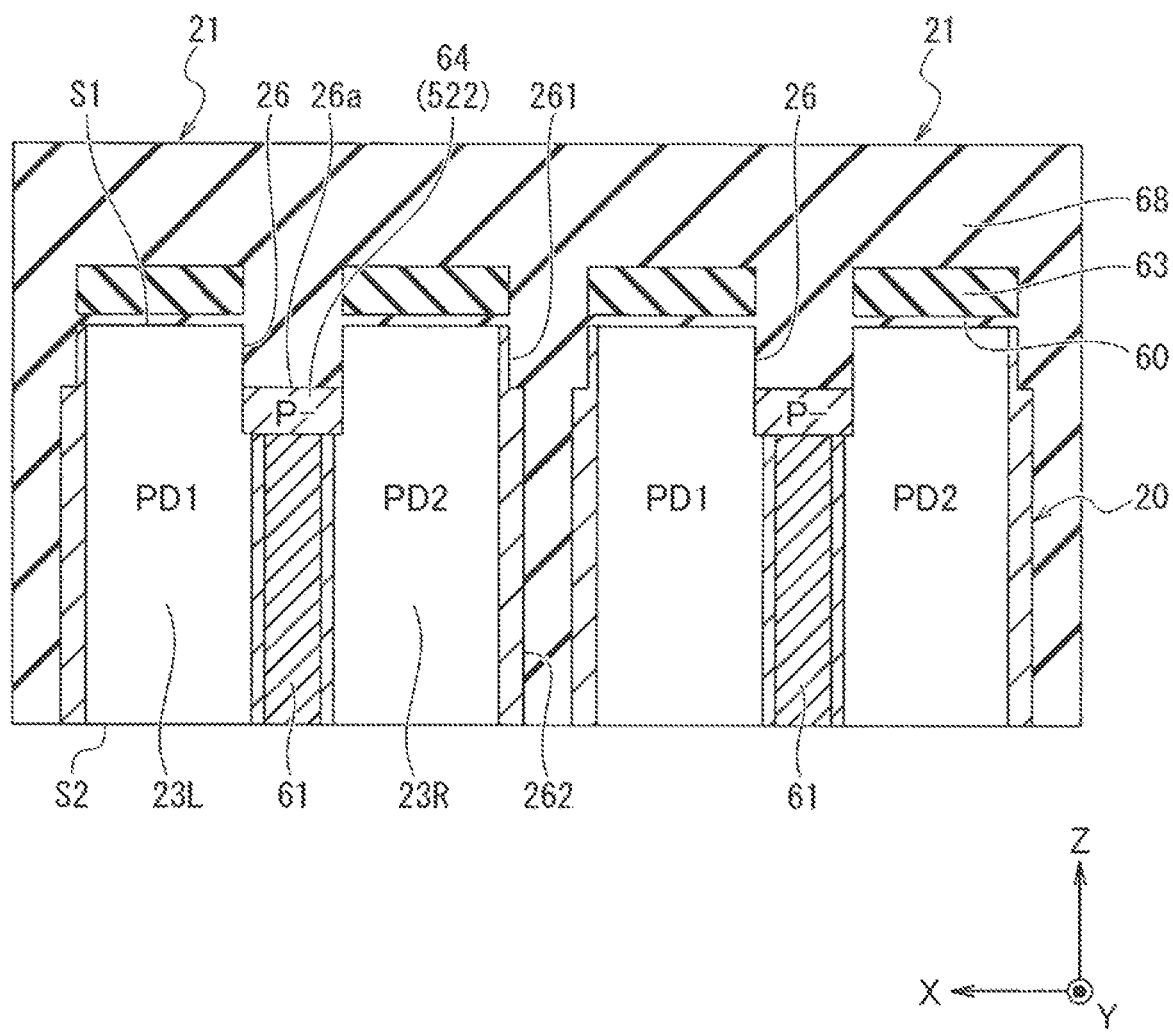
FIG. 22H is a process cross-sectional view subsequent to FIG. 22G.

Thereafter, as illustrated in FIG. 22F, the silicon nitride film 67 and the resist 66 are removed. Next, as illustrated in FIG. 22G, the second portion 522 is formed. Then, as illustrated in FIG. 22H, a silicon oxide film ($SiO_2$ film) 68 is deposited, and the insides of the grooves 26, 261, and 262 are filled with the silicon oxide film 68.

Figure 22I:
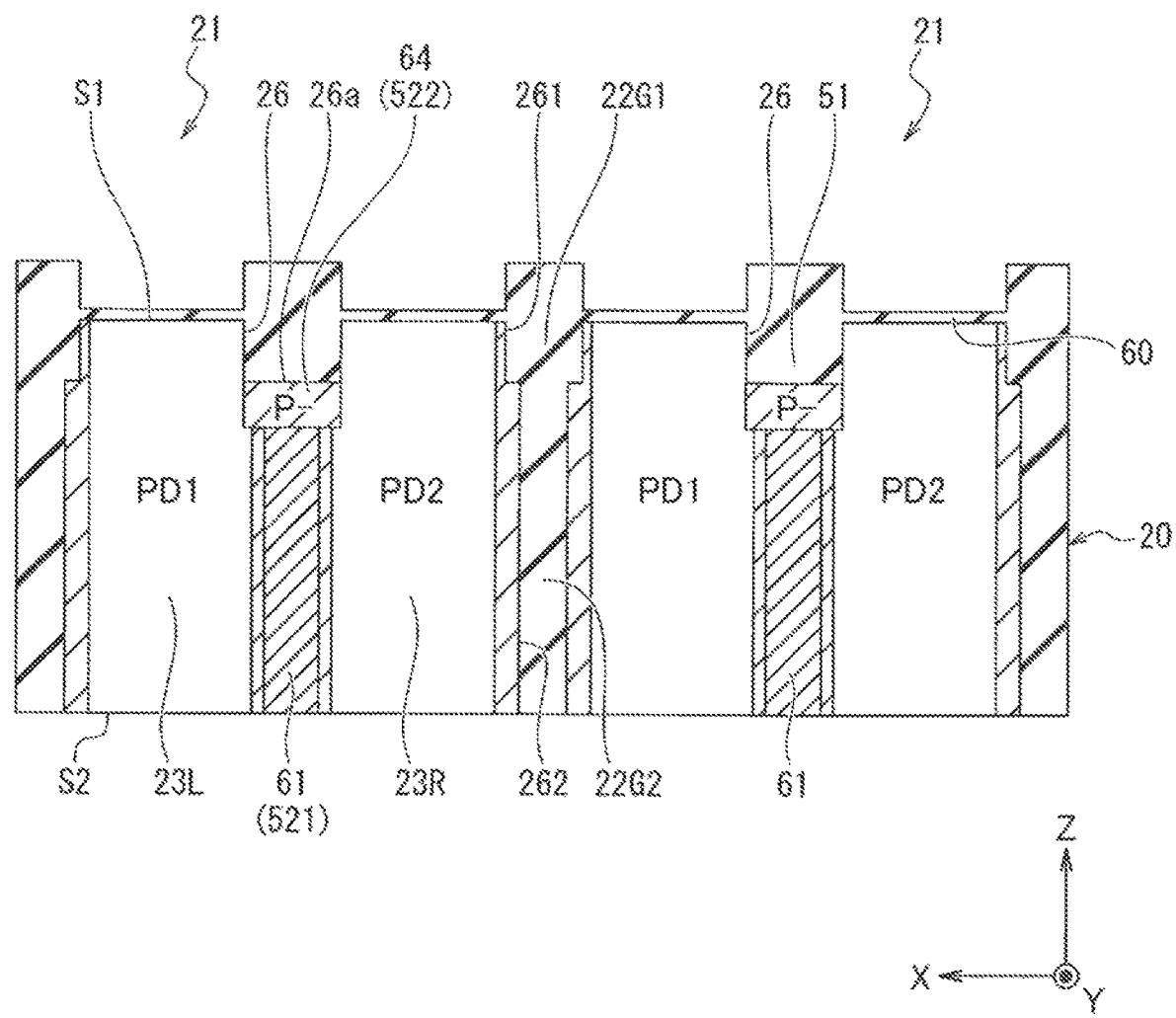
FIG. 22I is a process cross-sectional view subsequent to FIG. 22H.

Next, the excess silicon oxide film 68 is removed by, for example, etching back or the like, and then the excess silicon nitride film 63 is removed. Accordingly, a state as illustrated in FIG. 22I is obtained. Accordingly, the unit isolation portions 22G1 and 22G2 and the first region 51 are obtained. As illustrated in FIG. 22I, the unit isolation portion 22G1 is formed in the groove 261, and the unit isolation portion 22G2 is formed in the groove 262 having a smaller dimension in a plan view than the groove 261. Through such a step, the width of the unit isolation portion 22G2 is formed to be smaller than the width of the unit isolation portion 22G1.

Note that, although not illustrated here, the third regions 53G1 and 53G2 are also formed in the same manner in a step common to the unit isolation portions 22G1 and 22G2. Furthermore, since the subsequent steps are the same as the steps of the solid-state imaging device 1 described in the first embodiment, the description thereof will be omitted here.

Main Effects of Eighth Embodiment

Even with the solid-state imaging device 1 according to the eighth embodiment, effects similar to those of the solid-state imaging device 1 according to the first embodiment described above can be obtained.

Furthermore, in the solid-state imaging device 1 according to the eighth embodiment, the widths of the portions of the third region 53G and the unit isolation portion 22G closer to the second surface S2 side are smaller than the width of the portion closer to the first surface S1 side. Therefore, even if the pixels are miniaturized, it is possible to suppress narrowing of the active region where the photoelectric conversion unit 21 is formed, and it is possible to suppress narrowing of the regions of the first charge accumulation region 25L and the second charge accumulation region 25R. Accordingly, even in a case where the pixels are miniaturized, it is possible to suppress a decrease in the number of saturated electrons in the first charge accumulation region 25L and the second charge accumulation region 25R. Thus, even in a case where the pixels are miniaturized, it is possible to suppress narrowing of the signal range in which phase difference detection can be performed and the signal range in which the linearity of the addition signal Q3 with respect to the light amount can be maintained.

Furthermore, in the solid-state imaging device 1 according to the eighth embodiment, narrowing of the active region where the photoelectric conversion unit 21 is formed is suppressed even if the pixels are miniaturized, and thus, the second portion 522 of the isolation portion 50G and the transfer gate electrodes TRG1 and TRG2 can be further distanced from each other. Therefore, it is possible to further suppress fluctuations in the height of the first potential barrier P1, which is the potential barrier of the isolation portion 50G, due to the ON/OFF operations of the first transfer transistor 24L and the second transfer transistor 24R.

Furthermore, in the method for manufacturing the solid-state imaging device 1 according to the eighth embodiment, the second dry etching is further performed on the bottom portion 261*a* of the groove 261 formed by the first dry etching to form the groove 262. Therefore, the unit isolation portion 22G2 can be formed while suppressing misalignment with respect to the unit isolation portion 22G1. The third regions 53G1 and 53G2 are also formed in the same manner in a step common to the unit isolation portions 22G1 and 22G2. Therefore, the third region 53G2 can be formed while suppressing misalignment with respect to the third region 53G1.

Ninth Embodiment

Figure 23:
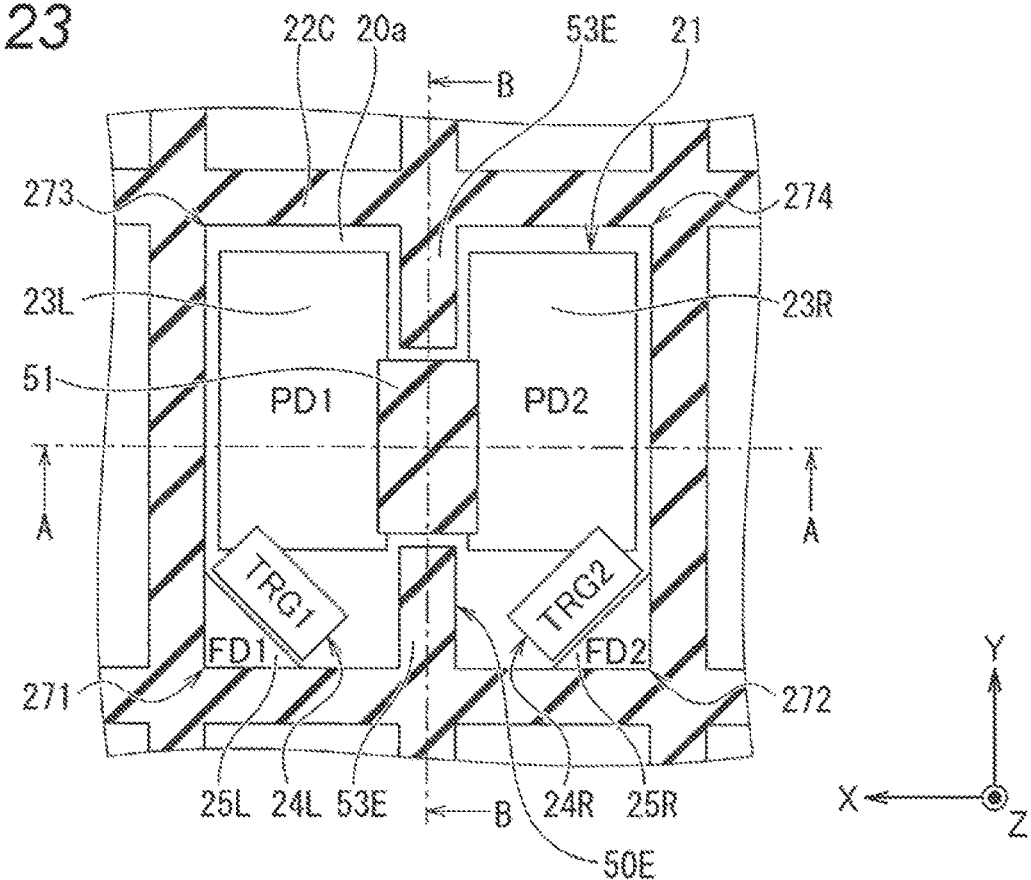
FIG. 23 is a transverse cross-sectional view illustrating a relative relationship between respective components when a pixel of a solid-state imaging device according to a ninth embodiment of the present technology is viewed in a cross section on a first plane.

A ninth embodiment of the present technology illustrated in FIG. 23 will be described below. The solid-state imaging device 1 according to the ninth embodiment is different from the solid-state imaging device 1 according to the first embodiment described above in that each of the first transfer transistor 24L and the first charge accumulation region 25L, and the second transfer transistor 24R and the second charge accumulation region 25R is provided near the corner portion of the photoelectric conversion unit 21, that the third region 53E is included instead of the third region 53, and that the unit isolation portion 22C is included instead of the unit isolation portion 22. Other configurations of the solid-state imaging device 1 are basically similar to those of the solid-state imaging device 1 according to the first embodiment described above. Note that the components already described are denoted by the same reference numerals, and the description thereof will be omitted. Note that a longitudinal cross-sectional view illustrating the main part of the cross-sectional structure along line A-A in FIG. 23 is the same as that in FIG. 16B, and a longitudinal cross-sectional view illustrating the main part of the cross-sectional structure along line B-B is the same as that in FIG. 18B, and thus illustration is omitted here.

<First Transfer Transistor and First Charge Accumulation Region>

The first transfer transistor 24L and the first charge accumulation region 25L are provided near the corner portion of the photoelectric conversion unit 21. In other words, the first transfer transistor 24L and the first charge accumulation region 25L are provided near the corner portion of the active region 20*a* where the photoelectric conversion unit 21 is provided. The photoelectric conversion unit 21 (active region 20*a*) includes four corner portions 271, 272, 273, and 274. The first transfer transistor 24L and the first charge accumulation region 25L are provided closer to the corner portion side on the first photoelectric conversion portion 23L side in the X direction. FIG. 23 illustrates an example in which the first transfer transistor 24L and the first charge accumulation region 25L are provided closer to the corner portion 271 side of the corner portions 271 and 273 on the first photoelectric conversion portion 23L side. Further, out of the first transfer transistor 24L and the first charge accumulation region 25L, the first charge accumulation region 25L is provided at a position closer to the corner portion 271. In addition, the first charge accumulation region 25L is provided in a triangular shape in a plan view.

With such a configuration, the signal charge generated in the first photoelectric conversion portion 23L passes through the channel region of the first transfer transistor 24L provided near the corner portion 271 and flows into the first charge accumulation region 25L provided near the corner portion 271.

<Second Transfer Transistor and Second Charge Accumulation Region>

The second transfer transistor 24R and the second charge accumulation region 25R are provided near the corner portion of the photoelectric conversion unit 21. In other words, the second transfer transistor 24R and the second charge accumulation region 25R are provided near the corner portion of the active region 20*a* where the photoelectric conversion unit 21 is provided. The second transfer transistor 24R and the second charge accumulation region 25R are provided closer to the corner portion side on the second photoelectric conversion portion 23R side in the X direction. FIG. 23 illustrates an example in which the second transfer transistor 24R and the second charge accumulation region 25R are provided closer to the corner portion 272 side of the corner portions 272 and 274 on the second photoelectric conversion portion 23R side. Further, out of the second transfer transistor 24R and the second charge accumulation region 25R, the second charge accumulation region 25R is provided at a position closer to the corner portion 272. In addition, the second charge accumulation region 25R is provided in a triangular shape in a plan view.

With such a configuration, the signal charge generated in the second photoelectric conversion portion 23R passes through the channel region of the second transfer transistor 24R provided near the corner portion 272 and flows into the second charge accumulation region 25R provided near the corner portion 272.

Main Effects of Ninth Embodiment

Even with the solid-state imaging device 1 according to the ninth embodiment, effects similar to those of the solid-state imaging device 1 according to the first embodiment described above can be obtained.

Furthermore, in the solid-state imaging device 1 according to the ninth embodiment, since each of the first transfer transistor 24L and the first charge accumulation region 25L, and the second transfer transistor 24R and the second charge accumulation region 25R is provided near the corner portion of the photoelectric conversion unit 21, the second portion 522 of the isolation portion 50E and the transfer gate electrodes TRG1 and TRG2 can be further distanced from each other. Therefore, it is possible to further suppress fluctuations in the height of the first potential barrier P1, which is the potential barrier of the isolation portion 50E, due to the ON/OFF operations of the first transfer transistor 24L and the second transfer transistor 24R.

Tenth Embodiment

Figure 24A:
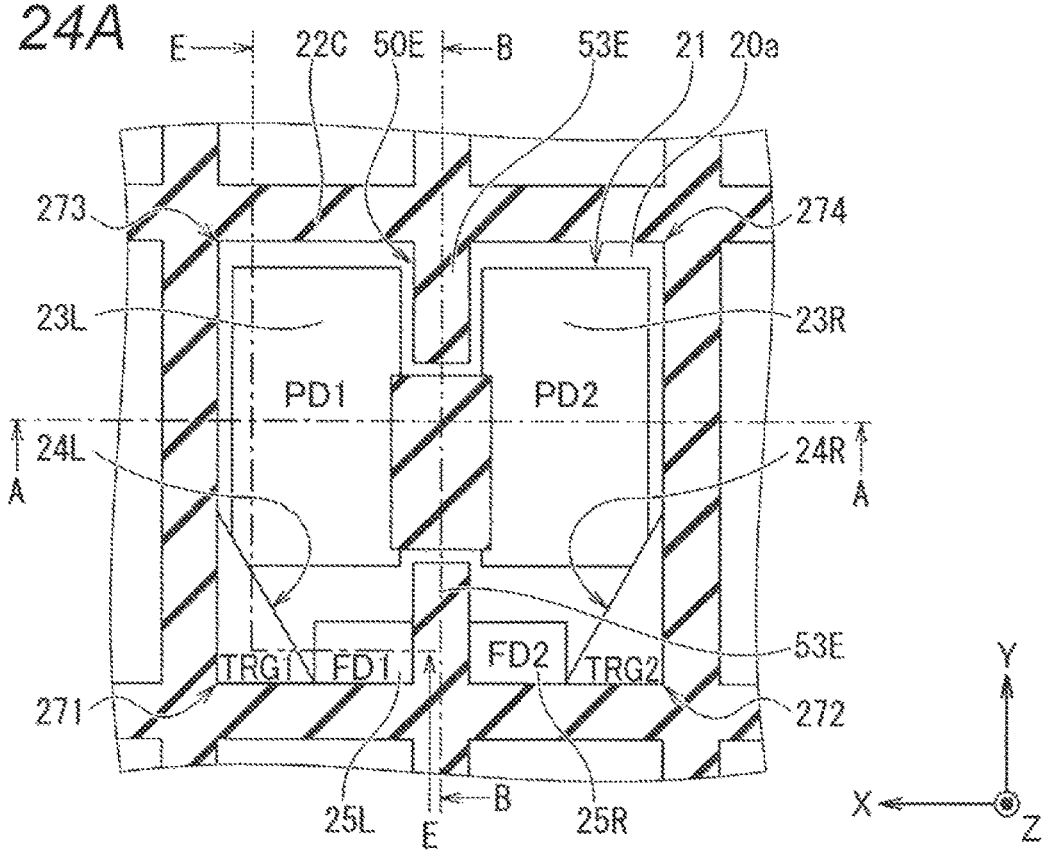
FIG. 24A is a transverse cross-sectional view illustrating a relative relationship between respective components when a pixel of a solid-state imaging device according to a tenth embodiment of the present technology is viewed in a cross section on a first plane.

A tenth embodiment of the present technology illustrated in FIGS. 24A and 24B will be described below. The solid-state imaging device 1 according to the tenth embodiment is different from the solid-state imaging device 1 according to the first embodiment described above in that each of the first transfer transistor 24L and the second transfer transistor 24R is provided near the corner portion of the photoelectric conversion unit 21, that the third region 53E is included instead of the third region 53, and that the unit isolation portion 22C is included instead of the unit isolation portion 22. Other configurations of the solid-state imaging device 1 are basically similar to those of the solid-state imaging device 1 according to the first embodiment described above. Note that the components already described are denoted by the same reference numerals, and the description thereof will be omitted. Note that a longitudinal cross-sectional view illustrating the main part of the cross-sectional structure along line A-A in FIG. 24A is the same as that in FIG. 16B, and a longitudinal cross-sectional view illustrating the main part of the cross-sectional structure along line B-B is the same as that in FIG. 18B, and thus illustration is omitted here.

<First Transfer Transistor>

The first transfer transistor 24L is provided near the corner portion of the photoelectric conversion unit 21. In other words, the first transfer transistor 24L is provided near the corner portion of the active region 20a where the photoelectric conversion unit 21 is provided. The first transfer transistor 24L is provided closer to the corner portion side on the first photoelectric conversion portion 23L side in the X direction. FIG. 24A illustrates an example in which the first transfer transistor 24L is provided closer to the corner portion 271 side of the corner portions 271 and 273 on the first photoelectric conversion portion 23L side. In addition, the first transfer transistor 24L is provided in a triangular shape in a plan view.

Figure 24B:
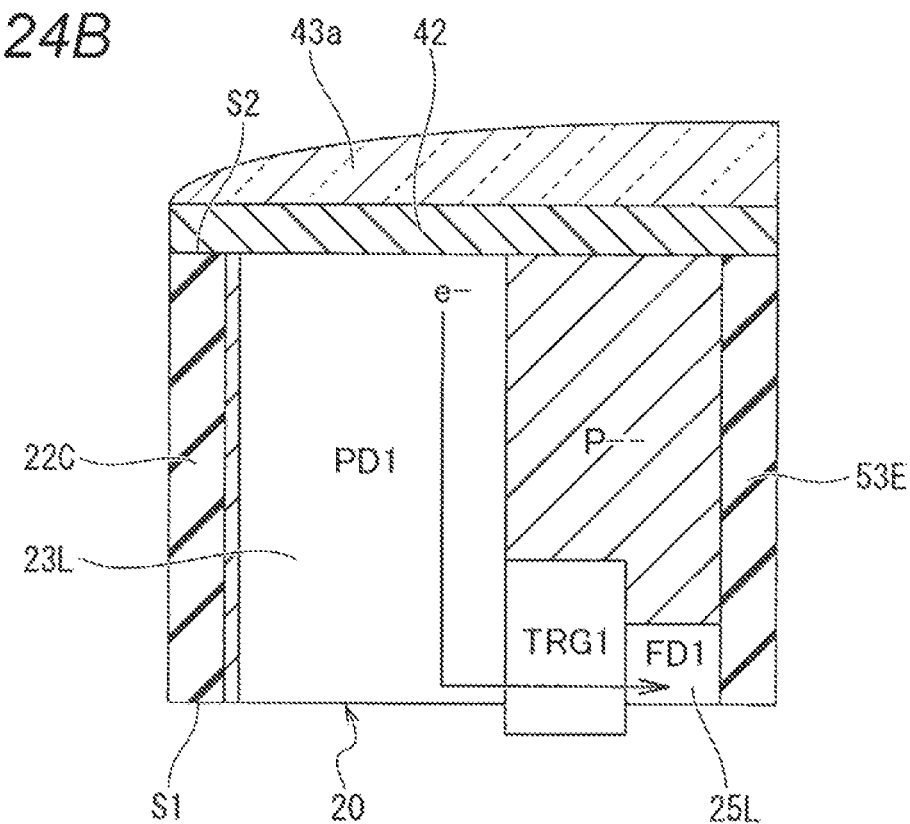
FIG. 24B is a longitudinal cross-sectional view illustrating a part of the cross-sectional structure along line E-E in FIG. 24A.

Furthermore, as illustrated in FIG. 24B, the first transfer transistor 24L is a vertical transistor, and includes a vertical transfer gate electrode TRG1 formed by digging into the semiconductor layer 20. The channel region of the first transfer transistor 24L is formed along the side wall portion of the vertical transfer gate electrode TRG1. As illustrated in FIG. 24B, the signal charge (e) generated in the first photoelectric conversion portion 23L is formed along the side wall portion of the vertical transfer gate electrode TRG1 of the first transfer transistor 24L provided near the corner portion 271, passes through the channel region, and flows into the first charge accumulation region 25L.

<Second Transfer Transistor>

The second transfer transistor 24R is provided near the corner portion of the photoelectric conversion unit 21. In other words, the second transfer transistor 24R is provided near the corner portion of the active region 20a where the photoelectric conversion unit 21 is provided. The second transfer transistor 24R is provided closer to the corner portion side on the second photoelectric conversion portion 23R side in the X direction. FIG. 24A illustrates an example in which the second transfer transistor 24R is provided closer to the corner portion 272 side of the corner portions 272 and 274 on the second photoelectric conversion portion 23R side. In addition, the second transfer transistor 24R is provided in a triangular shape in a plan view.

Furthermore, although not illustrated in FIG. 24B, the second transfer transistor 24R is a vertical transistor similarly to the first transfer transistor 24L, and includes a vertical transfer gate electrode TRG2 formed by digging into the semiconductor layer 20. The channel region of the second transfer transistor 24R is formed along the side wall portion of the vertical transfer gate electrode TRG2. The signal charge generated in the second photoelectric conversion portion 23R is formed along the side wall portion of the vertical transfer gate electrode TRG2 of the second transfer transistor 24R provided near the corner portion 272, passes through the channel region, and flows into the second charge accumulation region 25R.

Main Effects of Tenth Embodiment

Even with the solid-state imaging device 1 according to the tenth embodiment, effects similar to those of the solid-state imaging device 1 according to the first embodiment described above can be obtained.

Furthermore, in the solid-state imaging device 1 according to the tenth embodiment, each of the first transfer transistor 24L and the second transfer transistor 24R is provided near the corner portion of the photoelectric conversion unit 21, and the first transfer transistor 24L and the second transfer transistor 24R are vertical transistors. Therefore, the second portion 522 of the isolation portion 50E and the transfer gate electrodes TRG1 and TRG2 can be further distanced from each other as compared with the case of the above-described ninth embodiment. Therefore, it is possible to further suppress fluctuations in the height of the first potential barrier P1, which is the potential barrier of the isolation portion 50E, due to the ON/OFF operations of the first transfer transistor 24L and the second transfer transistor 24R.

Furthermore, in the solid-state imaging device 1 according to the tenth embodiment, since the transfer gate electrodes TRG1 and TRG2 are vertical transistors, the gate length can be increased as compared with the case of a planar transistor. Therefore, even in a case where the pixel 3 is miniaturized, it is easy to maintain the transfer capability.

Note that, in a case where the vertical transistor electrode is used for the transfer gate, a strong electric field is applied between the charge accumulation region and the transfer gate electrode particularly at the time of transfer of the signal charge, and white spots may occur. In order to suppress the occurrence of white spots, a sidewall structure may be provided by embedding an insulator in the semiconductor layer 20 between the charge accumulation region and the transfer gate electrode.

Eleventh Embodiment

Figure 25A:
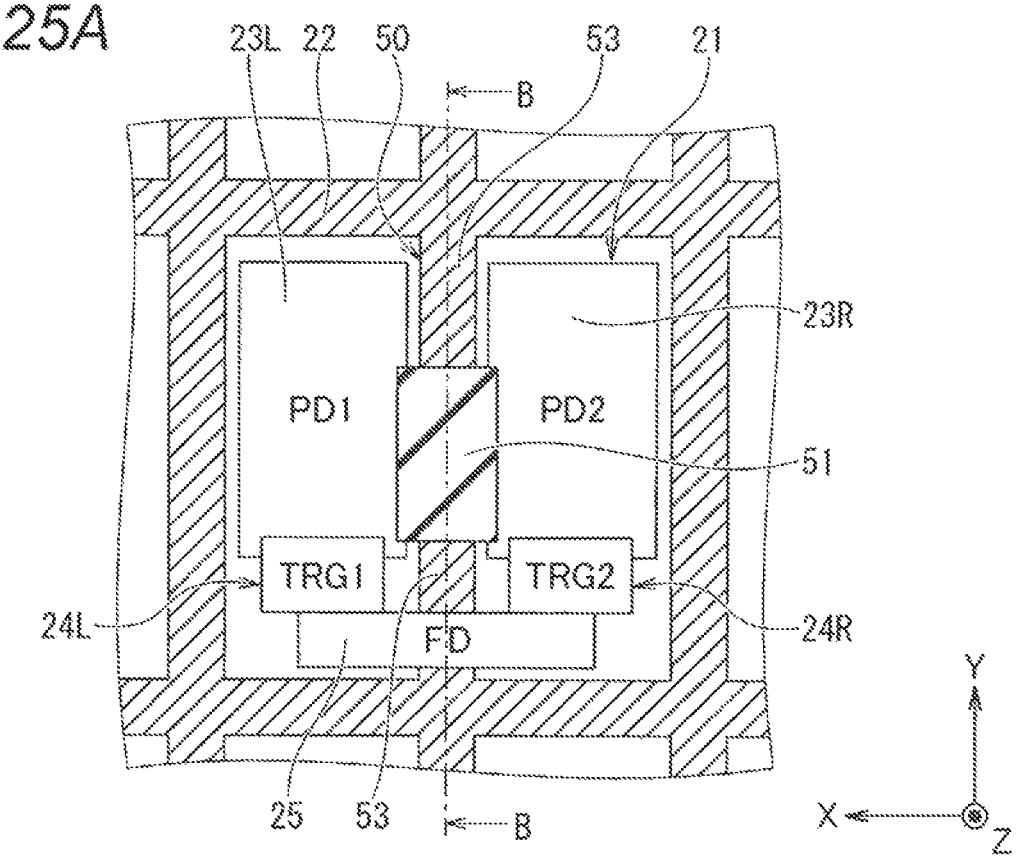
FIG. 25A is a transverse cross-sectional view illustrating a relative relationship between respective components when a pixel of a solid-state imaging device according to an eleventh embodiment of the present technology is viewed in a cross section on a first plane.
Figure 25B:
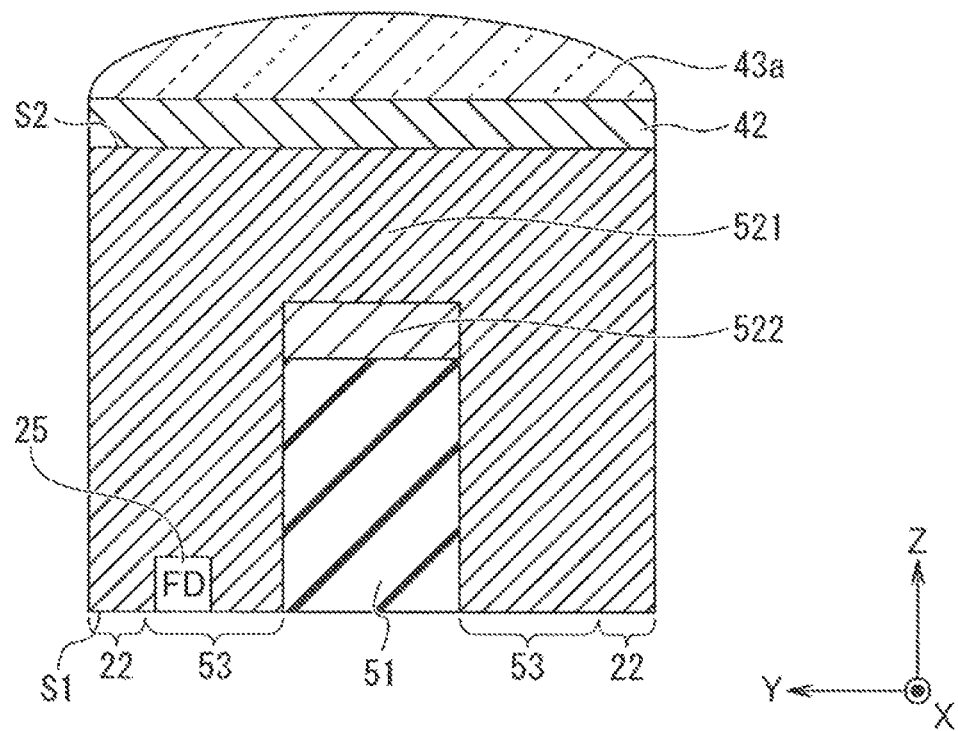
FIG. 25B is a longitudinal cross-sectional view illustrating a main part of the cross-sectional structure along line B-B in FIG. 25A.
Figure 26:
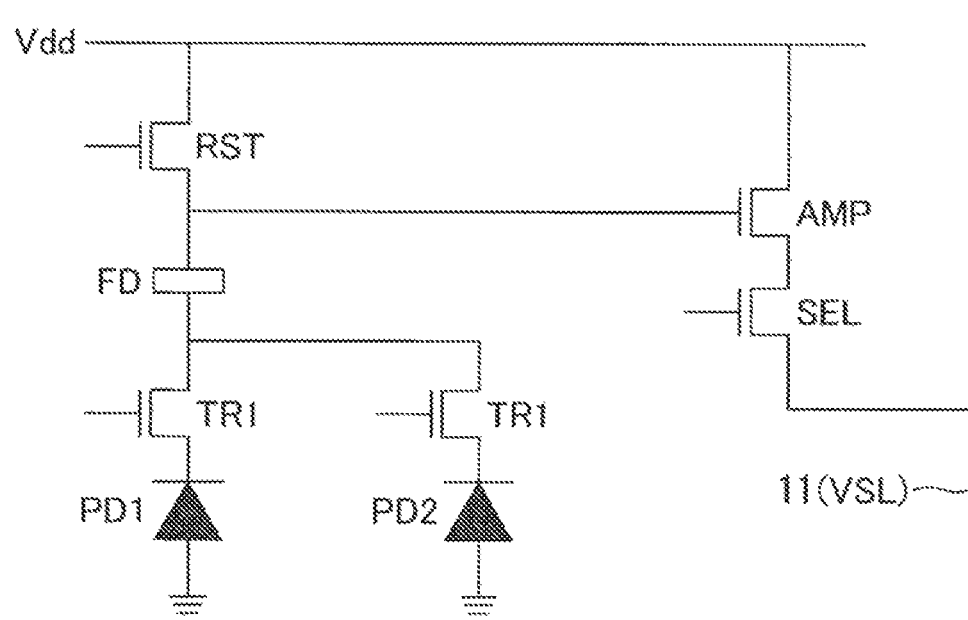
FIG. 26 is an equivalent circuit diagram of a pixel of the solid-state imaging device according to the eleventh embodiment of the present technology.

An eleventh embodiment of the present technology illustrated in FIGS. 25A, 25B, and 26 will be described below. The solid-state imaging device 1 according to the eleventh embodiment is different from the solid-state imaging device 1 according to the first embodiment described above in that the first charge accumulation region 25L and the second charge accumulation region 25R individually provided for each photoelectric conversion unit are integrated to form one charge accumulation region 25, and other configurations of the solid-state imaging device 1 are basically similar to those of the solid-state imaging device 1 according to the first embodiment described above. Note that the components already described are denoted by the same reference numerals, and the description thereof will be omitted.

The charge accumulation region 25 penetrates the third region 53 closer to the transfer gate electrodes TRG1 and TRG2 of the two third regions 53 provided in the Y direction. Then, the first transfer transistor 24L is provided to form a channel in the active region between the first photoelectric conversion portion 23L and the charge accumulation region 25. The second transfer transistor 24R is provided to form a channel in the active region between the second photoelectric conversion portion 23R and the charge accumulation region 25. Thus, the charge accumulation region 25 includes both the function of the first charge accumulation region 25L and the function of the second charge accumulation region 25R provided separately from the first charge accumulation region 25L. Such a configuration is also illustrated in the equivalent circuit diagram of FIG. 26.

Main Effects of Eleventh Embodiment

Even with the solid-state imaging device 1 according to the eleventh embodiment, effects similar to those of the solid-state imaging device 1 according to the first embodiment described above can be obtained.

Furthermore, since the solid-state imaging device 1 according to the eleventh embodiment has a configuration including one charge accumulation region 25, wiring for electrically connecting the charge accumulation regions is unnecessary as compared with a case where the first charge accumulation region 25L and the second charge accumulation region 25R are separately provided. Therefore, it is possible to prevent a parasitic capacitance such as a parasitic capacitance between wirings and a parasitic capacitance between wiring and a substrate from being superimposed on the charge accumulation region 25. Accordingly, a decrease in conversion efficiency can be suppressed.

Twelfth Embodiment

Figure 27A:
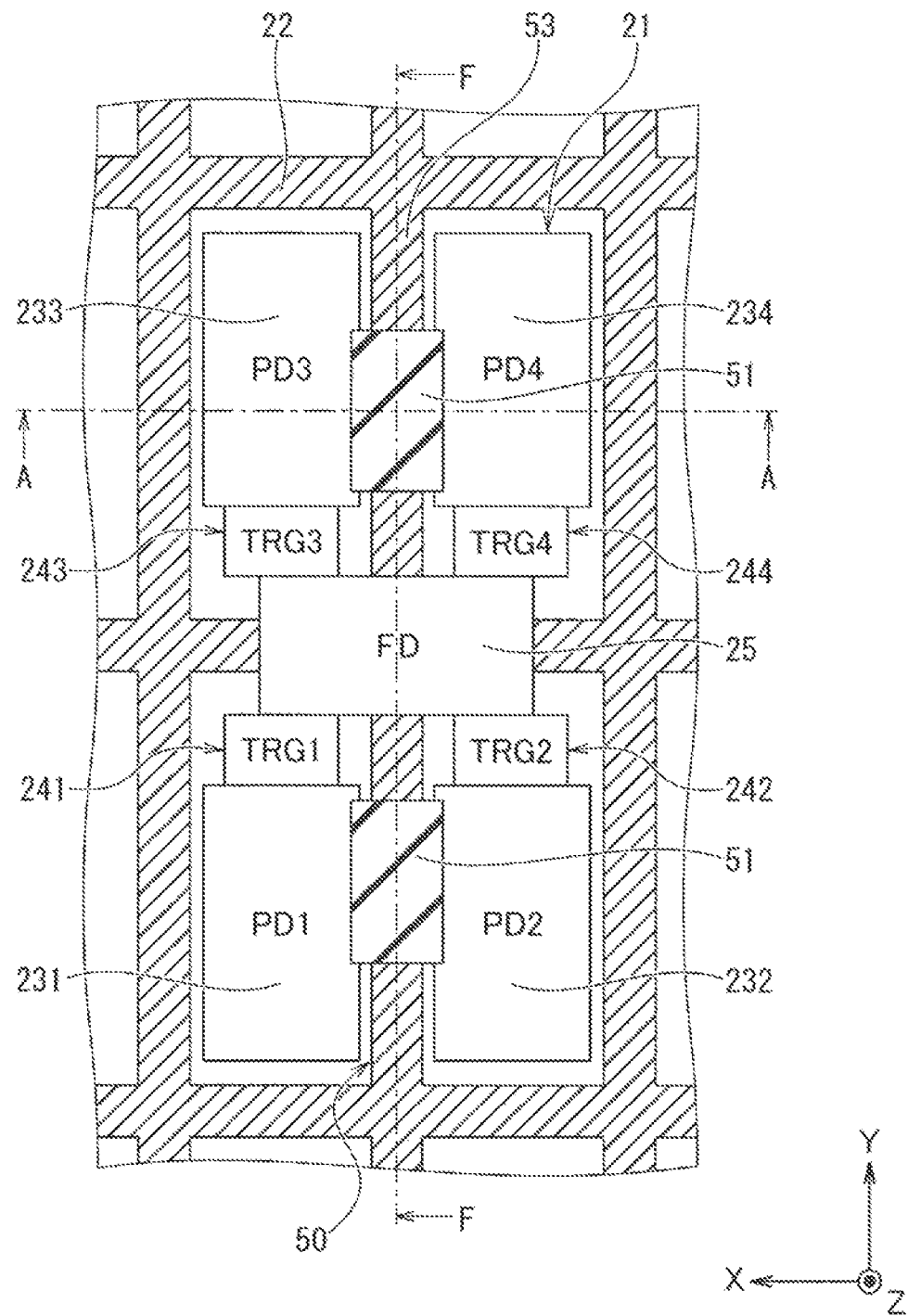
FIG. 27A is a transverse cross-sectional view illustrating a relative relationship between respective components when a pixel of a solid-state imaging device according to a twelfth embodiment of the present technology is viewed in a cross section on a first plane.
Figure 27B:
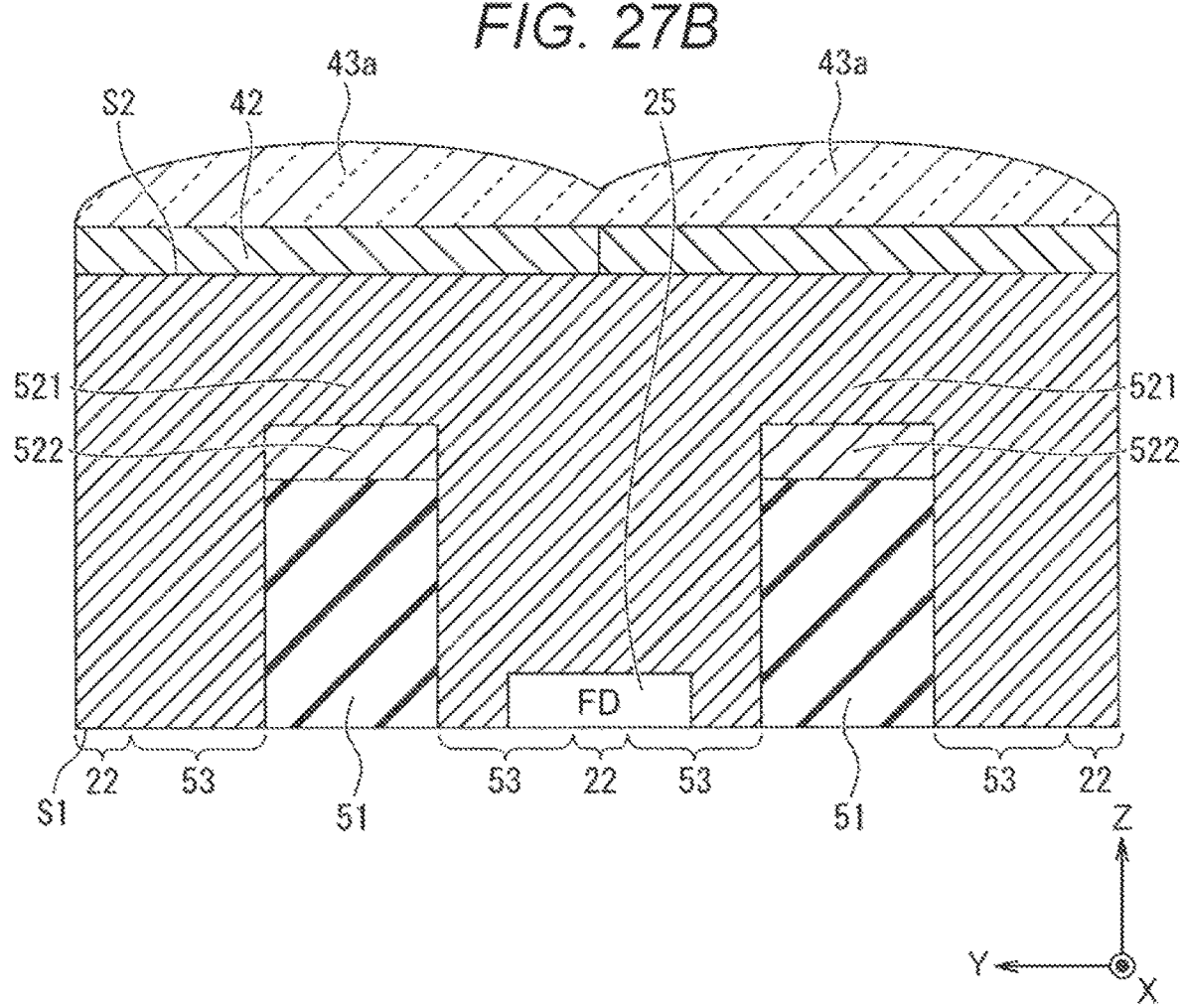
FIG. 27B is a longitudinal cross-sectional view illustrating a main part of the cross-sectional structure along line F-F in FIG. 27A.
Figure 28:
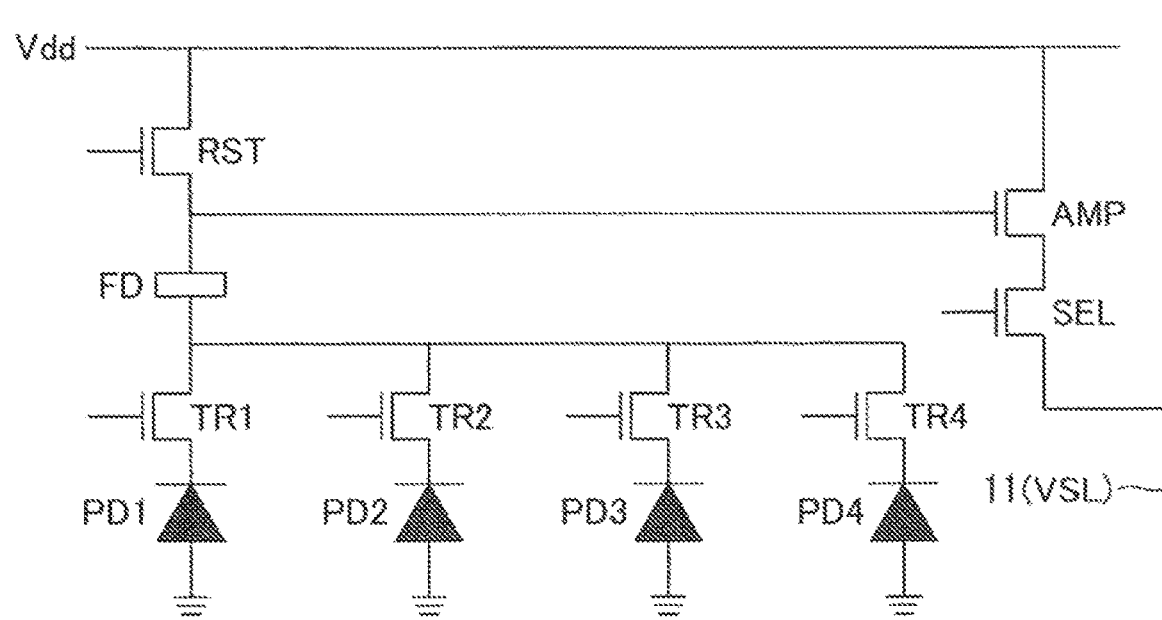
FIG. 28 is an equivalent circuit diagram of a pixel of the solid-state imaging device according to the twelfth embodiment of the present technology.

A twelfth embodiment of the present technology illustrated in FIGS. 27A, 27B, and 28 will be described below. The solid-state imaging device 1 according to the twelfth embodiment is different from the solid-state imaging device 1 according to the first embodiment described above in that the first charge accumulation region 25L and the second charge accumulation region 25R individually provided for each photoelectric conversion unit are integrated to form one charge accumulation region 25, and one charge accumulation region 25 is shared by a plurality of photoelectric conversion units 21 (pixels 3), and other configurations of the solid-state imaging device 1 are basically similar to those of the solid-state imaging device 1 according to the first embodiment described above. Note that the components already described are denoted by the same reference numerals, and the description thereof will be omitted. Note that a longitudinal cross-sectional view illustrating a main part of the cross-sectional structure along line A-A in FIG. 27 is the same as that in FIG. 6B, and thus illustration is omitted here.

The charge accumulation region 25 penetrates the third region 53 closer to the transfer gate electrodes TRG1 and TRG2 of the two third regions 53 provided in the Y direction and the unit isolation portion 22. Then, a first transfer transistor 241 is provided to form a channel in the active region between a first photoelectric conversion portion 231 and the charge accumulation region 25. A second transfer transistor 242 is provided to form a channel in the active region between a second photoelectric conversion portion 232 and the charge accumulation region 25. A third transfer transistor 243 is provided to form a channel in the active region between a third photoelectric conversion portion 233 and the charge accumulation region 25. A fourth transfer transistor 244 is provided to form a channel in an active region between a first photoelectric conversion portion 234 and the charge accumulation region 25. Such a configuration is also illustrated in the equivalent circuit diagram of FIG. 28.

Main Effects of Twelfth Embodiment

Even with the solid-state imaging device 1 according to the twelfth embodiment, effects similar to those of the solid-state imaging device 1 according to the first embodiment described above can be obtained.

Furthermore, in the solid-state imaging device 1 according to the twelfth embodiment, the charge accumulation region 25 is shared by a plurality of photoelectric conversion units 21 (pixels 3). That is, by increasing the number of the pixels 3 sharing the charge accumulation region 25, the number of the reset transistors RST, the amplification transistors AMP, and the selection transistors SEL for driving the pixels 3 can be reduced. Therefore, a structure corresponding to further miniaturization can be obtained.

Thirteenth Embodiment

Figure 29:
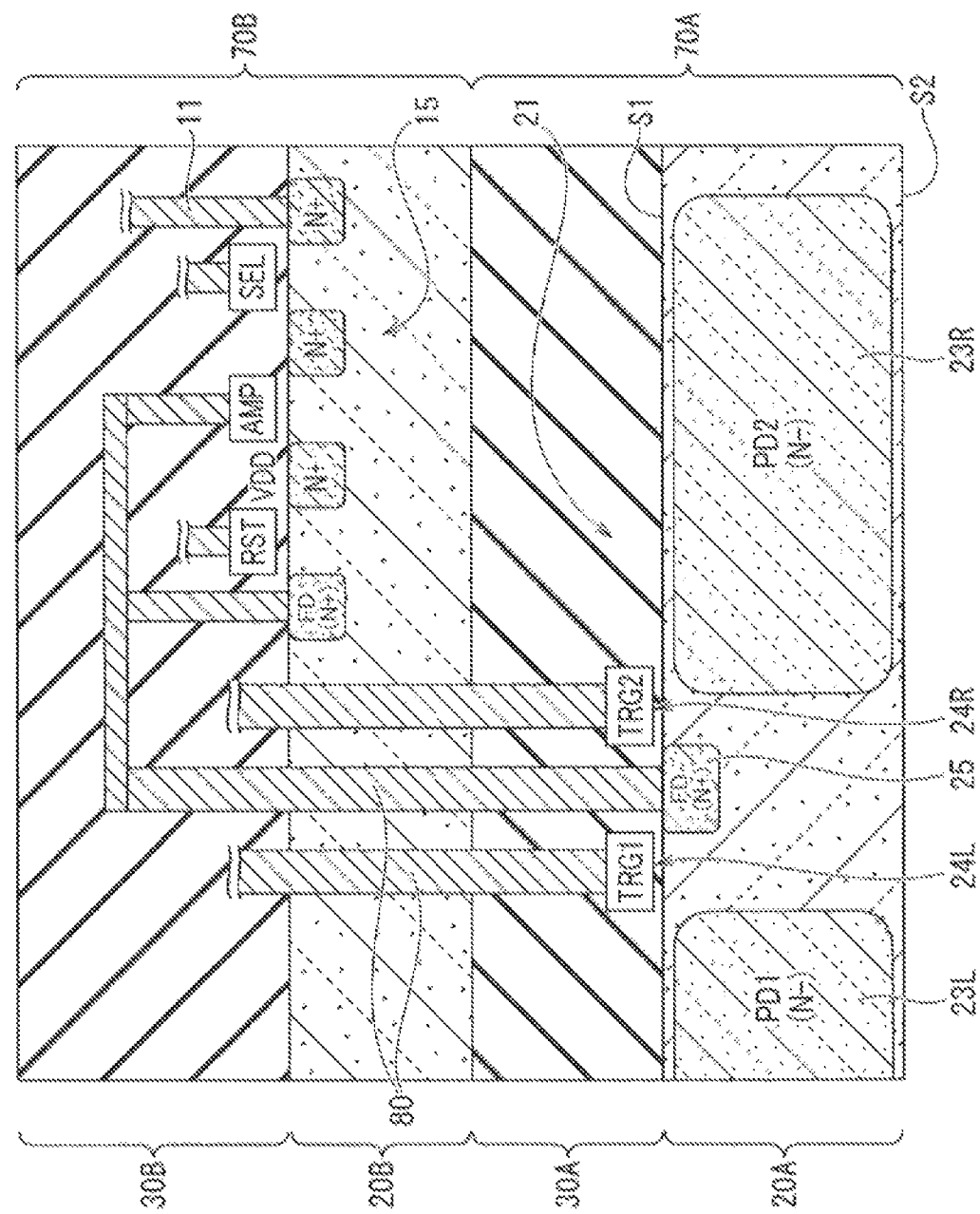
FIG. 29 is a longitudinal cross-sectional view illustrating a main part of a cross section of a stacked structure of a solid-state imaging device according to a thirteenth embodiment of the present technology.

A thirteenth embodiment of the present technology illustrated in FIG. 29 will be described below. The solid-state imaging device 1 according to the thirteenth embodiment is different from the solid-state imaging device 1 according to the first embodiment described above in that the solid-state imaging device 1 has a structure in which two semiconductor substrates are joined, and other configurations of the solid-state imaging device 1 are basically similar to those of the solid-state imaging device 1 according to the first embodiment described above. Note that the components already described are denoted by the same reference numerals, and the description thereof will be omitted.

<Stacked Structure of Solid-State Imaging Device>

The solid-state imaging device 1 includes a light receiving substrate 70A and a pixel circuit substrate 70B superimposed on the light receiving substrate 70A. That is, the solid-state imaging device 1 is a stacked CMOS image sensor (CIS).

The light receiving substrate 70A includes a semiconductor layer 20A having a first surface S1 and a second surface S2 located opposite to each other, and a multilayer wiring layer 30A provided on the first surface S1 side of the semiconductor layer 20A. On the second surface S2 side of the semiconductor layer 20A, as in the case of the first embodiment, known members such as a color filter 42 and a microlens layer 43 are provided, but the illustration thereof is omitted here. A photoelectric conversion unit 21 is provided in the semiconductor layer 20A.

The pixel circuit substrate 70B includes a semiconductor layer 20B and a multilayer wiring layer 30B provided on one surface side of the semiconductor layer 20B. The semiconductor layer 20B is provided with a readout circuit 15. Further, the other surface of the semiconductor layer 20B is superimposed on the surface of the multilayer wiring layer 30A on the side opposite to the semiconductor layer 20A side. Then, the readout circuit 15 and the photoelectric conversion unit 21 are electrically connected via a through electrode 80.

Main Effects of Thirteenth Embodiment

Even with the solid-state imaging device 1 according to the thirteenth embodiment, effects similar to those of the solid-state imaging device 1 according to the first embodiment described above can be obtained.

Furthermore, in the solid-state imaging device 1 according to the thirteenth embodiment, the readout circuit 15 and the photoelectric conversion unit 21 are provided on separate substrates. Therefore, a margin is generated in the element arrangement space in the photoelectric conversion unit 21, and the second portion 522 of the isolation portion 50 and the transfer gate electrodes TRG1 and TRG2 can be further distanced from each other. Therefore, it is possible to further suppress fluctuations in the height of the first potential barrier P1, which is the potential barrier of the isolation portion 50, due to the ON/OFF operations of the first transfer transistor 24L and the second transfer transistor 24R.

Note that the photoelectric conversion unit 21 is not limited to the photoelectric conversion unit 21 described in the first embodiment described above, and may be any one of the photoelectric conversion units 21 described in the second to the twelfth embodiments described above.

Fourteenth Embodiment

Figure 30:
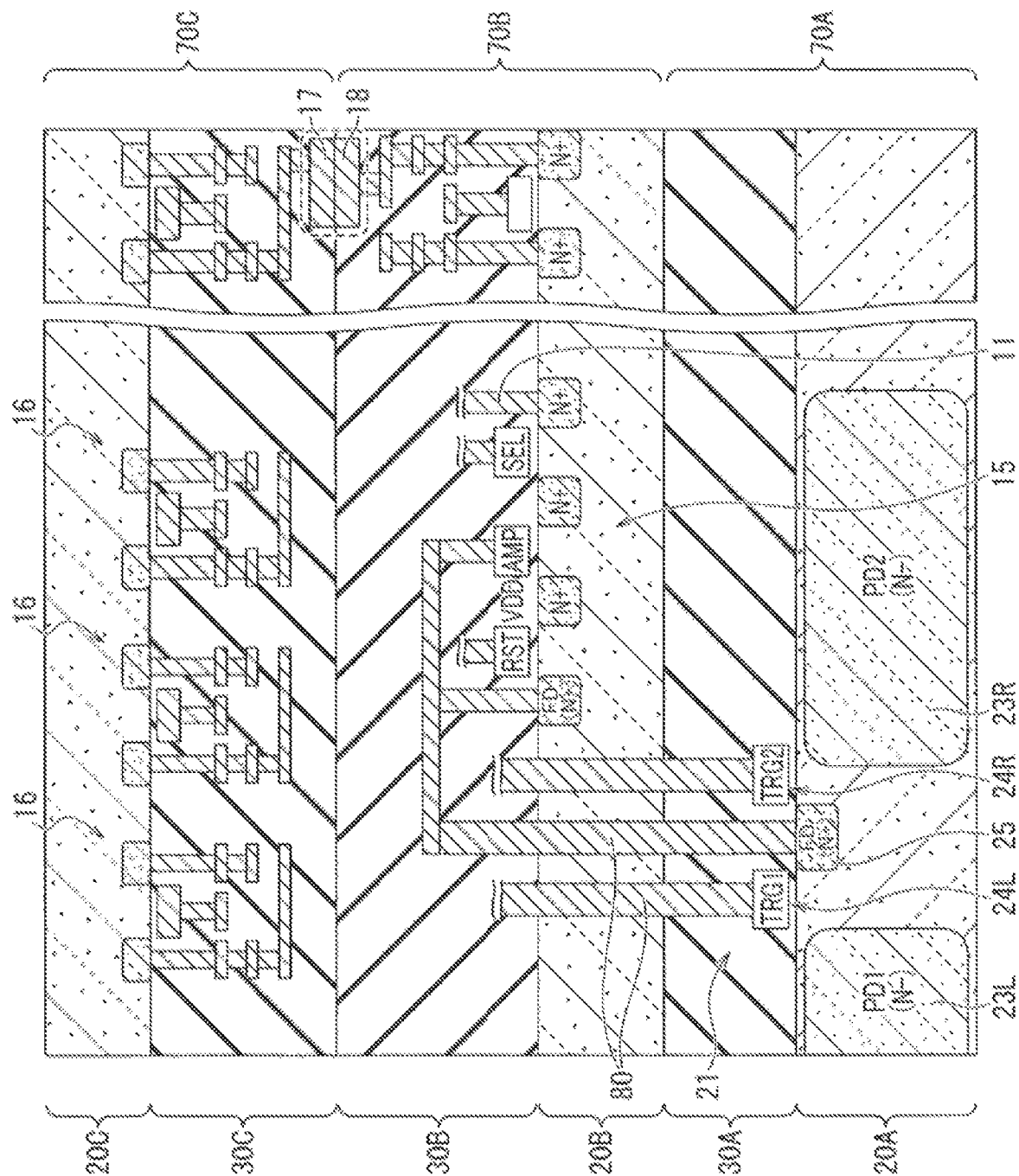
FIG. 30 is a longitudinal cross-sectional view illustrating a main part of a cross section of a stacked structure of a solid-state imaging device according to a fourteenth embodiment of the present technology.

A fourteenth embodiment of the present technology illustrated in FIG. 30 will be described below. The solid-state imaging device 1 according to the fourteenth embodiment is different from the solid-state imaging device 1 according to the first embodiment described above in that the solid-state imaging device 1 has a structure in which three semiconductor substrates are joined, and other configurations of the solid-state imaging device 1 are basically similar to those of the solid-state imaging device 1 according to the first embodiment described above. Note that the components already described are denoted by the same reference numerals, and the description thereof will be omitted.

<Stacked Structure of Solid-State Imaging Device>

The solid-state imaging device 1 includes a light receiving substrate 70A, a pixel circuit substrate 70B superimposed on the light receiving substrate 70A, and a logic circuit substrate 70C superimposed on the pixel circuit substrate 70B. That is, the solid-state imaging device 1 is a stacked CMOS image sensor (CIS).

The logic circuit substrate 70C includes a semiconductor layer 20C and a multilayer wiring layer 30C provided on one surface side of the semiconductor layer 20C. In the semiconductor layer 20C, a transistor group 16 constituting the logic circuit 13 of FIG. 2 is provided. In addition, the multilayer wiring layer 30C is superimposed on the multilayer wiring layer 30B. The electrode pad 17 is desired on the surface of the multilayer wiring layer 30C on the multilayer wiring layer 30B side. Then, the electrode pad 18 is desired on the surface of the multilayer wiring layer 30B on the multilayer wiring layer 30C side. Since the electrode pad 17 and the electrode pad 18 are bonded, the pixel circuit substrate 70B and the logic circuit substrate 70C are electrically connected.

Main Effects of Fourteenth Embodiment

Even with the solid-state imaging device 1 according to the fourteenth embodiment, effects similar to those of the solid-state imaging device 1 according to the first embodiment described above and the solid-state imaging device 1 according to the thirteenth embodiment described above can be obtained.

Note that the photoelectric conversion unit 21 is not limited to the photoelectric conversion unit 21 described in the first embodiment described above, and may be any one of the photoelectric conversion units 21 described in the second to the twelfth embodiments described above.

Application Example

<1. Application Example to Electronic Device>

Further, each of above-described solid-state imaging devices 1 is applicable to various electronic devices including an imaging system such as a digital still camera and a digital video camera, a mobile phone having an imaging function, and another device having an imaging function, for example.

FIG. 31 is a block diagram illustrating a configuration example of an imaging device mounted on an electronic device.

As illustrated in FIG. 31, an imaging device 101 includes an optical system 102, a solid-state imaging device 103, and a digital signal processor (DSP) 104, is configured by connecting a DSP 104, a display device 105, an operation system 106, a memory 108, a recording device 109, and a power supply system 110 via a bus 107, and is capable of capturing a still image and a moving image.

The optical system 102 has one or more lenses, and guides image light (incident light 111) from a subject to the solid-state imaging device 103 to form an image on a light receiving surface (sensor section) of the solid-state imaging device 103.

As the solid-state imaging device 103, the solid-state imaging device 1 of any of the above-described configuration examples is applied. Electrons are accumulated in the solid-state imaging device 103 for a certain period in accordance with the image formed on the light receiving surface via the optical system 102. Then, a signal corresponding to the electrons accumulated in the solid-state imaging device 103 is supplied to the DSP 104.

The DSP 104 performs various types of signal processing on the signal from the solid-state imaging device 103 to acquire an image, and temporarily stores data of the image in the memory 108. The image data stored in the memory 108 is recorded in the recording device 109 or supplied to the display device 105 to display the image. Furthermore, the operation system 106 receives various operations by the user and supplies an operation signal to each block of the imaging device 101, and the power supply system 110 supplies power necessary for driving each block of the imaging device 101.

<2. Application Example to Mobile Body>

The technology according to the present disclosure (the present technology) can be applied to various products. For example, the technology according to the present disclosure may also be realized as a device mounted on any type of mobile body such as an automobile, an electric vehicle, a hybrid electric vehicle, a motorcycle, a bicycle, a personal mobility, an airplane, a drone, a ship, and a robot.

Figure 32:
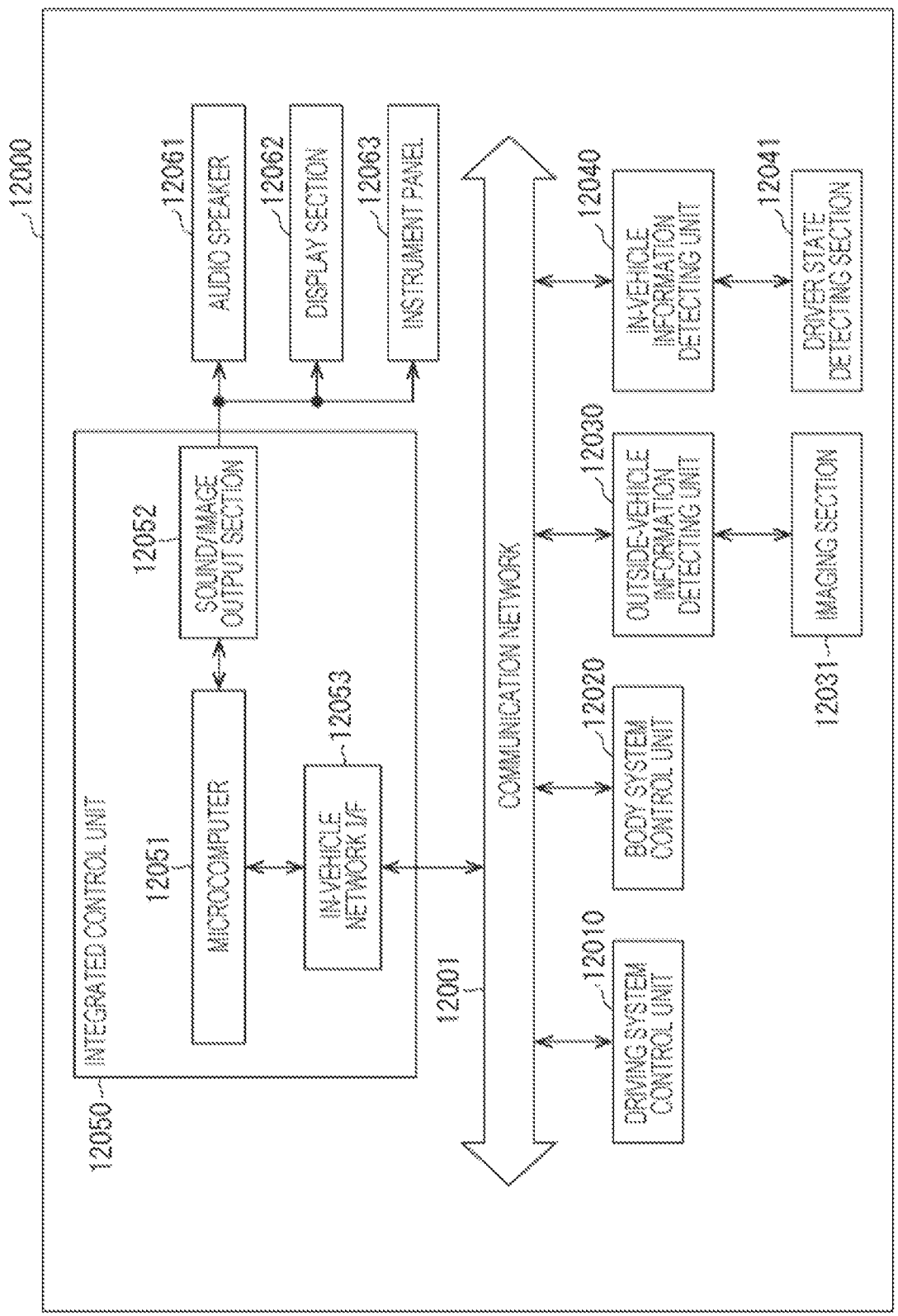
FIG. 32 is a block diagram illustrating an example of a schematic configuration of a vehicle control system.

FIG. 32 is a block diagram illustrating a schematic configuration example of a vehicle control system which is an example of a mobile body control system to which the technology according to the present disclosure can be applied.

The vehicle control system 12000 includes a plurality of electronic control units connected to each other via a communication network 12001. In the example illustrated in FIG. 32, the vehicle control system 12000 includes a driving system control unit 12010, a body system control unit 12020, an outside-vehicle information detecting unit 12030, an in-vehicle information detecting unit 12040, and an integrated control unit 12050. Furthermore, as a functional configuration of the integrated control unit 12050, a microcomputer 12051, a sound/image output section 12052, and an in-vehicle network interface (I/F) 12053 are illustrated.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

Furthermore, the microcomputer 12051 can output a control command to the body system control unit 12020 on the basis of the vehicle exterior information acquired by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 32, an audio speaker 12061, a display section 12062, and an instrument panel 12063 are illustrated as the output device. The display section 12062 may, for example, include at least one of an on-board display and a head-up display.

Figure 33:
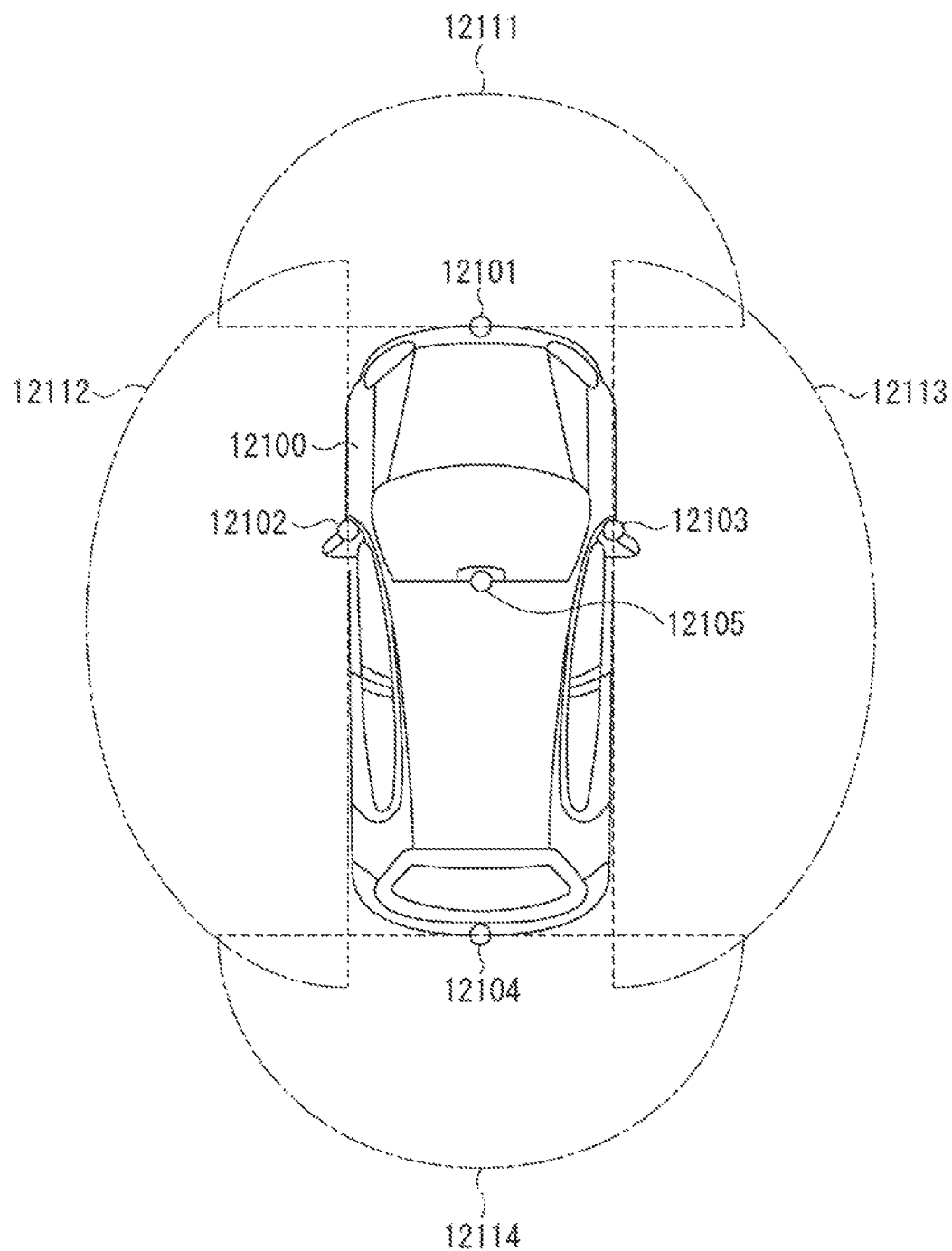
FIG. 33 is an explanatory view illustrating an example of installation positions of an outside-vehicle information detecting unit and an imaging section.

FIG. 33 is a diagram illustrating an example of the installation position of the imaging section 12031.

In FIG. 33, a vehicle 12100 includes imaging sections 12101, 12102, 12103, 12104, and 12105, as the imaging section 12031.

The imaging sections 12101, 12102, 12103, 12104, and 12105 are provided at positions on a front nose, sideview mirrors, a rear bumper, and a back door of the vehicle 12100 as well as a position on an upper portion of a windshield within the interior of the vehicle, for example. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The forward side images obtained by the imaging sections 12101 and 12105 are mainly used to detect a preceding vehicle, a pedestrian, an obstacle, a traffic light, a traffic sign, a lane, or the like.

Note that FIG. 33 illustrates an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure may be applied to the imaging section 12031 among the configurations described above. Specifically, any of the solid-state imaging devices 1 described in the first to fourteenth embodiments described above can be applied to the imaging section 12031. By applying the technology according to the present disclosure to the imaging section 12031, a better captured image can be obtained, by which fatigue of the driver can be reduced.

<3. Application Example to Endoscopic Surgery System>

The technology according to the present disclosure (the present technology) can be applied to various products. For example, the technology according to the present disclosure may be applied to an endoscopic surgery system.

Figure 34:
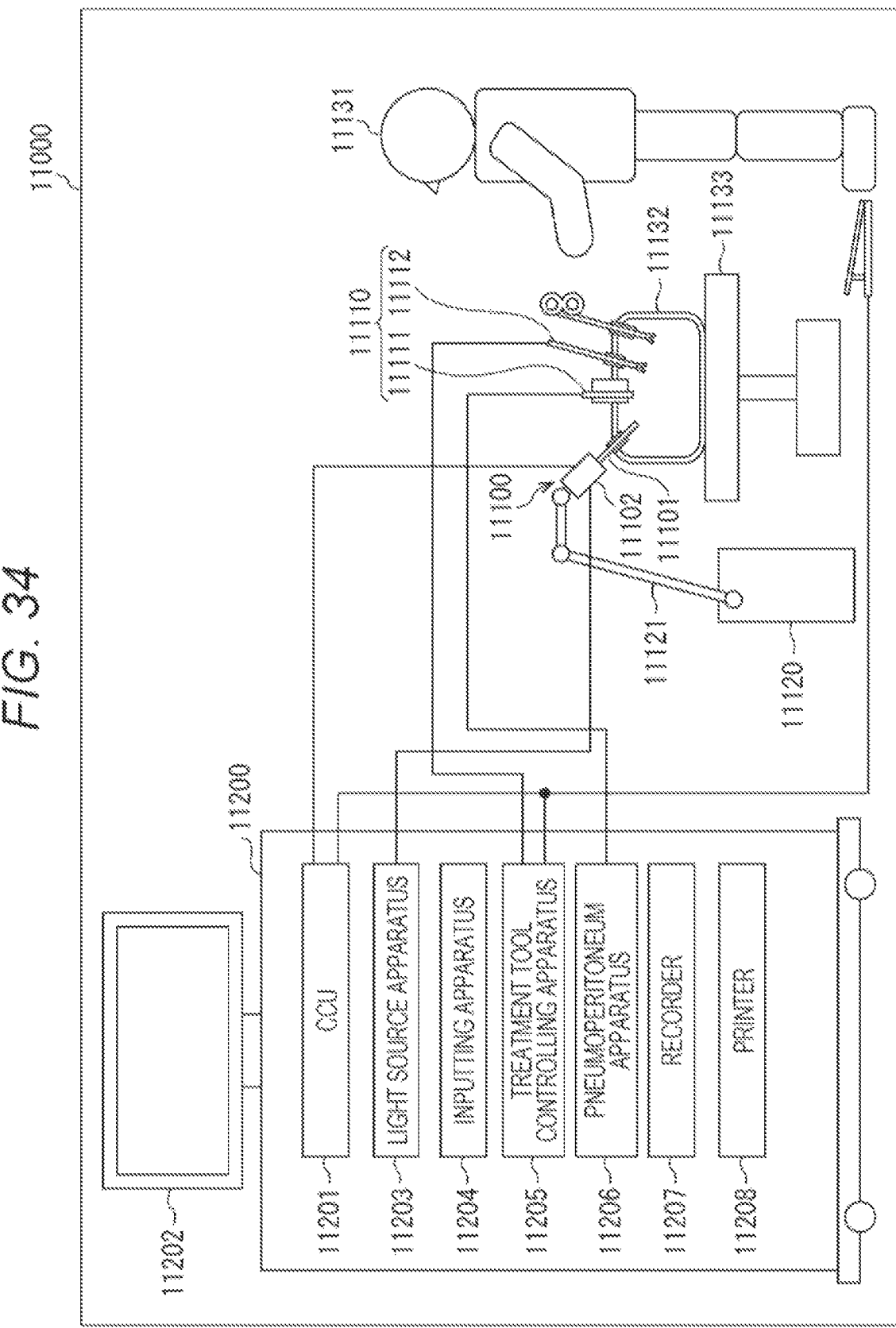
FIG. 34 is a diagram illustrating an example of a schematic configuration of an endoscopic surgery system.

FIG. 34 is a diagram illustrating an example of a schematic configuration of an endoscopic surgery system to which the technology according to the present disclosure (present technology) can be applied.

In FIG. 34, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a camera control unit (CCU) 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user inputs an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. In a case where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

Figure 35:
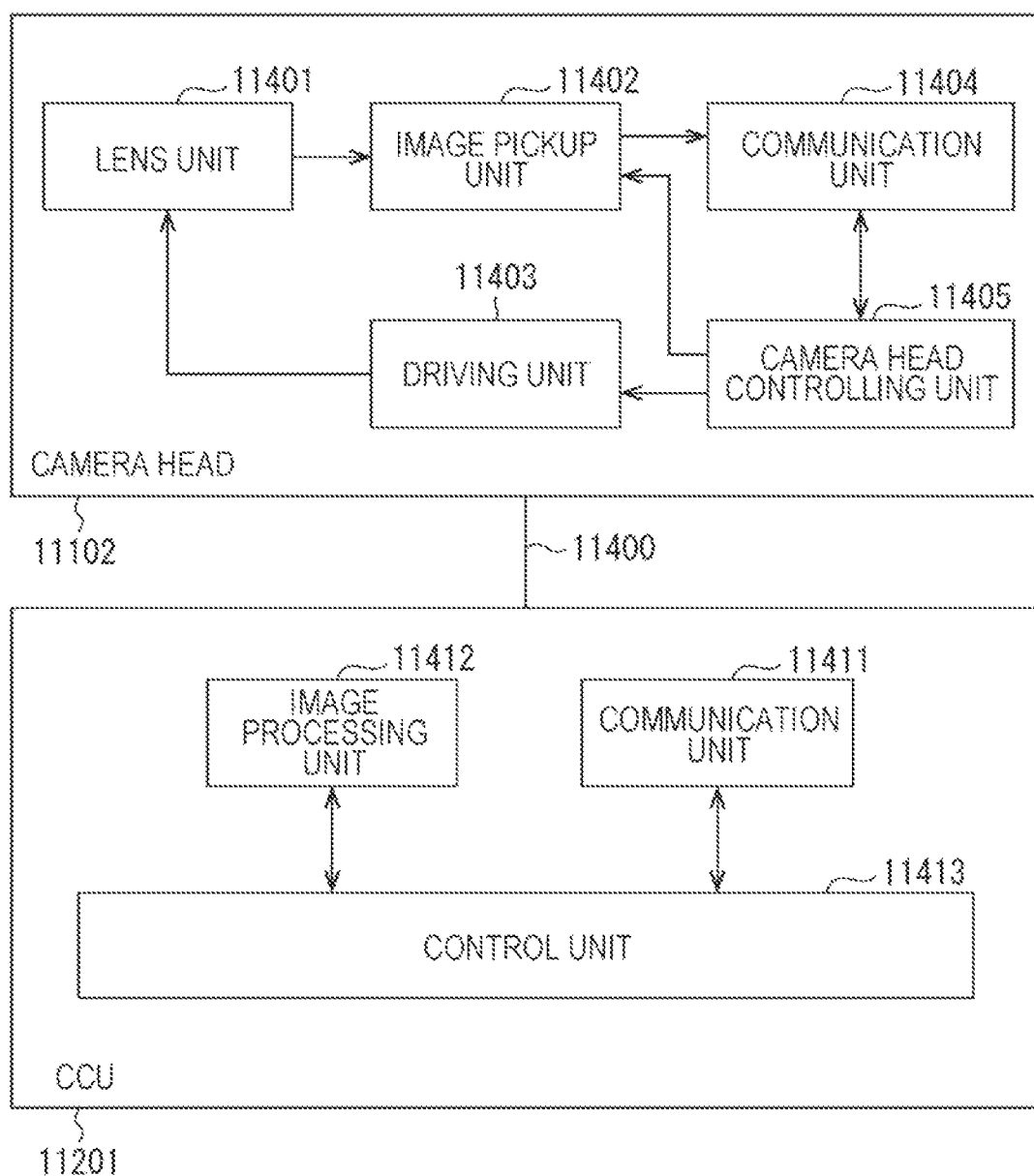
FIG. 35 is a block diagram illustrating an example of a functional configuration of a camera head and a camera control unit (CCU).

FIG. 35 is a block diagram illustrating an example of a functional configuration of the camera head 11102 and the CCU 11201 depicted in FIG. 34.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The image pickup unit 11402 includes an image pickup element. The number of image pickup elements which is included by the image pickup unit 11402 may be one (single-plate type) or a plural number (multi-plate type). In a case where the image pickup unit 11402 is configured as that of the multi-plate type, for example, image signals corresponding to respective R, G and B are generated by the image pickup elements, and the image signals may be synthesized to obtain a color image. Alternatively, the image pickup unit 11402 may also be configured to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, in a case where the image pickup unit 11402 is configured as that of multi-plate type, a plurality of systems of lens units 11401 may be provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy device 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. In a case where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

An example of the endoscopic surgery system to which the technology according to the present disclosure can be applied has been described above. The technology according to the present disclosure may be applied to the image pickup unit 11402 among the configurations described above. Specifically, any of the solid-state imaging devices 1 described in the first to fourteenth embodiments described above can be applied to the image pickup unit 11402. By applying the technology according to the present disclosure to the image pickup unit 11402, for example, a clearer image of a surgical region can be obtained, so that the operator can reliably check the surgical region.

Note that, here, the endoscopic surgery system has been described as an example, but the technology according to the present disclosure may be applied to, for example, a microscopic surgery system or the like.

OTHER EMBODIMENTS

As described above, the present technology has been described by way of the first to fourteenth embodiments, but it should not be understood that the description and drawings constituting a part of this disclosure limit the present technology. Various alternative embodiments, examples, and operation techniques will be apparent to those skilled in the art from this disclosure.

For example, the technical ideas described in the first to fourteenth embodiments may be combined with each other. For example, in the solid-state imaging device 1 according to the fifth embodiment described above, the second portion 522 is provided at a position away from the transfer gate electrodes TRG1 and TRG2 in the Y direction of the semiconductor layer 20, but the same idea may be combined with the solid-state imaging devices 1 according to the first to fourth embodiments and the solid-state imaging devices 1 according to the sixth to fourteenth embodiments. Furthermore, for example, the technical idea of providing each of the transfer gate electrodes TRG1 and TRG2 near the corner portion of the photoelectric conversion unit 21 described in the solid-state imaging device 1 according to the ninth embodiment and the solid-state imaging device 1 according to the tenth embodiment can be applied to the solid-state imaging devices 1 according to the first to eighth embodiments and the eleventh to fourteenth embodiments, and various combinations in accordance with the respective technical ideas are possible.

As described above, it is a matter of course that the present technology includes various embodiments and the like not described herein. Therefore, the technical scope of the present technology is defined only by the matters used to define the invention described in the claims considered appropriate from the above description.

Furthermore, the effects described herein are merely illustrative and not restrictive, and may have additional effects.

It is to be noted that the present technology may also have the following configurations.

(1)

A solid-state imaging device including a semiconductor layer in which one surface is a light incidence surface and another surface is an element formation surface,
  in which the semiconductor layer includes a plurality of photoelectric conversion units including a first photoelectric conversion portion, a second photoelectric conversion portion, an isolation portion provided between the first photoelectric conversion portion and the second photoelectric conversion portion and capable of forming a first potential barrier, a charge accumulation region, a first transfer transistor capable of transferring a signal charge from the first photoelectric conversion portion to the charge accumulation region and forming a second potential barrier higher than the first potential barrier when the signal charge is not transferred, and a second transfer transistor capable of transferring a signal charge from the second photoelectric conversion portion to the charge accumulation region and forming the second potential barrier when the signal charge is not transferred, and
  the isolation portion includes a first region formed by an insulating material extending in a thickness direction of the semiconductor layer from the element formation surface side, and a second region provided on the light incidence surface side of the first region and formed by a semiconductor region into which impurities exhibiting a first conductivity type are implanted.

(2)

The solid-state imaging device according to (1),
  in which the semiconductor layer has a groove extending from the element formation surface in the thickness direction of the semiconductor layer, and
  the first region is formed by the insulating material embedded in the groove.

(3)

The solid-state imaging device according to (1) or (2), in which, in the thickness direction of the semiconductor layer, the second region includes a first portion in which a concentration of the impurities exhibiting the first conductivity type is a first concentration, and a second portion in which a concentration of the impurities exhibiting the first conductivity type is a second concentration lower than the first concentration.

(4)

The solid-state imaging device according to (3), in which, in the thickness direction of the semiconductor layer, the second portion is provided on the light incidence surface side of the first region, and the first portion is provided on the light incidence surface side of the second portion.

(5)

The solid-state imaging device according to (3),
  in which the isolation portion includes a hole accumulation region provided on the light incidence surface side of the first region in the thickness direction of the semiconductor layer, and
  in the thickness direction of the semiconductor layer, the second portion is provided on the light incidence surface side of the hole accumulation region, and the first portion is provided on the light incidence surface side of the second portion.

(6)

The solid-state imaging device according to any one of (3) to (5), in which the second portion is a passage through which signal charges pass when the signal charges move between the first photoelectric conversion portion and the second photoelectric conversion portion, and the first portion is an impurity isolation region that suppresses movement of the signal charges between the first photoelectric conversion portion and the second photoelectric conversion portion.

(7)

The solid-state imaging device according to any one of (1) to (6),
  in which the first photoelectric conversion portion and the second photoelectric conversion portion are arranged in a first direction in a plan view,
  the first transfer transistor and the second transfer transistor are provided closer to one side of the photoelectric conversion unit in a second direction intersecting the first direction in the plan view, and
  the first region and the second region are provided closer to another side of the photoelectric conversion unit in the second direction.

(8)

The solid-state imaging device according to any one of (1) to (6), in which each of the first transfer transistor and the second transfer transistor is provided near a corner portion of the photoelectric conversion unit.

(9)

The solid-state imaging device according to any one of (1) to (8),
  in which the charge accumulation region includes a first charge accumulation region and a second charge accumulation region provided separately from the first charge accumulation region,
  the first charge accumulation region accumulates signal charges transferred from the first photoelectric conversion portion by the first transfer transistor, and
  the second charge accumulation region accumulates signal charges transferred from the second photoelectric conversion portion by the second transfer transistor.

(10)

The solid-state imaging device according to any one of (1) to (9),
- in which the first photoelectric conversion portion and the second photoelectric conversion portion are arranged in a first direction in a plan view,
- the semiconductor layer includes a unit isolation portion that isolates the adjacent photoelectric conversion units from each other, and
- the isolation portion includes a third region protruding in a protruding shape from the unit isolation portion provided in the first direction toward the first region and the second region.

(11)

The solid-state imaging device according to (10), in which the unit isolation portion and the third region are formed by a semiconductor region into which impurities exhibiting a first conductivity type are implanted, and are impurity isolation regions that suppress movement of signal charges.

(12)

The solid-state imaging device according to (10), in which, in the thickness direction of the semiconductor layer, the unit isolation portion is formed by an insulating material provided from one to another of the light incidence surface and the element formation surface.

(13)

The solid-state imaging device according to (12), in which the third region is formed by an insulating material provided from one to another of the light incidence surface and the element formation surface.

(14)

The solid-state imaging device according to (12), in which a width of the unit isolation portion is different in the thickness direction of the semiconductor layer.

(15)

The solid-state imaging device according to (13), in which a width of the third region is different in the thickness direction of the semiconductor layer.

(16)

The solid-state imaging device according to (10),
- in which the unit isolation portion is formed by a semiconductor region into which impurities exhibiting a first conductivity type are implanted, and includes a portion functioning as an impurity isolation region that suppresses movement of signal charges and a portion formed by an insulating material, and
- in the thickness direction of the semiconductor layer, the unit isolation portion has the portion formed by a semiconductor region into which impurities exhibiting the first conductivity type are implanted closer to the element formation surface side, and has the portion formed by an insulating material closer to the light incidence surface side.

(17)

The solid-state imaging device according to (16),
- in which the third region is formed by a semiconductor region into which impurities exhibiting a first conductivity type are implanted, and includes a portion functioning as an impurity isolation region that suppresses movement of signal charges and a portion formed by an insulating material, and
- in the thickness direction of the semiconductor layer, the third region has the portion formed by a semiconductor region into which impurities are implanted closer to the element formation surface side, and has the portion formed by an insulating material closer to the light incidence surface side.

(18)

The solid-state imaging device according to any one of (1) to (17), in which the insulating material is silicon oxide.

(19)

An electronic device including:
- a solid-state imaging device; and
- an optical system that causes the solid-state imaging device to form an image of image light from a subject,
- in which the solid-state imaging device includes a semiconductor layer in which one surface is a light incidence surface and another surface is an element formation surface,
- the semiconductor layer includes a plurality of photoelectric conversion units including a first photoelectric conversion portion, a second photoelectric conversion portion, an isolation portion provided between the first photoelectric conversion portion and the second photoelectric conversion portion and capable of forming a first potential barrier, a charge accumulation region, a first transfer transistor capable of transferring a signal charge from the first photoelectric conversion portion to the charge accumulation region and forming a second potential barrier higher than the first potential barrier when the signal charge is not transferred, and a second transfer transistor capable of transferring a signal charge from the second photoelectric conversion portion to the charge accumulation region and forming the second potential barrier when the signal charge is not transferred, and
- the isolation portion includes a first region formed by an insulating material extending in a thickness direction of the semiconductor layer from the element formation surface side, and a second region provided on the light incidence surface side of the first region and formed by a semiconductor region into which impurities exhibiting a first conductivity type are implanted.

(20)

A method for manufacturing a solid-state imaging device, the method including:
- forming a first photoelectric conversion portion and a second photoelectric conversion portion in a semiconductor layer in which one surface is a light incidence surface and another surface is an element formation surface;
- forming a first impurity region in which a concentration of impurities exhibiting a first conductivity type is a first concentration in the semiconductor layer between the first photoelectric conversion portion and the second photoelectric conversion portion;
- forming a groove in a thickness direction of the semiconductor layer from the element formation surface in the semiconductor layer between the first photoelectric conversion portion and the second photoelectric conversion portion;
- selectively forming, a second impurity region in which a concentration of the impurities exhibiting the first conductivity type is a second concentration lower than the first concentration in the semiconductor layer adjacent to a bottom portion of the groove from the element formation surface side; and
- embedding an insulating material in the groove.

The scope of the present technology is not limited to the illustrated and described exemplary embodiments, and includes all embodiments that provide effects equivalent to the effects intended to be provided by the present technology. Furthermore, the scope of the present technology is not limited to the combinations of the features of the invention defined by the claims, and may be defined by any desired combination of specific features among all the disclosed features.

REFERENCE SIGNS LIST

1 Solid-state imaging device
2 Semiconductor chip
2A Pixel region
2B Peripheral region
3 Pixel
4 Vertical drive circuit
5 Column signal processing circuit
6 Horizontal drive circuit
7 Output circuit
8 Control circuit
10 Pixel drive line
11 Vertical signal line
12 Horizontal signal line
13 Logic circuit
14 Bonding pad
15 Circuit
16 Transistor group
17 Electrode pad
18 Electrode pad
20, 20A, 20B, 20C Semiconductor layer
20a Active region
21 Photoelectric conversion unit
22, 22A, 22A1, 22A2, 22B, 22C, 22G, 22G1, 22G2 Unit isolation portion
23L First photoelectric conversion portion
23R Second photoelectric conversion portion
24L First transfer transistor
24R Second transfer transistor
25 Charge accumulation region
25L First charge accumulation region
25R Second charge accumulation region
26 Groove
26a Bottom portion
30, 30A, 30B, 30C Multilayer wiring layer
31 Interlayer insulating film
32 Wiring layer
41 Support substrate
42 Color filter
43 Microlens layer
43a Microlens
50, 50B, 50D, 50E, 50F, 50G Isolation portion
51 First region
51a End portion
52 Second region
521 First portion
522 Second portion
53 Third region
53B, 53B1, 53B2, 53E, 53G, 53G1, 53G2 Third region
54 Hole accumulation region
70A Light receiving substrate
70B Pixel circuit substrate
70C Logic circuit substrate
80 Through electrode

What is claimed is:

1. A solid-state imaging device comprising a semiconductor layer in which one surface is a light incidence surface and another surface is an element formation surface, wherein the semiconductor layer includes a plurality of photoelectric conversion units including a first photoelectric conversion portion, a second photoelectric conversion portion, an isolation portion provided between the first photoelectric conversion portion and the second photoelectric conversion portion and capable of forming a first potential barrier, a charge accumulation region, a first transfer transistor capable of transferring a signal charge from the first photoelectric conversion portion to the charge accumulation region and forming a second potential barrier higher than the first potential barrier when the signal charge is not transferred, and a second transfer transistor capable of transferring a signal charge from the second photoelectric conversion portion to the charge accumulation region and forming the second potential barrier when the signal charge is not transferred, and the isolation portion includes a first region formed by an insulating material extending in a thickness direction of the semiconductor layer from the element formation surface side, and a second region provided on the light incidence surface side of the first region and formed by a semiconductor region into which impurities exhibiting a first conductivity type are implanted.

2. The solid-state imaging device according to claim 1, wherein the semiconductor layer has a groove extending from the element formation surface in the thickness direction of the semiconductor layer, and the first region is formed by the insulating material embedded in the groove.

3. The solid-state imaging device according to claim 1, wherein, in the thickness direction of the semiconductor layer, the second region includes a first portion in which a concentration of the impurities exhibiting the first conductivity type is a first concentration, and a second portion in which a concentration of the impurities exhibiting the first conductivity type is a second concentration lower than the first concentration.

4. The solid-state imaging device according to claim 3, wherein, in the thickness direction of the semiconductor layer, the second portion is provided on the light incidence surface side of the first region, and the first portion is provided on the light incidence surface side of the second portion.

5. The solid-state imaging device according to claim 3, wherein the isolation portion includes a hole accumulation region provided on the light incidence surface side of the first region in the thickness direction of the semiconductor layer, and in the thickness direction of the semiconductor layer, the second portion is provided on the light incidence surface side of the hole accumulation region, and the first portion is provided on the light incidence surface side of the second portion.

6. The solid-state imaging device according to claim 3, wherein the second portion is a passage through which signal charges pass when the signal charges move between the first photoelectric conversion portion and the second photoelectric conversion portion, and the first portion is an impurity isolation region that suppresses movement of the signal charges between the first photoelectric conversion portion and the second photoelectric conversion portion.

7. The solid-state imaging device according to claim 1, wherein the first photoelectric conversion portion and the second photoelectric conversion portion are arranged in a first direction in a plan view, the first transfer transistor and the second transfer transistor are provided closer to one side of the photoelectric conversion unit in a second direction intersecting the first direction in the plan view, and the first region and the second region are provided closer to another side of the photoelectric conversion unit in the second direction.

8. The solid-state imaging device according to claim 1, wherein each of the first transfer transistor and the second transfer transistor is provided near a corner portion of the photoelectric conversion unit.

9. The solid-state imaging device according to claim 1, wherein the charge accumulation region includes a first charge accumulation region and a second charge accumulation region provided separately from the first charge accumulation region, the first charge accumulation region accumulates signal charges transferred from the first photoelectric conversion portion by the first transfer transistor, and the second charge accumulation region accumulates signal charges transferred from the second photoelectric conversion portion by the second transfer transistor.

10. The solid-state imaging device according to claim 1, wherein the first photoelectric conversion portion and the second photoelectric conversion portion are arranged in a first direction in a plan view, the semiconductor layer includes a unit isolation portion that isolates the adjacent photoelectric conversion units from each other, and the isolation portion includes a third region protruding in a protruding shape from the unit isolation portion provided in the first direction toward the first region and the second region.

11. The solid-state imaging device according to claim 10, wherein the unit isolation portion and the third region are formed by a semiconductor region into which impurities exhibiting a first conductivity type are implanted, and are impurity isolation regions that suppress movement of signal charges.

12. The solid-state imaging device according to claim 10, wherein, in the thickness direction of the semiconductor layer, the unit isolation portion is formed by an insulating material provided from one to another of the light incidence surface and the element formation surface.

13. The solid-state imaging device according to claim 12, wherein the third region is formed by an insulating material provided from one to another of the light incidence surface and the element formation surface.

14. The solid-state imaging device according to claim 12, wherein a width of a portion of the unit isolation portion closer to the light incidence surface is narrower than a width of a portion of the unit isolation portion closer to the element formation surface.

15. The solid-state imaging device according to claim 13, wherein a width of a portion of the third region closer to the light incidence surface is narrower than a width of a portion of the third region closer to the element formation surface.

16. The solid-state imaging device according to claim 10, wherein the unit isolation portion is formed by a semiconductor region into which impurities exhibiting a first conductivity type are implanted, and includes a portion functioning as an impurity isolation region that suppresses movement of signal charges and a portion formed by an insulating material, and in the thickness direction of the semiconductor layer, the unit isolation portion has the portion formed by a semiconductor region into which impurities exhibiting the first conductivity type are implanted closer to the element formation surface side, and has the portion formed by an insulating material closer to the light incidence surface side.

17. The solid-state imaging device according to claim 16, wherein the third region is formed by a semiconductor region into which impurities exhibiting a first conductivity type are implanted, and includes a portion functioning as an impurity isolation region that suppresses movement of signal charges and a portion formed by an insulating material, and in the thickness direction of the semiconductor layer, the third region has the portion formed by a semiconductor region into which impurities are implanted closer to the element formation surface side, and has the portion formed by an insulating material closer to the light incidence surface side.

18. The solid-state imaging device according to claim 1, wherein the insulating material is silicon oxide.

19. An electronic device comprising:

a solid-state imaging device; and an optical system that causes the solid-state imaging device to form an image of image light from a subject, wherein the solid-state imaging device includes a semiconductor layer in which one surface is a light incidence surface and another surface is an element formation surface, the semiconductor layer includes a plurality of photoelectric conversion units including a first photoelectric conversion portion, a second photoelectric conversion portion, an isolation portion provided between the first photoelectric conversion portion and the second photoelectric conversion portion and capable of forming a first potential barrier, a charge accumulation region, a first transfer transistor capable of transferring a signal charge from the first photoelectric conversion portion to the charge accumulation region and forming a second potential barrier higher than the first potential barrier when the signal charge is not transferred, and a second transfer transistor capable of transferring a signal charge from the second photoelectric conversion portion to the charge accumulation region and forming the second potential barrier when the signal charge is not transferred, and the isolation portion includes a first region formed by an insulating material extending in a thickness direction of the semiconductor layer from the element formation surface side, and a second region provided on the light incidence surface side of the first region and formed by a semiconductor region into which impurities exhibiting a first conductivity type are implanted.

* * * * *